(12) United States Patent
Iwamoto et al.

(10) Patent No.: US 7,742,857 B2
(45) Date of Patent: Jun. 22, 2010

(54) AUTOMOTIVE INFORMATION DISPLAY SYSTEM

(75) Inventors: Taro Iwamoto, Hiroshima (JP); Yoshihisa Okamoto, Hiroshima (JP); Toshihiro Hara, Hiroshima (JP)

(73) Assignee: Mazda Motor Corporation (JP)

( * ) Notice: Subject to any disclaimer, the term of this patent is extended or adjusted under 35 U.S.C. 154(b) by 874 days.

(21) Appl. No.: 11/606,122

(22) Filed: Nov. 30, 2006

(65) Prior Publication Data

US 2007/0126698 A1 Jun. 7, 2007

(30) Foreign Application Priority Data

| Dec. 7, 2005 | (JP) | ............................. 2005-353330 |
| Dec. 7, 2005 | (JP) | ............................. 2005-353375 |
| Dec. 13, 2005 | (JP) | ............................. 2005-359117 |
| Jan. 18, 2006 | (JP) | ............................. 2006-009412 |
| Jan. 25, 2006 | (JP) | ............................. 2006-016403 |
| Jan. 30, 2006 | (JP) | ............................. 2006-020557 |

(51) Int. Cl.
 *G06F 7/00* (2006.01)
 *G01C 21/30* (2006.01)

(52) U.S. Cl. .................... 701/36; 340/425.5; 340/815.4; 701/211; 345/156; 700/17; 715/970; 715/762; 715/764

(58) Field of Classification Search .................... 701/36, 701/211; 345/156; 715/762, 764, 781, 783, 715/970; 340/815, 425.5; 700/17
See application file for complete search history.

(56) References Cited

U.S. PATENT DOCUMENTS

| 6,275,231 B1 * | 8/2001 | Obradovich ................. 345/156 |
| 6,567,069 B1 * | 5/2003 | Bontrager et al. ........... 345/156 |
| 6,903,652 B2 * | 6/2005 | Noguchi et al. ........... 340/425.5 |
| 7,162,335 B2 * | 1/2007 | He et al. ......................... 701/3 |
| 7,584,049 B2 * | 9/2009 | Nomura ..................... 701/210 |

(Continued)

FOREIGN PATENT DOCUMENTS

GB 0716548.3 * 8/2007

(Continued)

OTHER PUBLICATIONS

Portable control console for autonomous ocean-going vehicles; Hlavac, D.; de Sousa, J.T.B.; Pereira, F.L.; Oceans 2009-Europe, 2009. Oceans'09; May 11-14, 2009, pp. 1-10; Digital Object Identifier 10.1109/OCEANSE.2009.5278236.*

(Continued)

*Primary Examiner*—Cuong H Nguyen
(74) *Attorney, Agent, or Firm*—Studebaker & Brackett PC; Donald R. Studebaker

(57) ABSTRACT

An information display system for a vehicle includes: a display for displaying, an operation screen for operating at least one piece of in-vehicle equipment; a first operation section including a leftward moving switch, a rightward moving switch, and a selection enter switch capable of being manipulated upward and downward and being pushed; and a controller. The controller changes a position of the operation menu selected point in the operation menus horizontally arranged on the operation screen for selecting any one of the operation menus in response to a manipulation signal from the leftward moving switch or the rightward moving switch and executes an operation relating to the selected operation menu in response to an upward or downward manipulation signal from the selection enter switch.

48 Claims, 31 Drawing Sheets

U.S. PATENT DOCUMENTS

| | | | |
|---|---|---|---|
| 7,620,495 B2 * | 11/2009 | Minagawa et al. | 701/211 |
| 2007/0126698 A1 * | 6/2007 | Iwamoto et al. | 345/156 |
| 2007/0127776 A1 * | 6/2007 | Tokunaga | 382/104 |
| 2007/0128899 A1 * | 6/2007 | Mayer | 439/152 |
| 2007/0255491 A1 * | 11/2007 | Geelen et al. | 701/204 |
| 2007/0260364 A1 * | 11/2007 | Dwyer | 701/3 |
| 2008/0177994 A1 * | 7/2008 | Mayer | 713/2 |
| 2009/0306989 A1 * | 12/2009 | Kaji | 704/270 |

FOREIGN PATENT DOCUMENTS

| | | | |
|---|---|---|---|
| JP | 07-257231 | | 10/1995 |
| JP | 08335066 A | * | 12/1996 |
| JP | FR 2783777 A1 | * | 3/2000 |
| JP | 2002243490 A | * | 8/2002 |
| JP | 2003-241784 | | 8/2003 |
| JP | 2005128791 A | * | 5/2005 |
| JP | 2005-339129 | * | 11/2005 |

OTHER PUBLICATIONS

Systems modelling of a driver information system—automotive industry case study; Rao, A.C.; Dhadyalla, G.; Jones, R.P.; McMurran, R.; System of Systems Engineering, 2006 IEEE/SMC International Conference on; Apr. 24-26, 2006, pp. 6 pp. Digital Object Identifier 10.1109/SYSOSE.2006.1652305.*

A Survey of Challenges Related to the Design of 3D User Interfaces for Car Drivers; Tonnis, M.; Broy, V.; Klinker, G.; 3D User Interfaces, 2006. 3DUI 2006. IEEE Symposium on; Mar. 25-29, 2006 pp. 127-134; Digital Object Identifier 10.1109A/R.2006.19.*

A database taxonomy based on data-driven knowledge modeling; Zellweger, P.; Integration of Knowledge Intensive Multi-Agent Systems, 2005. International Conference on Apr. 18-21, 2005 pp. 469-474.*

Using the ST725 sonar for AUV feature based navigation and correction; Marr, W.J.; Healey, A.J.; Autonomous Underwater Vehicles, 1998. AUV'98. Proceedings of the 1998 Workshop on; Aug 20-21, 1998 pp. 149-166; Digital Object Identifier 10.1109/AUV.1998.744450.*

Functions and devices of Mitsubishi active safety ASV; Mimuro, T.; Miichi, Y.; Maemura, T.; Hayafune, K.; Intelligent Vehicles Symposium, 1996., Proceedings of the 1996 IEEE; Sep. 19-20, 1996 pp. 248-253; Digital Object Identifier 10.1109/IVS.1996.566386.*

Human factors engineering the TravTek driver interface; Dingus, T.A.; Carpenter, J.T.; Szczublewski, F.E.; Krage, M.K.; Means, L.G.; Fleischman, R.N.; Vehicle Navigation and Information Systems Conference, 1991; vol. 2, Oct. 20-23, 1991, pp. 749-755.*

A framework for interaction of distributed autonomous systems and human supervisors;Spoelder, H.J.W et al.; Instrumentation and Measurement Technology Conference, 2001. IMTC 2001. Proceedings of the 18th IEEE;vol. 3, May 21-23, 2001 pp. 1937-1941 vol. 3;Digital Object Identifier 10.1109/IMTC.2001.929538.*

* cited by examiner

FIG.12A  FIG.12B
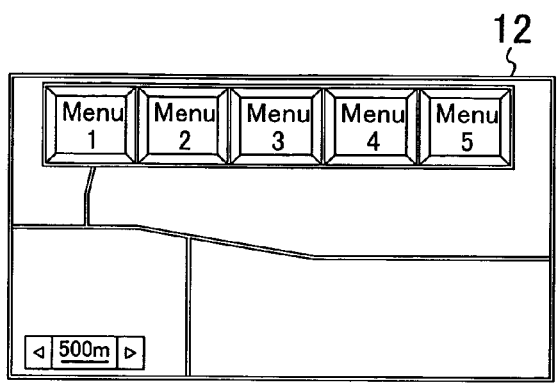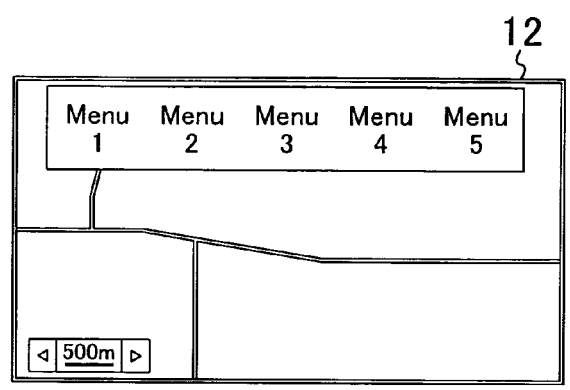
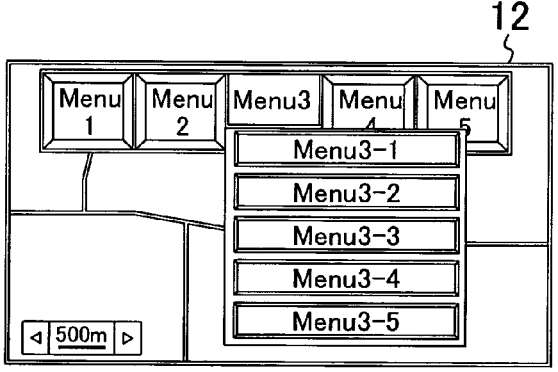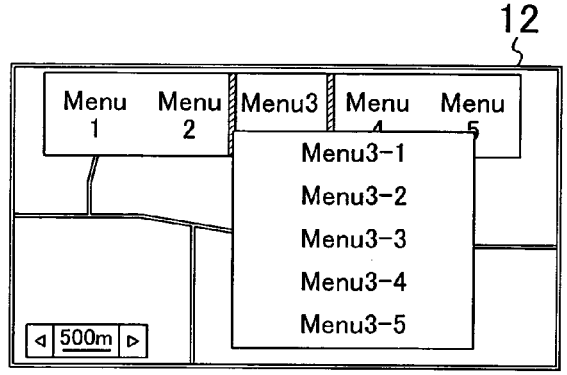
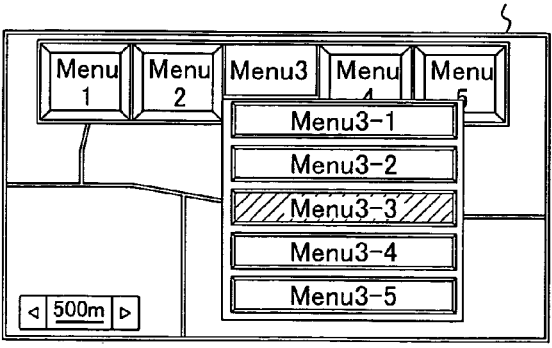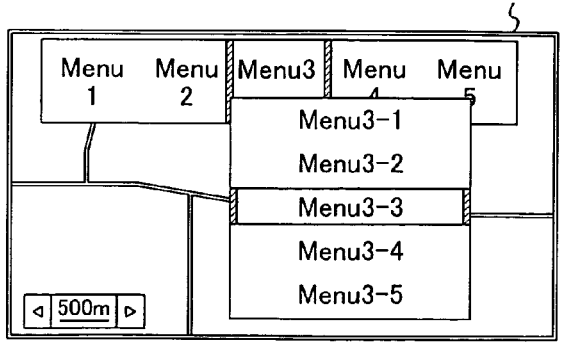

Passenger seat side　　　　　Driver seat side

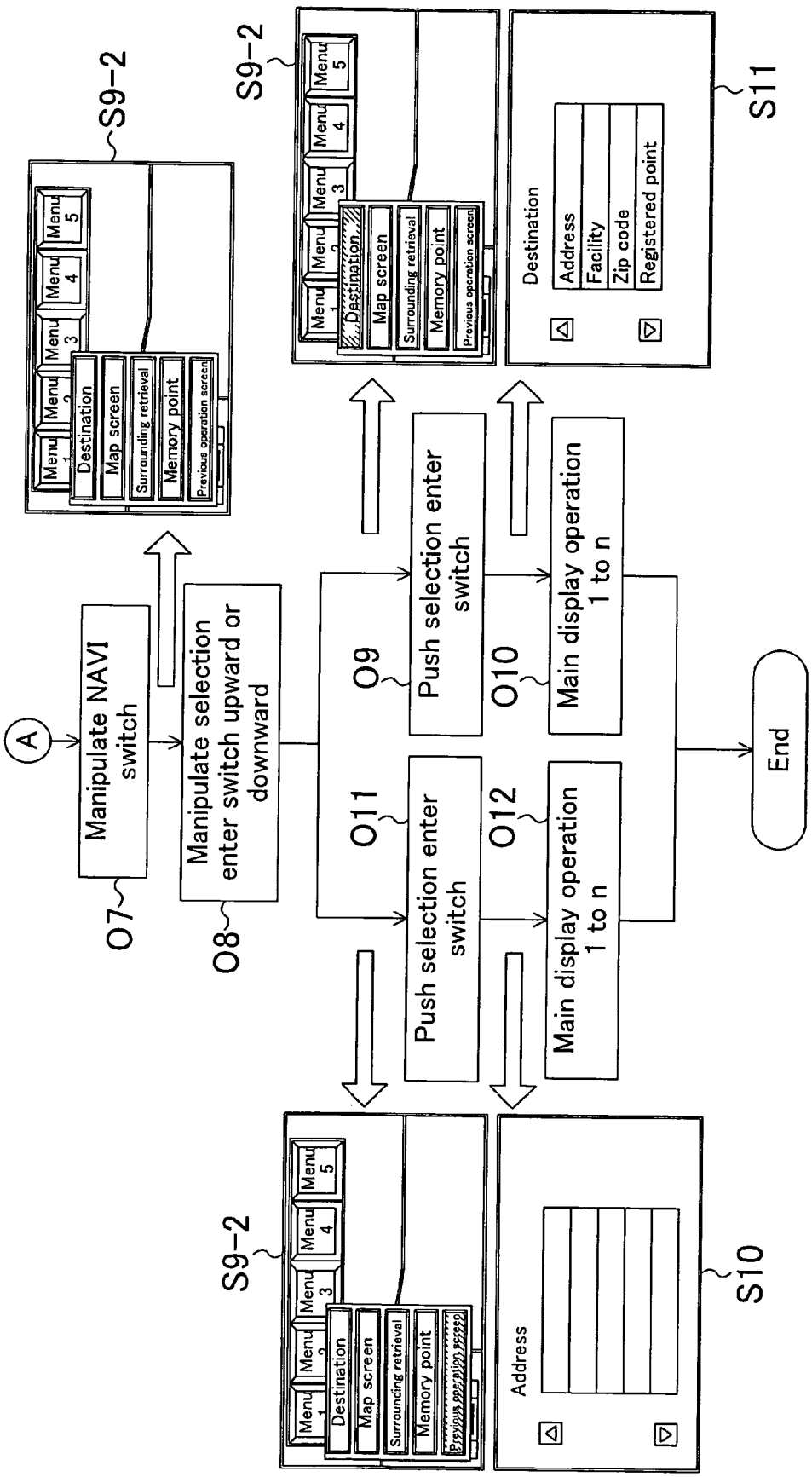

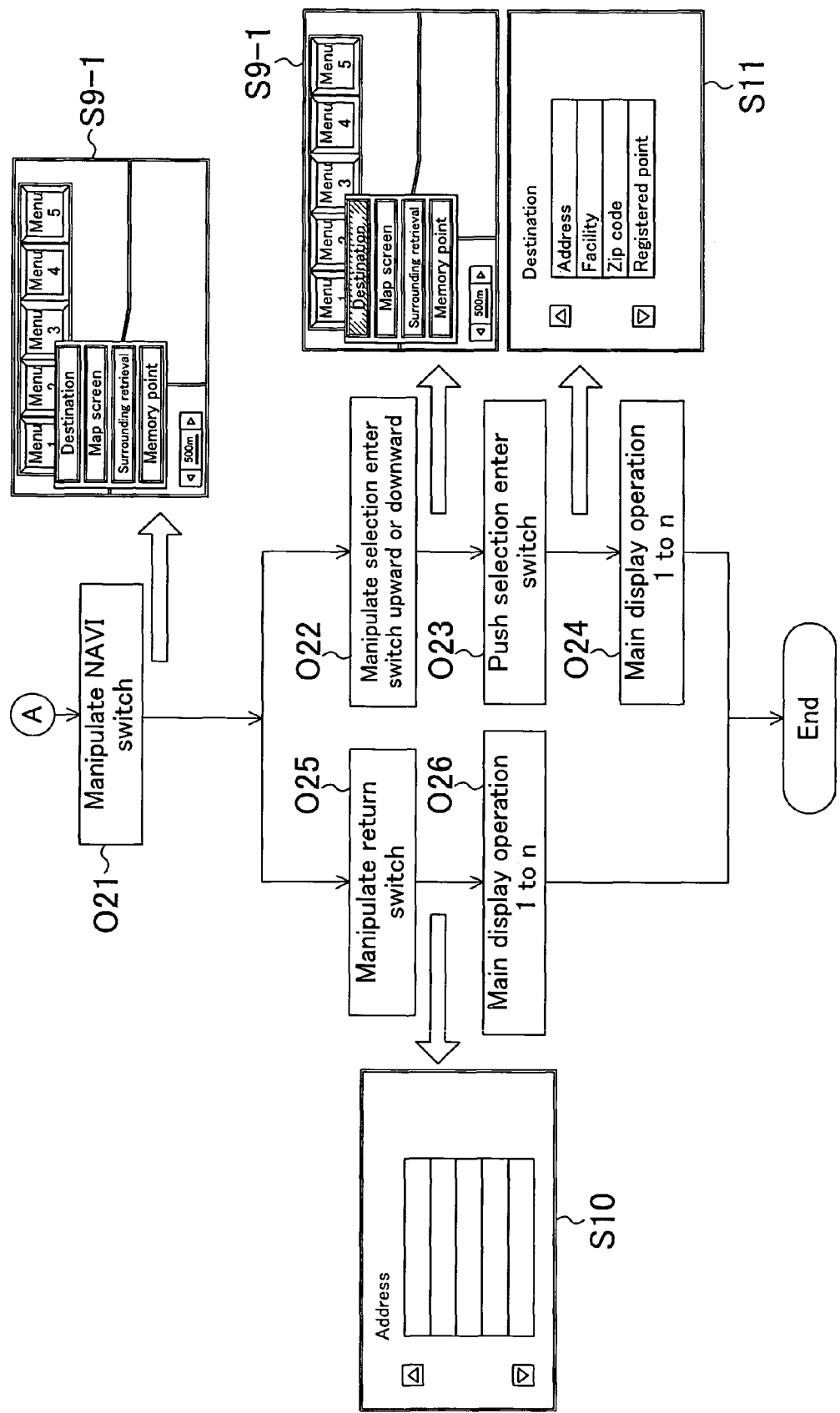

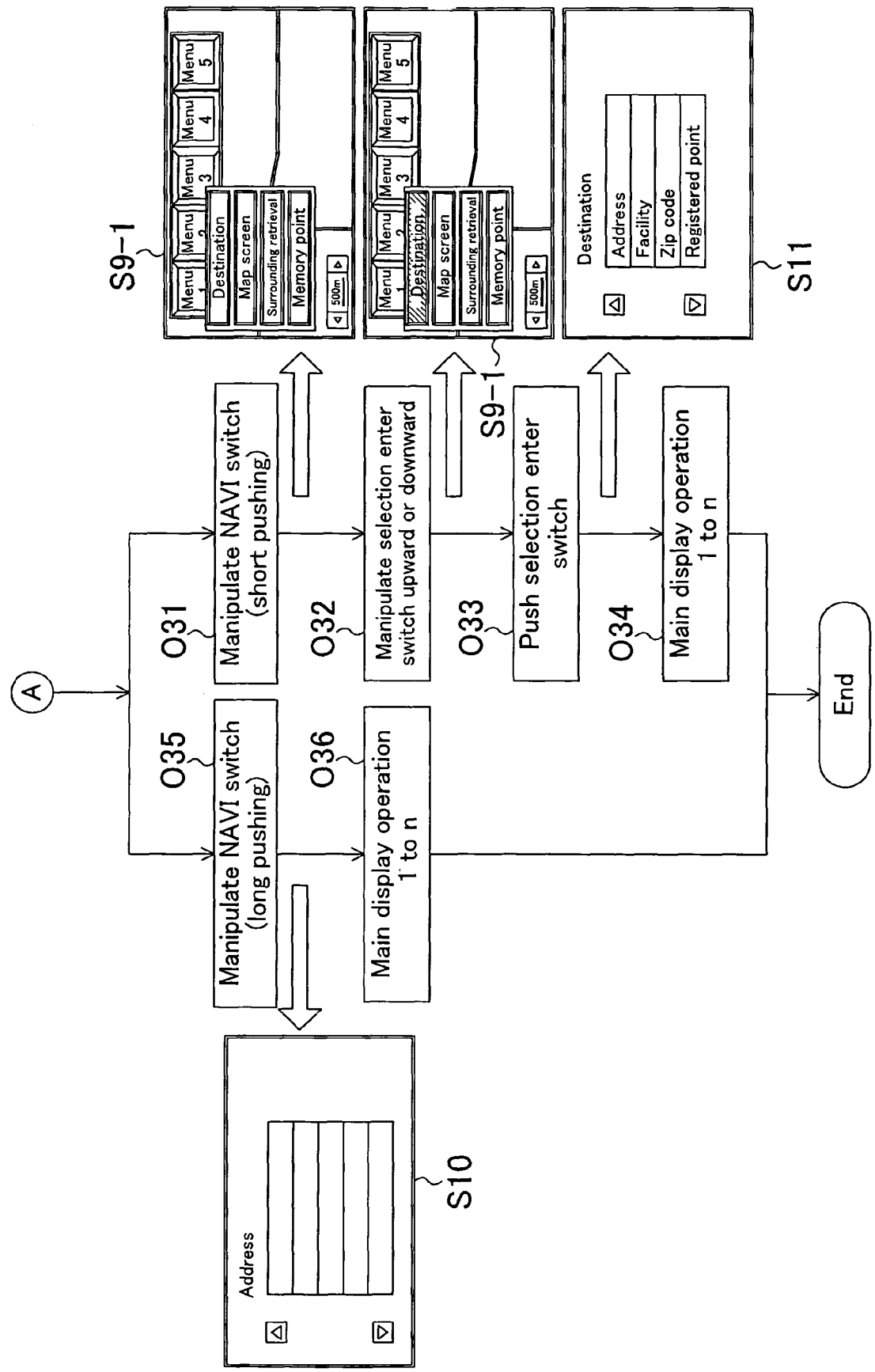

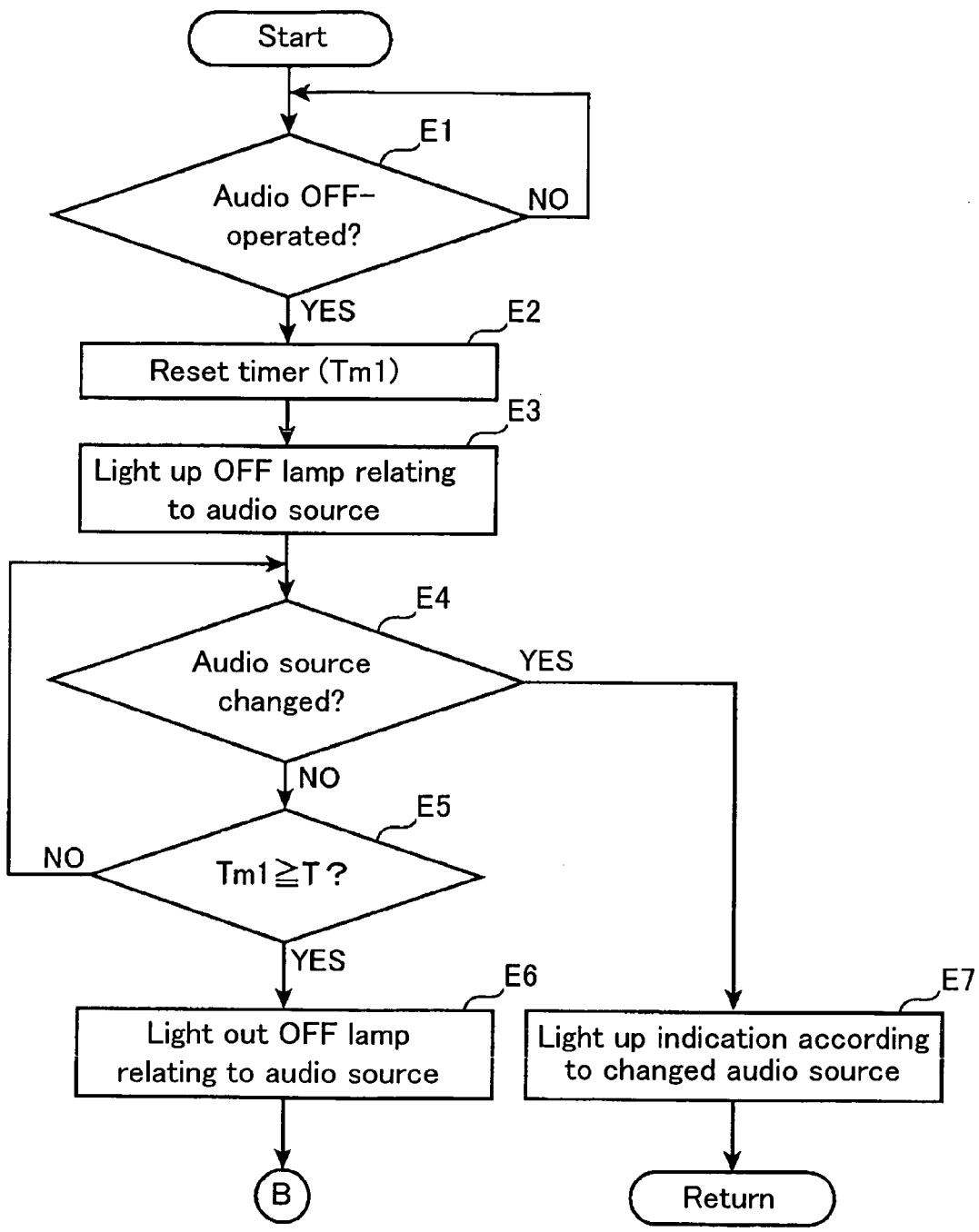

AUTOMOTIVE INFORMATION DISPLAY SYSTEM

FIELD OF THE INVENTION

The present invention relates to an automotive information display system that performs operation and information display in relation to in-vehicle equipment.

BACKGROUND ART

A number of in-vehicle equipment such as an air conditioner, audio components, and the like are boarded on a vehicle such as an automobile. In such a vehicle carrying a number of in-vehicle equipment, when an exclusive operation switch is provided for each of the in-vehicle equipment, numerous operation switches are arranged in a limited space within the cabin. This compels the user to look for an operation switch for manipulation of desired in-vehicle equipment and such switch manipulation is complicated, lowering the operability of the in-vehicle equipment.

For improving such problems, the operation switches of the in-vehicle equipment are integrated into a single operation switch. An information display system disclosed in Japanese Patent Application Laid Open Publication No. 7-25723A is known as such a device, for example. This information display system includes a concentrated display having on a single screen a plurality of display regions divided for each of in-vehicle equipment and a joystick switch mounted at an instrument panel. The concentrated display indicates operation menus relating to the respective in-vehicle equipment in the respective plurality of display regions. When one of the operation menus is operated through the joystick switch, the corresponding in-vehicle equipment executes a predetermined operation accordingly. In this information display system, switches for operating the respective in-vehicle equipment are integrated into the single operation switch, and therefore, only manipulation of the integrated operation switch leads to operation of any of in-vehicle equipment, increasing the operability of each of the in-vehicle equipment.

In the above information display system, however, the single operation switch is composed of a joystick switch that is manipulated by being tipping left, right, back, or forth, which is liable to invite mis-manipulation. This presents a problem of lowered manipulation reliability in view of manipulation by a driver driving the vehicle.

SUMMARY OF THE INVENTION

The present invention has its object of improving operability of an automotive information display system.

One aspect of the present invention provides an automotive information display system, which includes:

a display for displaying, as an operation screen for operating at least one piece of in-vehicle equipment, an operation screen in which a plurality of horizontally arranged operation menus are indicated and which allows, upon selection of any one of the plurality of operation menus, an operation relating to the selected operation menu;

a first operation section including: a leftward moving switch to which a function of moving an operation menu selected point leftward on the operation screen is assigned; a rightward moving switch to which a function of moving the operation menu selected point rightward on the operation screen is assigned; and a selection enter switch capable of being manipulated upward and downward and being pushed; and a controller for changing a position of the operation menu selected point in the operation menus horizontally arranged on the operation screen for selecting any one of the operation menus in response to a manipulation signal from the leftward moving switch or the rightward moving switch and for executing an operation relating to the selected operation menu in response to an upward or downward manipulation signal from the selection enter switch.

With this arrangement, the operation screen of the display indicates a plurality of operation menus arranged horizontally.

While, the first operation section for operation on the operation screen includes the leftward moving switch, the rightward moving switch, and the selection enter switch. Of these switches, the leftward moving switch and the rightward moving switch each have one function for moving the operation menu selected point leftward and rightward on the operation screen, respectively.

Accordingly, for a desired operation on the operation screen, the operator manipulates first the leftward moving switch or the rightward moving switch for selecting a desired operation menu from the operation menus arranged horizontally, then, manipulates upward or downward the selection enter switch.

This enables favorable blind manipulation, which is especially favorable for the driver to manipulate the operation section.

The information display system may have such an arrangement in which the display is a navigation display for displaying at least an operation screen relating to a navigation device, the operation screen of the navigation display displays a plurality of horizontally arranged first hierarchy operation menus and displays, upon selection of any one of the plurality of first hierarchy operation menus, vertically arranged second hierarchy operation menus belonging to the selected first hierarchy operation menu, and the controller changes the position of the operation menu selected point in the horizontally arranged first hierarchy operation menus on the operation screen in response to a manipulation signal from the leftward moving switch or the rightward moving switch, changes the position of the operation menu selected point in the vertically arranged second hierarchy operation menus in response to an upward or downward manipulation signal from the selection enter switch, and enters selection of a selected second hierarchy operation menu in response to a pushing signal from the selection enter switch.

With the above arrangement, the operation screen of the navigation display is composed of a combination of the plurality of first hierarchy operation menus displayed horizontally in a row and the second operation menus displayed and arranged vertically.

The leftward moving switch and the rightward moving switch each have one function for moving the selected point of the operation menus leftward and rightward on the operation screen, respectively, while the selection enter switch has two functions of moving the selected point upward or downward and of entering selection of a selected operation menu on the screen.

Accordingly, for a desired operation on the operation screen, the operator manipulates first the leftward moving switch or the rightward moving switch for selecting a desired operation menu from the horizontally arranged first hierarchy operation menus, manipulates the selection enter switch upward or downward for selecting the desired operation menu from the vertically arranged second hierarchy operation menus, which are displayed in response to the selection, then pushes the selection enter switch for entering selection of the desired operation menu.

Thus, since the leftward moving switch and the rightward moving switch are provided correspondingly to horizontal arrangement of the operation menus (i.e., the first hierarchy operation menus) on the operation screen and the selection enter switch is provided correspondingly to vertical arrangement of the operation menus (i.e., the second hierarchy operation menus) thereon, rather than provision of separate operation switches for respective operations of respective pieces of in-vehicle equipment, it is not required to look for a desired operation switch every time, enhancing the operability on the operation screen.

Further, the first hierarchy operation menus and the second hierarchy operation menus are operated through different switches (the leftward or rightward moving switch and the selection enter switch, in short, separation of switch functions) and manipulation for menu selection and manipulation for selection enter for the second hierarchy operation menus is performed through the same switch (the selection enter switch, in short, integration of switch functions), so that the number of switches is optimized and the operation sequence (the first hierarchy operation menu then the second hierarchy operation menu) on the operation screen corresponds to the manipulation sequence of the switches (the leftward or rightward moving switch then the selection enter switch), resulting in remarkable enhancement in the operability.

The above information display system may further include a concentrated display for displaying an operation screen in which horizontally arranged operation menus indicating respective pieces of information on respective plural pieces of independent in-vehicle equipment are indicated and which is capable of changing settings relating to displayed information by manipulation of the first operation section, wherein the first operation section further includes a switch for exchanging an operation target between the navigation display and the concentrated display, and when the operation target of the first operation section is set to the concentrated display, the controller changes the position of the operation menu selected point in the operation menus arranged horizontally on the operation screen of the concentrated display in response to a manipulation signal from the leftward moving switch or the rightward moving switch and changes setting of information corresponding to an operation menu where the operation menu selected point is positioned in response to an upward or downward manipulation signal from the selection enter switch.

With the above arrangement, the operation target of the first operation section can be exchanged between the navigation display and the concentrated display by manipulating the switch.

Further, the operation screen of the concentrated display indicates the plurality of horizontally arranged operation menus, so that operation on the operation screen of the concentrated display is enabled by the same manipulation as manipulation for operating the operation screen of the navigation display through the leftward and rightward moving switch and the selection enter switch which are included in the first operation section.

In detail, for a desired operation on the operation screen of the concentrated display, the operator manipulates first the leftward moving switch or the rightward moving switch for selecting a desired operation menu from the operation menus arranged horizontally, then manipulates the selection enter switch upward or downward, with the operation menu selected, for changing setting of information corresponding to the selected operation menu.

Thus, when the manipulation manner for operating the operation screen of the concentrated display is the same as the manipulation manner for operating the operation screen of the navigation display, the manipulation efficiency for operating the operation screen of the concentrated display is enhanced similarly to that for operating the operation screen of the navigation display, and blind operation can be performed favorably, which is suitable for driver's manipulation for operating the operation section.

It is preferable that the leftward moving switch is arranged on the left side of the selection enter switch while the rightward moving switch is arranged on the right side of the selection enter switch.

With the above arrangement, operator's sense of manipulation for moving the operation menu selected point in the operation menus arranged horizontally on the operation screen agrees with the arrangement of rightward and leftward moving switches, further enhancing the operability and facilitating blind manipulation.

Preferably, the first operation section is mounted at a steering wheel.

As described above, this information display system exhibits high operability and enables favorable blind manipulation, which means that the first operation section serves as an optimum switch to be manipulated by the driver. When the first section is mounted at the steering wheel, the driver can manipulate each switch without moving his/her hands away from the steering wheel.

When the operation target of the first operation section is set to the concentrated display, the controller may move the operation menu selected point to a default point located at a substantial central part of the plurality of horizontally arranged operation menus in the display screen of the concentrated display in response to a pushing signal from the selection enter switch.

With the above arrangement, pushing the selection enter switch for operating the operation screen of the concentrated display moves the operation menu selected point to the substantial central part of the plurality of horizontally arranged operation menus.

This is advantageous in improving the operability. Because: in the case where it is desired to change settings of plural operation menus consecutively in the operation screen of the concentrated display, the number of times of manipulation is reduced when the selected point is moved to the substantial central part by pushing the selection enter switch, then is moved to a desired operation menu by pushing the rightward or leftward moving switch, rather than moving the selected point from the currently selected operation menu to a desired operation menu little by little by plural-time pushing of the rightward or leftward moving switch.

When a predetermined operation menu is selected on the concentrated display, the controller may reset information corresponding to the predetermined operation menu upon receipt of a pushing signal from the selection enter switch.

Provision of the resetting function to pushing of the selection enter switch enables necessary setting and setting change on the operation screen of the concentrated display.

The above information display system may further include a second operation section, which is provided for the in-vehicle equipment, for performing an operation on the operation screen, wherein when the controller performs control relating to the in-vehicle equipment in response to an operation signal from one of the first and second operation sections, the controller restricts the other operation section.

With the above arrangement, there are two kinds of sections of the first and second operation sections for one display, both of which can be manipulated for operating each operation screen displayed on the display.

Further, for performing control relating to in-vehicle equipment in response to manipulation of one of the first operation section or the second operation section, the controller restricts operation of the other operation section. This avoids concurrent operation of the first and second operation sections. For example, manipulation of the second operation section during manipulation of the first operation section does not change the operation of the first operation section, enhancing the operability.

The controller may not perform control corresponding to an operation signal from the other operation section until a predetermined period elapses after the receipt of the operation signal from the one operation section.

The predetermined period serves as wait time for waiting next manipulation of one of the operation sections, during which operation of the other operation section is inhibited. This simple configuration avoids concurrent operation of the first and second operation sections.

If the one operation section has a touch sensing function of detecting human touch to the one operation section, the controller may not perform control corresponding to an operation signal from the other operation section during the time when a human touches the one operation section after the receipt of the operation signal from the one operation section.

With the above arrangement, once one of the operation sections is manipulated, no control corresponding to manipulation of the other operation section is performed until the operator removes his/her hand from the one operation section. This avoids concurrent operation of the first and second operation sections further reliably.

Further, with the above arrangement, operation of the one of the operation sections is restricted even without actual manipulation of the other operation section only if the operator touches the other operation section. Therefore, for example, when the operator thinking manipulation touches one of the operation sections without manipulating the one operation section, the operation of the other operation section is not performed. In other words, hindrance to the operator trying manipulation is obviated.

In the case where the first operation section is mounted at the steering wheel, when the controller restricting operation of the second operation section receives a predetermined operation signal from the first operation section, the controller may release the restriction.

Restriction and allowance of operation of the second operation section provided for in-vehicle equipment can be exchanged according to intention of the operator who manipulates the first operation section mounted at the steering wheel. This enables relay of remaining manipulation in the process of manipulation of, for example, the first operation section to the second operation section with concurrent operation against the intention of the operator of, for example, the first operation section avoided, increasing the convenience in a device including the two kinds of sections of first and second operation sections.

When the controller performs control on the in-vehicle equipment in response to an operation signal from the first operation section, the controller may perform display control on the navigation display so as to make a passenger to recognize visually that the operation of the second operation section is restricted.

No control in response to manipulation of the second operation section is performed during the time when operation of the second operation section is restricted, which causes the operator of the second operation section to feel uncomfortable. Nevertheless, when the passenger recognizes visually that operation of the second operation section is restricted, no such uncomfortable feeling is caused.

When the controller performs control on the in-vehicle equipment in response to an operation signal from the first operation section, the controller may allow an operation menu corresponding to the operation signal to be displayed to at least an operator of the first operation section.

Though the passenger is made to recognize visually that the operation of the second operation section is restricted, the operation of the first operation section can be performed. Therefore, when the operation menus operated correspondingly to manipulation of the operator of the first operation section are displayed to at least the operator of the first operation section, the operator of the first operation section can perform switch manipulation.

The controller may make a passenger to recognize that the operation of the second operation section is restricted by differentiating an operation menu indication style when the operation of the second operation section is not restricted from an operation menu indication style when the operation of the second operation section is restricted.

Namely, the indication style notifying the operation menus being operable is set during the time when operation of the second operation section is not restricted while the indication style notifying the operation menus being inoperable is set during the time when the operation of the second operation is restricted. This enables at least the passenger who manipulates the second operation section to recognize that operation of the second operation section is restricted.

Though the indication style of the operation menus is changed, the operation menus corresponding to switching of the first operation section are displayed, so that the operator of the first operation section is left not to recognize that operation is inoperable.

The automotive information display system may have such an arrangement in which the navigation display is capable of displaying screens different from each other according to an angle of line of sight with respect to a display face thereof, and when the controller performs control on the in-vehicle equipment in response to an operation signal from the first operation section, the controller makes an operator of the second operation section to recognize that the operation of the second operation section is restricted while displaying an operation menu corresponding to the operation signal to an operator of the first operation section by differentiating a screen toward the operator of the second operation section from a screen toward the operator of the first operation section.

In the above arrangement, the screen toward the passenger who manipulates the first operation section is different from the screen toward the passenger who manipulates the second operation section. Accordingly, the operation screen corresponding to switching of the first operation section is displayed to the operator who manipulates the first operation section while the passenger who manipulates the second operation section can recognize restriction of operation of the second operation section further reliably.

The controller may store, when the operation target of the first operation section is exchanged to the concentrated display in response to a manipulation signal from the switch in the state where the operation target of the first operation section is set to the navigation display, an interrupted screen displayed on the navigation display immediately before the exchange, while allowing, when the operation target of the first operation section is exchanged thereafter from the concentrated display to the navigation display in response to a re-manipulation signal from the switch, a screen displayed on the navigation display to be selectable between an operation initial screen, which is an initial operation screen displayed first, and the stored interrupted screen.

With the above arrangement, when the operator changes, in the middle of manipulation of the first operation section for changing setting of in-vehicle equipment in the state where the operation target is set to the navigation display, the operation target from the navigation display to the concentrated display for setting the other in-vehicle equipment, then changes again the operation target from the concentrated display to the navigation display, the interrupted screen is displayed on the navigation display. Accordingly, manipulation for changing the setting which had proceeded partly can be continued again without necessitating manipulation from the beginning for changing the setting, which had done before the exchange to the concentrated display. Namely, manipulation for changing the setting can be restarted.

Further, it is possible for the operator not only to restart manipulation for changing the setting but also to select an operation initial screen, leading to presentation of a screen (the operation initial screen or the interrupted screen) according to operator's intention to the operator. As a result, the operability and the convenience are increased remarkably.

The controller may allow the navigation display to display the operation initial screen in response to the re-manipulation signal from the switch, the operation initial screen including an operation menu for transferring to the interrupted screen, while allowing the navigation display to display the interrupted screen in response to an operation signal from the first operation section which indicates selection of the operation menu for transferring to the interrupted screen.

This provides an arrangement for presenting the operation initial screen or the interrupted screen according to operator's intention. In this arrangement, the operation menu for transfer to the interrupted screen is displayed on the navigation display, promoting operator's understanding.

The above information display system may further includes a return switch for allowing the interrupting screen to be displayed, wherein the controller allows the navigation display to display the operation initial screen when the re-manipulation signal is received from the switch, and allows the navigation display to display the interrupted screen when a manipulation signal from the return switch is received in a state where the navigation display displays the operation initial screen.

This provides another arrangement for presenting the operation initial screen or the interrupted screen according to operator's intention. In this arrangement, the return switch is provided separately for displaying the interrupted screen, promoting operator's understanding. It is noted that not only the function of displaying the interrupted screen but also another function which is exhibited under a predetermined state may be assigned to the return switch. Namely, the return switch may not necessarily be an exclusive switch.

The controller may allow the navigation display to display the operation initial screen or the interrupted screen according to a re-manipulation signal from the switch, the re-manipulation signal changing according to a re-manipulation manner.

For example, the controller may allow the navigation display to display one of the operation initial screen and the interrupted screen when the switch is pushed short, while allowing it to display the other screen when the switch is pushed long.

This provides still another arrangement for presenting the operation initial screen or the interrupted screen according to operator's intention. In this arrangement, either the operation initial screen or the interrupted screen is selected according to how the switch is manipulated, which enables selection of a desired screen by one-step manipulation without requiring complicated manipulation for the operator.

The operation screen of the concentrated display may include a plurality of display regions divided for each piece of the in-vehicle equipment and each including at least one operation menu, wherein when an operation menu in an arbitrary display region is selected by manipulation of the leftward moving switch or the rightward moving switch, the controller transfers to a specific mode for keeping indication of each operation menu in a specific display region including at least the selected display region while restricting indication of each operation menu in the other display region.

"Restriction of indication of each operation menu" herein means that each of the operation menus is indicated less conspicuously relative to the other by darkening the operation menus, deleting them, or the like, as will be described later.

In the above arrangement, when an operation menu in an arbitrary display region is selected in response to manipulation of the first operation section, indication of each operation menu in a display region other than a specific display region including at least the selected display region is restricted. This reduces passenger's visual annoyance effectively in selecting an operation menu on the concentrated display. As a result, even in the case where the number of operation menus displayed on the concentrated display is large, the case where the driver driving the vehicle selects an operation menu, namely, the case where the operator must move his/her line of sight to the concentrated display within a very short period of time, and the like, easy and proper manipulation for operating desired in-vehicle equipment can be performed.

Under the specific mode, each operation menu in the specific display region including at least the selected display region may remain displayed while each operation menu in the other display region is deleted.

This reduces passenger's visual annoyance effectively in selecting an operation menu on the concentrated display.

The automotive information display system may have such an arrangement in which the number of the display regions included in the operation screen of the concentrated display is three or larger, the controller moves the operation menu selected point leftward or rightward in response to a manipulation signal from the leftward moving switch or the rightward moving switch, and under the specific mode, indication of each operation menu in each display region located on a side opposite a direction in which the operation menu selected point is moved from the selected display region by manipulation of the leftward moving switch or the rightward moving switch is restricted.

In the above arrangement, each operation menu in the display region located in the same direction as the direction in which the operation menu is selected, namely, only each operation menu in a display region that can be an operation target is made conspicuous, resulting in effective improvement on operability of the automotive information display system.

Under the specific mode, display of each operation menu in every display region other than the selected display region may be restricted.

Since only each operation menu in a currently selected display region is conspicuous, the automotive information display system is improved on operability.

The controller may allow a cursor to be indicated on the concentrated display and may move the cursor leftward or rightward in response to a manipulation signal from the leftward moving switch or the rightward moving switch.

This enables easy selection of an operation menu on the concentrated display with the use of the cursor that moves according to manipulation of the first operation section.

In this case, the default point of the cursor is preferably set at a boundary part of adjacent two display regions.

The boundary part of a plurality of display regions on the concentrated display is a part where any operation menu in any display regions is not selected. Therefore, when the boundary part is set as the default point of the cursor, the concentrated display can be maintained to the normal mode under which indication of the operation menus is not restricted in normal time while being set to the specific mode under which indication of the operation menus is restricted only when a specific operation menu is selected. Accordingly, proper setting between the normal mode and the specific mode can be enabled for the concentrated display.

When the controller receives a predetermined one-time operation signal from the first operation section with the cursor located away from the default point, the controller may move the cursor to the default point.

With the above arrangement, even if the cursor specifies an operation menu apart from the default point, one-step manipulation of the first operation section returns the cursor to the default point, improving the operability.

When the first operation section is not manipulated for a predetermined period with an arbitrary operation menu specified by the cursor, the controller may return the cursor to the default point.

With the arrangement in which the cursor is returned to the default point automatically according to a lapse of time, the cursor is returned to the default point automatically even if the passenger forgets manipulation for returning the cursor to the default point, leading to enhanced usability.

The controller may allow the cursor to flash during the time when an arbitrary operation menu is specified by the cursor and may increase a flashing frequency of the cursor in proportion to an increase in vehicle speed.

If the cursor flashes with an arbitrary operation menu specified, the cursor becomes conspicuous, so that the passenger can easily recognize the currently selected operation menu. In order not to increase a visual burden, a flashing frequency of the cursor is preferably set not so high.

Wherein, if the flashing frequency of the cursor is set constant regardless of the vehicle speed, the driver might overlook the cursor especially in high speed running. In detail, for selecting an operation menu in high speed running, the driver must move his/her line of sight to the concentrated display for a very short period of time. Therefore, timing of driver's glancing at the concentrated display may overlap with the time that the cursor lights out, which disables the driver to recognize the cursor.

For tackling this problem, the flashing frequency of the cursor is increased in proportion to an increase in vehicle speed. Hence, driver's visual burden is reduced by decreasing the flashing frequency of the cursor in low speed running where possibility that the driver would overlook the cursor is low while the driver can recognize the cursor reliably by increasing the flashing frequency of the cursor in high speed running where possibility that the driver would overlook the cursor is high.

The automotive information display system may have such an arrangement in which the operation screen of the concentrated display includes a plurality of display regions divided for each piece of the in-vehicle equipment and each including at least one operation menu, and the controller ON/OFF operates at least one piece of the plural pieces of in-vehicle equipment in response to an operation signal from the first operation section; allows, upon receipt of an OFF operation signal from the first operation section, an OFF lamp to light up in a display region of the concentrated display corresponding to the OFF-operated in-vehicle equipment, and then allows it to light out thereafter, the OFF lamp indicating that the OFF-operated in-vehicle equipment is in an OFF state; and allows the OFF lamp to light up again when an operation signal is received from the first operation section in lighting out of the OFF lamp.

"The OFF lamp indicating that in-vehicle equipment is in the OFF state" herein may have any indication style only if the passenger can understand that the in-vehicle equipment is in the OFF state. For example, various sign indication such as "— (horizontal bar)" and the like are included besides the character indication of "OFF."

In above arrangement, the OFF lamp indicating that the OFF-operated in-vehicle equipment is in the OFF state lights up once in the display region corresponding to the OFF-operated in-vehicle equipment then, lights out. This eliminates visual annoyance caused due to continued lighting up of the operation menu relating to the unused in-vehicle equipment. Further, when the first operation section is manipulated in lighting out of the OFF lamp, the OFF lamp lights up again so that the passenger identifies the relighting OFF lamp as assistance in second-time manipulation for turning on the OFF-operated in-vehicle equipment, improving the operability. As a result, visual annoyance caused due to continued lighting up of the OFF lamp is eliminated, and the operability in second-time manipulation for turning on the OFF-operated in-vehicle equipment is ensured.

The controller may allow the lighting-out OFF lamp to light up again upon receipt of an operation signal for selecting an operation menu relating to the OFF-operated in-vehicle equipment.

In the case where the OFF lamp lights up again only upon selection of any operation menu relating to the OFF-operated in-vehicle equipment, the OFF lamp can light up again appropriately in response to passenger's selection of an operation menu for turning on again the in-vehicle equipment once OFF-operated.

In this case, it is preferable that the controller allows a cursor to be indicated on the concentrated display and moves the cursor leftward or rightward in response to a manipulation signal from the leftward moving switch or the rightward moving switch and that a default point of the cursor is set at a part adjacent to a display region corresponding to the ON/OFF-operated in-vehicle equipment.

When the default point of the cursor is set at a part adjacent to the display region corresponding to the ON/OFF operated in-vehicle equipment, the operability in second-time manipulation for turning on the in-vehicle equipment once OFF operated is improved. In detail, one-time manipulation of the cursor can move the cursor from the default point to the display region corresponding to the OFF-operated in-vehicle equipment, namely, an operation menu relating to the OFF-operated in-vehicle equipment can be selected immediately, leading to quick relighting of the OFF lamp in the corresponding display region. Hence, the operator can turn on the OFF-operated in-vehicle equipment again readily while confirming the OFF lamp.

The ON/OFF-operated in-vehicle equipment may be an audio device, wherein a display region in the concentrated display which corresponds to the audio device includes an audio source as one operation menu, and the controller changes indication relating to the audio source to the OFF lamp according to an operation signal from the first operation section.

The content of the operation menu relating to the audio source can be changed to the OFF lamp, so that the ON/OFF operation of the audio can be performed as part of operation for changing the audio sources which is the most significant operation menu relating to the audio. Thus, the ON/OFF operation of the audio can be preformed smoothly.

When a predetermined period elapses with the OFF lamp relating to the audio source kept indicated, the controller may turn off the audio device actually.

When the audio is actually set in the OFF state only after the predetermined period elapses with the operation menu relating to the audio source changed to the OFF lamp, frequent occurrence of a situation is prevented where the audio is turned on or off against the operator's intention in the process of changing the audio sources. This prevents the passenger to feel uncomfortable in such a situation.

The controller may allow, when the operation target of the first operation section is set to either the navigation display or the concentrated display, the navigation display to display a map screen which includes road map information and is scrollable by manipulation of the first operation section, and may change, upon receipt of a manipulation signal from the switch, an indication style of the map screen displayed on the navigation display in association with exchange of the operation target of the first operation section between the navigation display and the concentrated display so as to make an operator to identify to which of the navigation display and the concentrated display the operation target is set.

With the above arrangement, the map screen is displayed on the navigation display even when the operation target of the first operation section is set to the concentrated display, so that the road map information can be acquired from the map screen, enhancing the usability.

When the map screen is displayed on the navigation display regardless of whether the operation target of the first operation section is set to the navigation display or the concentrated display, the operator scrolling the map screen cannot identify to which display the operation target is set, leading to mis-manipulation on illusion.

In the above arrangement, however, the indication style of the map screen when the operation target is set to the concentrated display is differentiated from that when the operation target is set to the navigation display so that the operator can identify to which display the operation target is set, preventing mis-manipulation on illusion reliably.

In this case, a scheme for differentiating the indication styles of the map screens is not limited specifically. For example, color or intensity may be changed. Alternatively, an additional mark may be indicated in the map screen displayed on the navigation display when the operation target of the first operation section is set to the concentrated display.

Preferably the most, the controller allows an additional mark to be indicated on the map screen displayed on the navigation display when the operation target of the first operation section is set to the navigation display.

With the above arrangement, the operator visually recognizes the additional mark indicated on the navigation display, leading to ensured recognition that the operation target of the first operation section is set to the navigation display. Further, the additional mark is indicated when the operation target of the first operation section is set to the navigation display, the map screen of which the operator gazes at usually for scrolling. Therefore, comparatively large indication of the additional mark in the map screen involves less hindrance in acquiring the road map information. While, the additional mark is not indicated on the navigation display when the operation target of the first operation section is set to the concentrated display, leading to comparatively smooth acquisition of the road map information to enhance the convenience.

The additional mark may be a direction mark indicating a scrollable direction. Alternatively, the additional mark may be a range mark including at least one circle or arc of which center is a specific point in the road map information.

Linking the additional mark to scroll operation or to the road map information for matching the additional mark to the map screen can prevent effectively the additional mark to be obtrusive and can make the operator to recognize a scrollable direction, a distance from the specific point, and the like, enhancing the convenience.

The controller may be capable of allowing the navigation display to display any one of map screens of which indication styles are different from each other while changing the additional mark according to a currently set display style.

With the above arrangement, the additional mark can be indicated appropriately according to the indication style of the map screen, enhancing the convenience.

The controller may allows the navigation display to display a map screen scrollable by manipulation of the first operation section when a specific operation menu is selected in an operation screen including an operation menu for operating a navigation device, and may allow the navigation display to display the scrollable map screen immediately without displaying the operation screen including the operation menu for operating the navigation device, and may exchange the operation target of the first operation section to the navigation display when a predetermined operation signal is received from the first operation section in a state where the operation target of the first operation section is set to the concentrated display.

When the operation target of the first operation section is set to the concentrated display, the scrollable map screen can be displayed directly by predetermined manipulation of the first operation section without the operation screen displayed, enhancing the operability.

According to another aspect of the present invention, an automotive information display system includes: a main display for displaying, as an operation screen for operating at least one piece of in-vehicle equipment, an operation screen in which a plurality of horizontally arranged first hierarchy operation menus are indicated and which indicates, upon selection of any one of the plurality of first hierarchy operation menus, vertically arranged second hierarchy operation menus belonging to the selected first hierarchy operation menu; a concentrated display for displaying an operation screen in which horizontally arranged operation menus indicating respective pieces of information on respective plural pieces of independent in-vehicle equipment are indicated; an operation section including: a leftward moving switch to which a function of moving an operation menu selected point leftward on each operation screen of the main display and the concentrated display is assigned; a rightward moving switch to which a function of moving the operation menu selected point rightward thereon is assigned; a selection enter switch capable of being manipulated upward and downward and being pushed; and a switch for exchanging a display operation target between the main display and the concentrated display; and a controller, which receives an operation signal from the operation section, for performing display control on the main display and the concentrated display, wherein when the display operation target is set to the main display, the controller changes a position of the operation menu selected point in the first hierarchy operation menus arranged horizontally on the operation screen of the main display in response to a manipulation signal from the leftward moving switch or the rightward moving switch, changes the position of the operation menu selected point in the second hierarchy operation menus arranged vertically thereon for selecting a second hierarchy operation menu therefrom in response to an upward or downward manipulation signal from the selection enter switch, and enters the selected second hierarchy operation menu in response to a pushing signal from the selection enter switch, and when the display operation target is set to the concentrated display, the controller changes the position of the operation menu selected point in the operation menus arranged horizontally on the operation screen of the concentrated display for selecting an operation menu therefrom in response to a manipulation signal from the leftward moving switch or the rightward moving switch, and changes setting of information corresponding to the selected operation menu in response to upward or downward manipulation signal from the selection enter switch.

In the above system, the leftward moving switch is arranged on the left side of the selection enter switch while the rightward moving switch is arranged on the right side of the selection enter switch.

According to still another aspect of the present invention, an automotive information display system includes: a main display for displaying, as an operation screen for operating at least one piece of in-vehicle equipment, an operation screen in which a plurality of horizontally arranged first hierarchy operation menus are indicated and which indicates, upon selection of any one of the plurality of first hierarchy operation menus, vertically arranged second hierarchy operation menus belonging to the selected first hierarchy operation menu; a concentrated display for displaying an operation screen in which horizontally arranged operation menus indicating respective pieces of information on respective plural pieces of independent in-vehicle equipment are indicated; an operation section including: a leftward moving switch to which a function of moving an operation menu selected point leftward on each operation screen of the main display and the concentrated display is assigned; a rightward moving switch to which a function of moving the operation menu selected point rightward thereon is assigned; a selection enter switch capable of being manipulated upward and downward and being pushed; and a switch for exchanging a display operation target between the main display and the concentrated display; and a controller, which receives an operation signal from the operation section, for performing display control on the main display and the concentrated display, wherein when the display operation target is set to the main display, the controller changes a position of the operation menu selected point in the first hierarchy operation menus arranged horizontally on the operation screen of the main display in response to a manipulation signal from the leftward moving switch or the rightward moving switch, changes the position of the operation menu selected point in the second hierarchy operation menus arranged vertically thereon for selecting a second hierarchy operation menu therefrom in response to an upward or downward manipulation signal from the selection enter switch, and enters the selected second hierarchy operation menu in response to a pushing signal from the selection enter switch, and when the display operation target is set to the concentrated display, the controller changes the position of the operation menu selected point in the operation menus arranged horizontally on the operation screen of the concentrated display for selecting an operation menu therefrom in response to a manipulation signal from the leftward moving switch or the rightward moving switch, and changes setting of information corresponding to the selected operation menu in response to upward or downward manipulation signal from the selection enter switch.

In the above system, the operation section is mounted at a steering wheel.

BRIEF DESCRIPTION OF THE DRAWINGS

FIG. 12A and FIG. 12B are illustration showing screen transition for explaining display control of the main display under the concurrent operation avoiding control.

FIG. 21 is a flowchart subsequent to the flow of FIG. 20 and shows control for exchanging an operation target of the steering switch.

FIG. 22 is a flowchart subsequent to the flow of FIG. 20 and shows another control for exchanging the operation target of the steering switch.

FIG. 23 is a flowchart subsequent to the flow of FIG. 20 and shows still another control for exchanging the operation target of the steering switch.

FIG. 29 is a flowchart depicting a first half of a control operation of the concentrated display in response to manipulation for turning off the audio device.

PREFERRED EMBODIMENTS OF THE PRESENT INVENTION

An embodiment of the present invention will be described below in detail with reference to the accompanying drawings.

Figure 1:
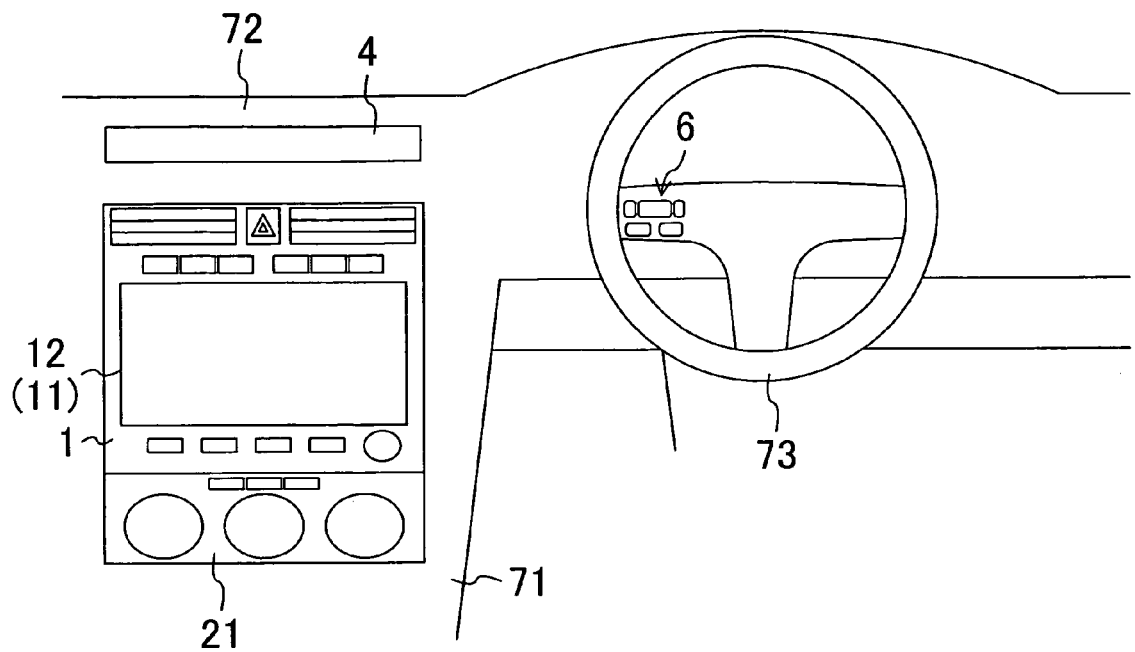
FIG. 1 is an illustration showing the inside of a cabin in which an automotive information display system according to an embodiment of the present invention is boarded.
Figure 2:
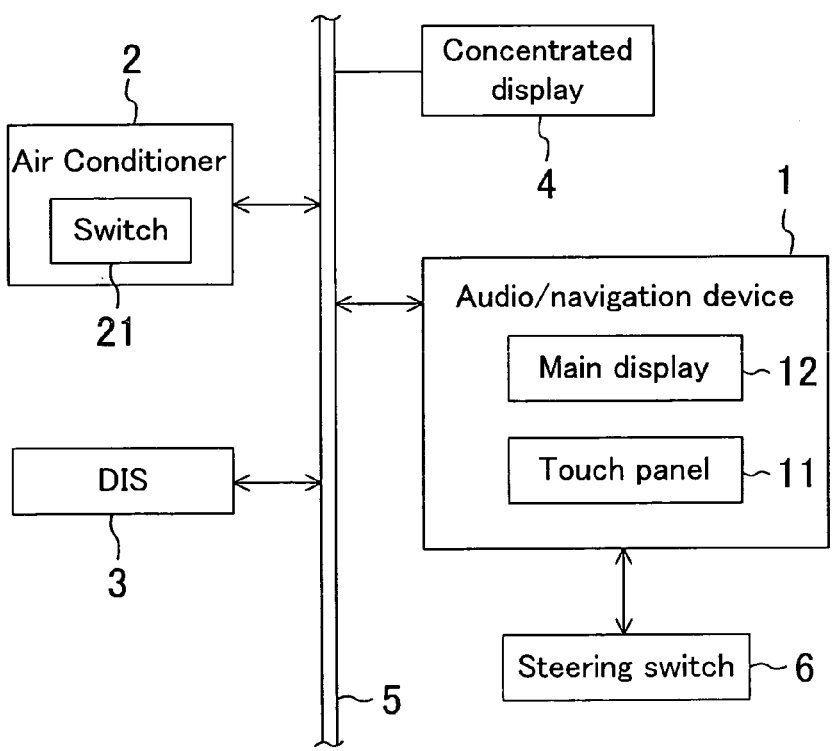
FIG. 2 is a block diagram showing the constitution of the information display system.

FIG. 1 and FIG. 2 show an automotive information display system according to the present embodiment, wherein this device includes: an audio/navigation device 1 (hereinafter it may be referred merely to as an audio device 1 or a navigation device 1) into which an audio device and a navigation device are integrated; an air conditioner 2 for performing air conditioning in a cabin; a DIS (Driver Information System) 3 for presenting various kinds of information to the passenger; and a concentrated display 4 for indicating information relating to each of the in-vehicle equipment of the audio device 1, the air conditioner 2, and the DIS 3. The devices 1 to 4 are connected to each other via a CAN (car Area Network) 5.

The audio/navigation device 1 includes, as the audio device, audio sources of a CD having a changer function, an FM radio, an AM radio, and HDD and includes, as the navigation device, map data and the like for presenting route guides to the vehicle with the use of a GPS (Global Positioning System).

The audio/navigation device 1 further includes a touch panel type flat panel display (hereinafter referred to as a main display 12) in combination of a touch panel 11 and a liquid crystal display device, and the main display 12 is arranged substantially at the center in vertical direction of a center panel 71.

Figure 6:
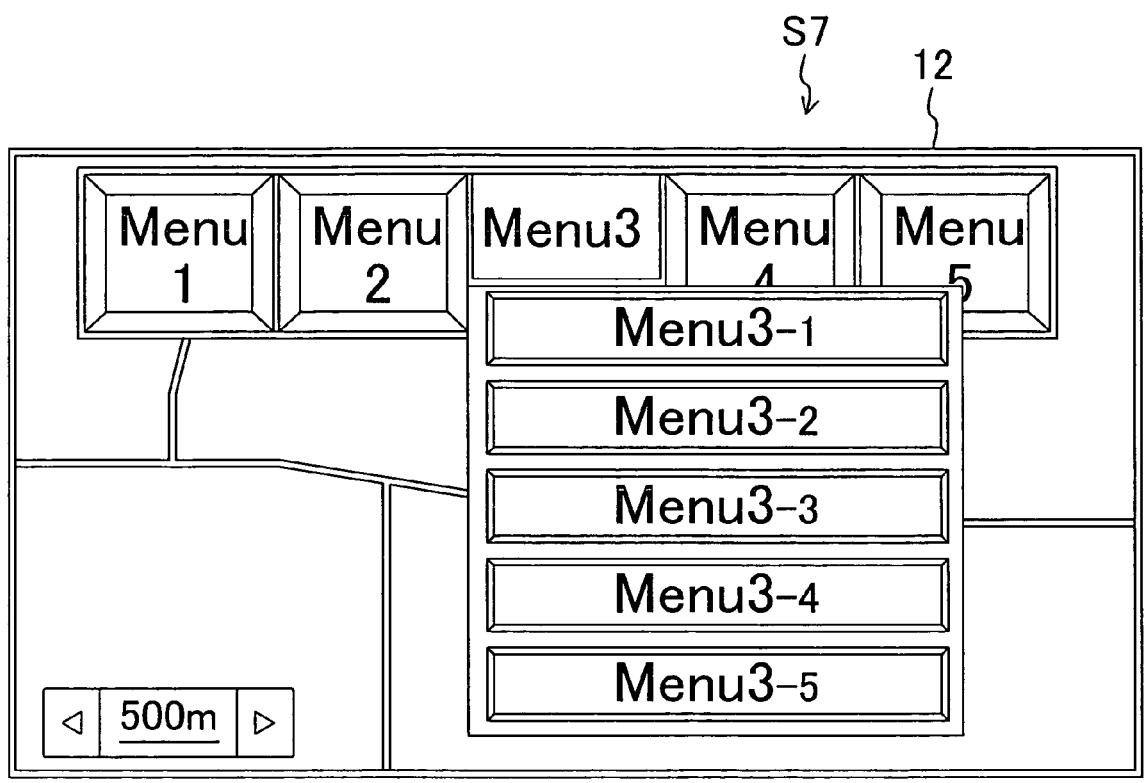
FIG. 6 shows one example of a screen displayed on a main display.

The main display 12 displays, similarly to a display of a general audio/navigation device, a map, an operation screen to be manipulated for changing setting of the navigation device or the audio device, or the like (see FIG. 6).

The air conditioner 2 includes an air condition operation switch 21 to be manipulated for changing setting of the air conditioner 2. The air condition operation switch 21 for the air conditioner 2 is arranged below the main display 12 in the center panel 71.

The concentrated display 4 is arranged substantially at the center in the widthwise direction of the vehicle of a dash panel 72 and is located above the main display 12.

The concentrated display 4 is composed of a LED display having an oblong rectangular shape (longer in the widthwise direction of the vehicle), and is exchanged between an information display mode where information on the in-vehicle equipment of the audio device 1, the air conditioner 2, and the DIS 3 is indicated and an operation mode where an operation screen to be manipulated for changing respective settings of the audio device 1, the air conditioner 2, and the DIS 3 is indicated.

Description will be given here with reference to FIG. 5 to an indication style (an information display screen) in the information display mode of the concentrated display 4. This information display screen includes an audio display region arranged substantially at the central region in the transverse direction for indicating information on the audio device 1, an air condition display region arranged on the left side of the audio display region for indicating information on the air conditioner 2, and a DIS display region arranged on the right side thereof for indicating information on the DIS 3.

In the air condition display region, there are indicated left seat temperature setting information, flow rate setting information, blow port setting information, and right seat temperature setting information in this order from the left to the right.

In the audio display region, there are indicated audio source information, first area information, second area information, and third area information in this order from the left to the right. Wherein, the first to third area information are changed in their contents according to a selected audio source. For example, as shown in FIG. 5, when "CD" is selected as the audio source, the first area, the second area, and the third area indicate CD number information, track number information, and elapsing time information, respectively. Though not shown, when "(FM or AM) radio" is selected as the audio source, the first area indicates channel information (when preset), and the third area indicates frequency information with nothing indicated in the second area.

The DIS display region indicates any one of time information, average vehicle speed information, travelable distance information, instantaneous fuel consumption information, and average fuel consumption information according to setting, which will be described later.

As described above, the audio/navigation device 1 includes the touch panel type main display 12, and therefore, setting of the audio/navigation device 1 can be changed by manipulating the touch panel. Similarly, the air conditioner 2 includes the air conditioner operation switch 21, so that setting of the air conditioner 2 can be changed by manipulating the switch 21.

Besides the touch panel 11 and the air conditioner operation switch 21 (hereinafter referred to collectively as an in-vehicle equipment side switch), the information display system includes an operation switch for changing settings of the audio/navigation device 1, the air conditioner 2, and the DIS 3. The operation switch performs an operation on operation screens displayed on the concentrated display 4 and the main display 12. As shown in FIG. 1, this operation switch is mounted at a steering wheel 73 as a switch (steering switch 6)

to be manipulated by driver's left thumb. The steering switch 6 is connected to the audio/navigation device 1 as shown in FIG. 2.

Figure 3:
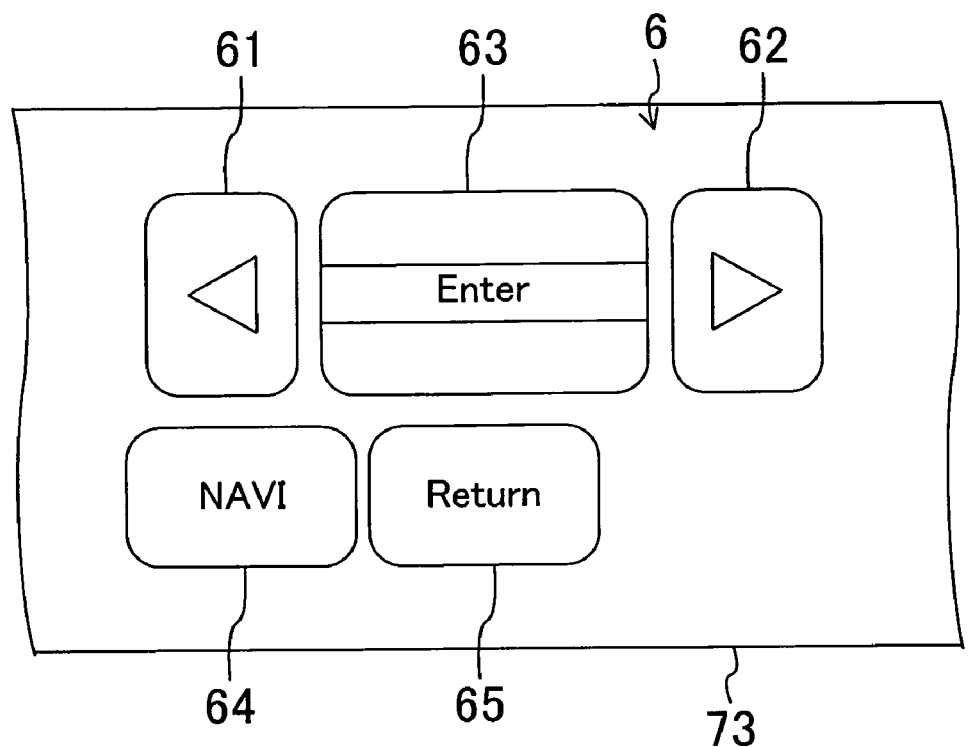
FIG. 3 is a front view of a steering switch.

The steering switch 6 includes, as shown in FIG. 3, a leftward moving switch 61 for moving a selected point leftward on the operation screen, a rightward moving switch 62 for moving the selected point rightward thereon, and a selection enter switch 63 for moving the selected point upward and downward (or for changing settings on the operation screen of the concentrated display 4) and for entering a selected menu.

Figure 4:
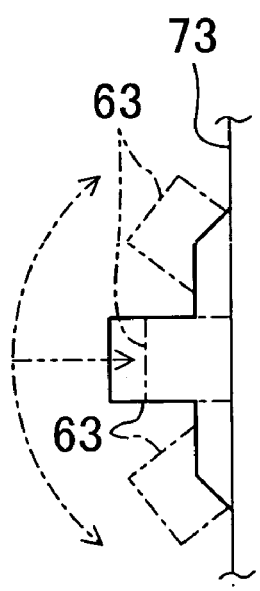
FIG. 4 is a side view for explaining an operation of a selection enter switch.

The leftward moving switch 61 and the rightward moving switch 62 are push buttons while the selection enter switch 63 is, as shown in FIG. 4, a toggle switch which is set at a neutral position (see the solid line) during normal time (non-operation time), is capable of being manipulated upward and downward from the neutral position, and is capable of being pushed at the neutral position. Upward and downward manipulation of the selection enter switch 63 moves the selected point upward and downward on the operation screen, and pushing of the selection enter switch 63 results in enter of a selected menu.

The leftward moving switch 61 and the rightward moving switch 62 are arranged left and right, respectively, with respect to the selection enter switch 63, and accordingly, the selection enter switch 63 is located between the leftward moving switch 61 and the rightward moving switch 62. The selection enter switch 63 as a toggle switch protrudes toward the driver more than the leftward and rightward moving switches 61, 62 as push switches.

The steering switch 6 further includes a NAVI switch 64 as a push switch and a return switch 65 as a push switch. The NAVI switch 64 and the return switch 65 are arranged horizontally below the switches 61 to 63.

The NAVI switch 64 is provided for exchanging an operation target of the steering switch 6 between the concentrated display 4 and the main display 12. The return switch 65 is provided for being manipulated mainly for returning a currently displaying screen to one-step previously displayed screen in the operation screen of the main display 12.

In the information display system, the audio/navigation device 1 functions as a controller and includes various kinds of interfaces, memories, a CPU, and the like for realizing the function. Upon manipulation of the steering switch 6 for changing setting of the audio device 1, the air conditioner 2, or the DIS 3, the audio/navigation device 1 outputs a corresponding signal to a CAN 5. The air conditioner 2 and the DIS 3 perform control according to the CAN signals. The concentrated display 4 performs display in response to the CAN signal from the device 1, 2, or 3. Upon manipulation of the steering switch 6 for changing setting of the audio device, the audio/navigation device 1 performs control according to a manipulation signal from the steering switch 6.

Figure 7:
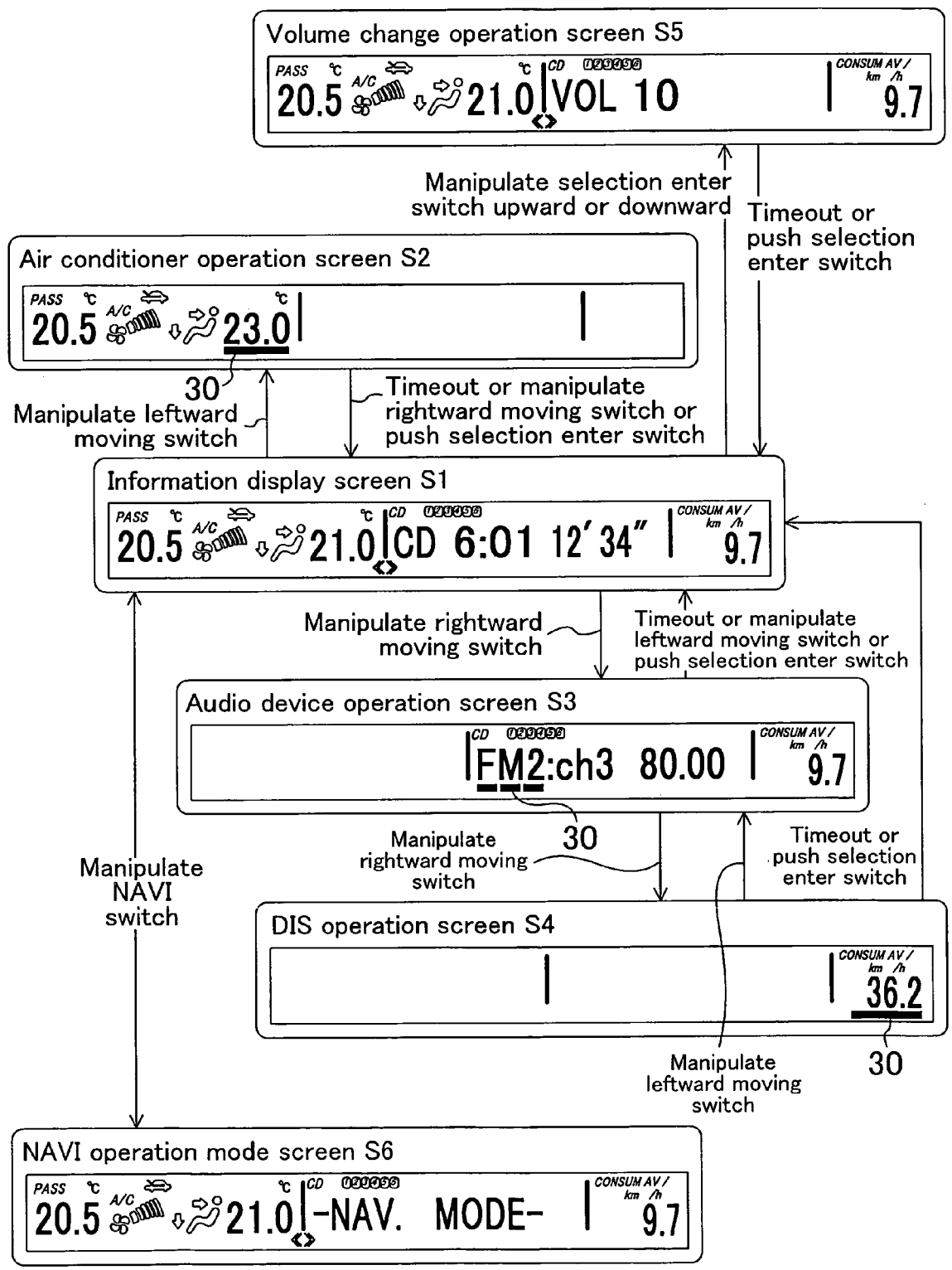
FIG. 7 is an illustration for explaining screen transition in the concentrated display.

Description will be given next with reference to FIG. 7 to screen transition in the concentrated display 4 in response to manipulation of the steering switch 6.

Figure 5:
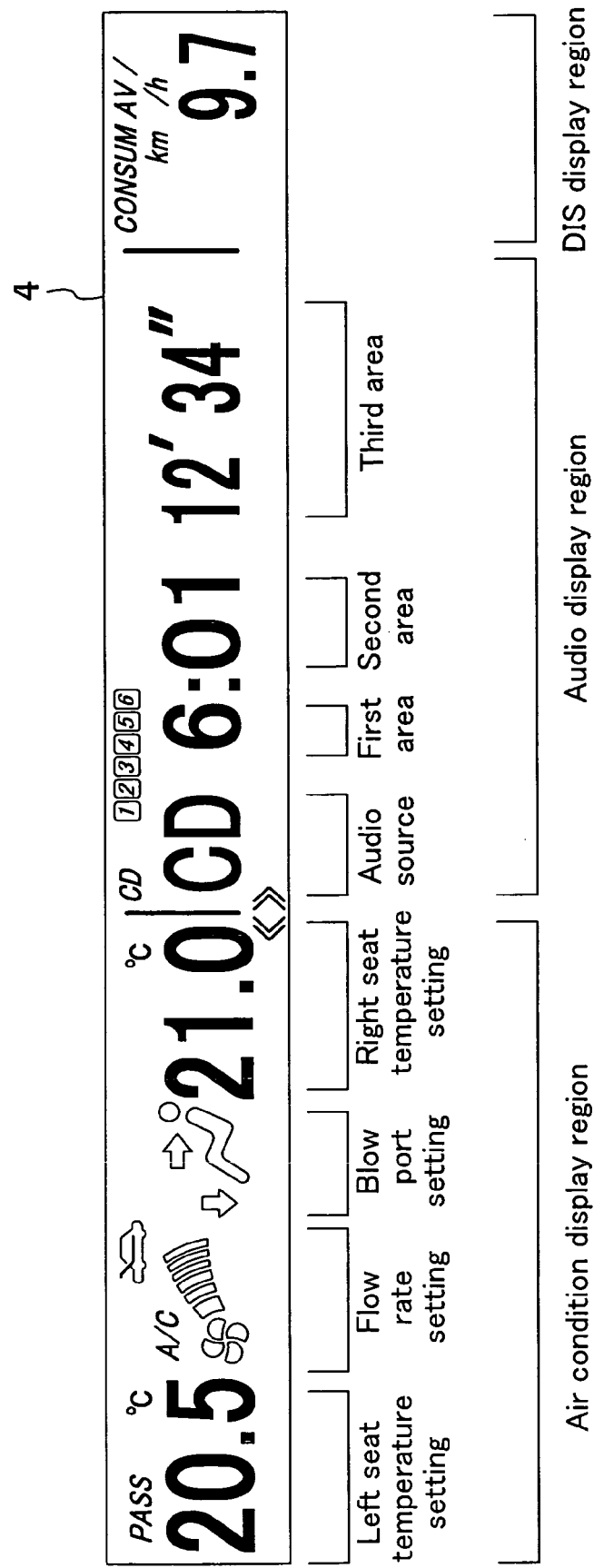
FIG. 5 shows one example of an information display screen displayed on a concentrated display.

The concentrated display 4 is set to the information display mode in normal time so as to display an information display screen S1 (see FIG. 5). A cursor (a selected point) 30 is set at a substantial central part of information (operation menus) arranged horizontally in the information display screen S1, which is a default point of the cursor 30.

When the leftward moving switch 61 of the steering switch 6 is manipulated, the cursor 30 is moved leftward from the default point in the information display screen S1 so that the concentrated display 4 is set to the operation mode to display an air conditioner operation screen S2.

As well, when the rightward moving switch 62 of the steering switch 6 is manipulated, the cursor 30 is moved rightward from the default point in the information display screen S1 so that the concentrated display 4 is set to the operation mode to display an audio device operation screen S3.

When the rightward moving switch 62 is manipulated to move the cursor 30 further rightward in the audio device operation screen S3, the concentrated display 4 displays a DIS screen S4.

When the selection enter switch 63 is manipulated upward or downward in the information display screen S1, the concentrated display 4 is set to the operation mode to display a volume change operation screen S5 as one of operation screens for the audio device 1.

The air conditioner operation screen S2 is changed to the information display screen S1 when a predetermined period elapses (timeout), by moving the cursor 30 to the default point by manipulating the rightward moving switch 62, or by pushing the selection enter switch 63 (enter).

Similarly, the audio device operation screen S3 or the DIS operation screen S4 is changed to the information display screen S1 when the predetermined period elapses (timeout), by moving the cursor 30 to the default point by manipulating the leftward moving switch 61, or by pushing the selection enter switch 63 (enter).

Further, the volume change operation screen S5 is changed to the information display screen S1 when the predetermined period elapses or by pushing the selection enter switch 63 (enter).

When the NAVI switch 64 is manipulated, the operation target of the steering switch 6 is exchanged from the concentrated display 4 to the main display 12 so that the audio display region of the concentrated display 4 indicates "NAV. MODE" for indicating that the operation target of the steering switch 6 is set to the main display 12 (a NAVI operation mode screen S6). When the NAVI switch 64 is manipulated again in this state, the operation target of the steering switch 6 is exchanged from the main display 12 to the concentrated display 12.

Description will be given next with reference to FIG. 8 and FIG. 9 to manipulation for changing settings in the operation screen of the concentrated display 4 by exemplifying the air conditioner operation screen S2 and the DIS operation screen S4.

First, manipulation for changing settings in the air conditioner operation screen S2 will be described with reference to FIG. 8. In the air conditioner operation screen S2, there are indicated a left seat temperature setting menu, a flow rate setting menu, a blow port setting menu, and a right seat temperature setting menu in this order from the left to the right. This is the same as the information display screen S1 in which plural pieces of information for settings are arranged horizontally.

Figure 8:
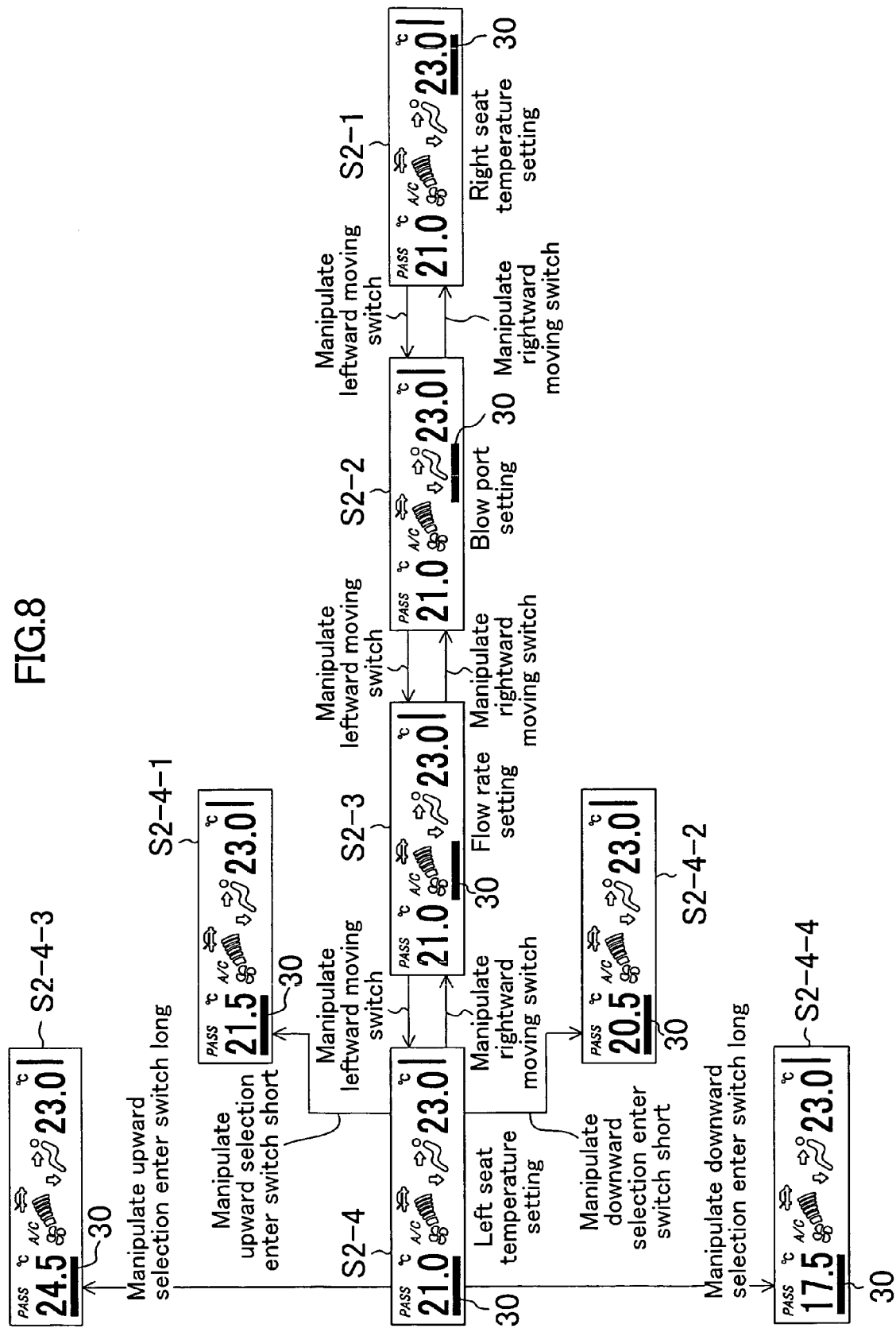
FIG. 8 is an illustration for explaining transition of an air conditioner operation screen on the concentrated display.
Figure 9:
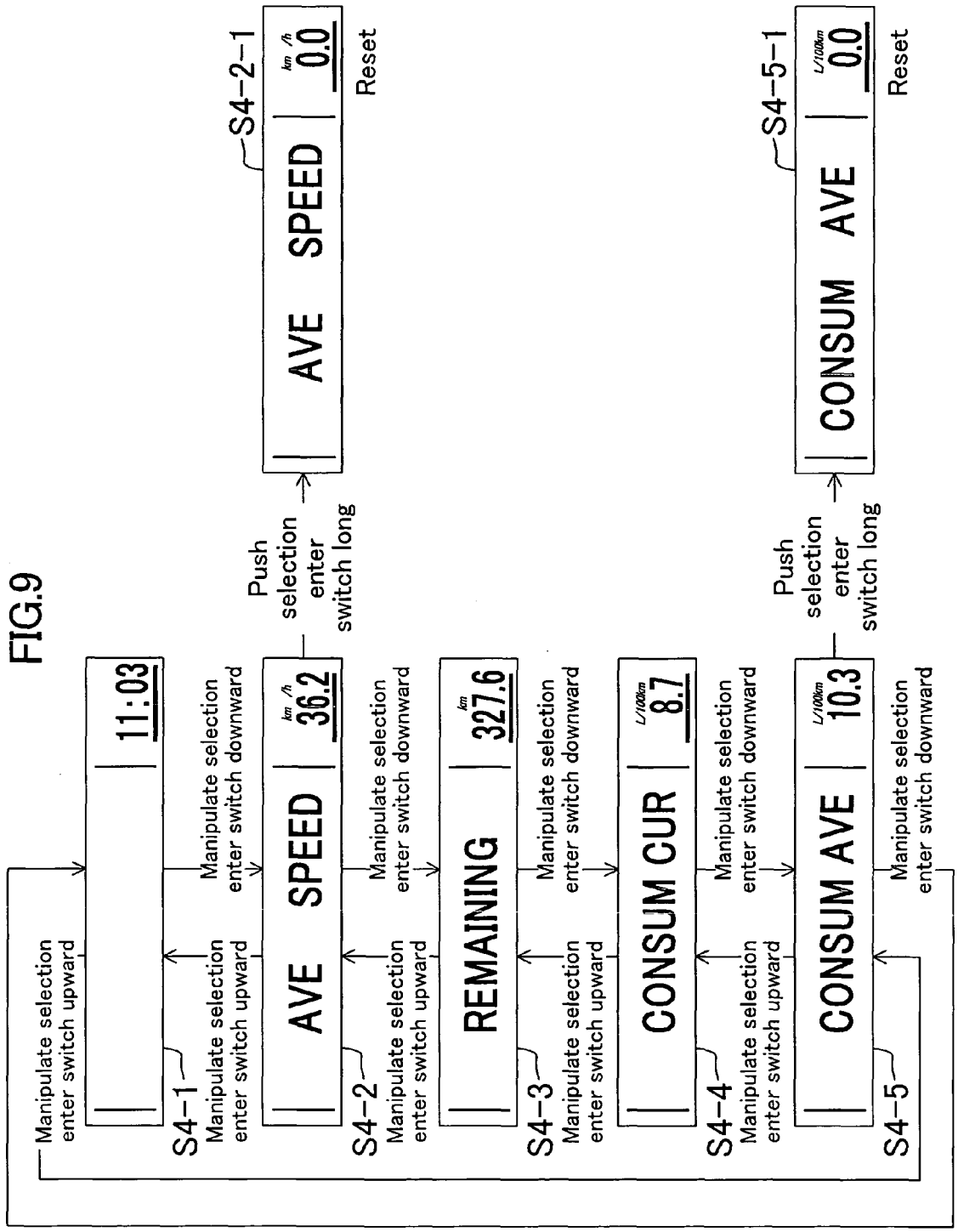
FIG. 9 is an illustration for explaining transition of a DIS operation screen on the concentrated display.

The cursor 30 is moved by manipulating the leftward moving switch 61 from the right seat temperature setting menu to the blow port setting menu, to the flow rate setting menu, then to the left seat temperature setting menu (S2-1, S2-2, S2-3, and S2-4 in FIG. 8). The driver manipulates the leftward or rightward moving switch 61 or 62 to move the cursor 30 to a menu of which setting is to be changed.

After the cursor 30 is moved to the desired menu, the selection enter switch 63 is manipulated upward or downward to change the setting of information corresponding to the selected menu. For example, in the state where the left seat temperature setting menu is selected, upward manipulation of the selection enter switch 63 raises the set temperature of the left seat while downward manipulation thereof lowers the set temperature thereof.

Each of upward and downward manipulation includes two kinds of manipulation of: "short pushing" of shifting the switch 63 and immediately returning it to the neural position; and "long pushing" of keeping the switch 63 shifted. Short pushing with respect to the left seat temperature setting menu changes the set temperature by a changeable minimum unit (0.5° C., for example) (S2-4-1 and S2-4-2). In contrast, long pushing with respect thereto changes the set temperature by a predetermined change rate (X ° C./sec) (S2-4-3 and S2-4-4).

In the left seat temperature setting menu, the upper and lower limits of the set temperature are set, and therefore, the set temperature cannot be set over the upper or lower limits even by continuation of upward or downward manipulation (a turn-back configuration).

Though manipulation for changing setting is described by exemplifying the left seat temperature setting menu, the same is applied to manipulation for changing settings of the flow rate setting menu and the right seat temperature setting menu. For example, in the flow rate setting menu, short upward or downward manipulation increases or decreases the flow rate one stage, and long upward or downward manipulation increases or decreases the flow rate by one stage/X sec.

Further, in the blow port setting menu, downward manipulation sets the direction of the blow port from "foot" to "foot/face," to "face," to "defroster," and then to "defroster/foot" (upward pushing sets it in the reverse sequence). Continuation of upward or downward manipulation changes the direction of the blow port repeatedly (a cyclical configuration).

Next, manipulation for chaining settings in the DIS operation screen S4 will be described with reference to FIG. 9. When the driver manipulates the rightward moving switch 62 to display the DIS operation screen S4 on the concentrated display 4, a currently set content (for example, AVE SPEED (average vehicle speed) or the like) of the DIS information is indicated in the audio display region.

Upward or downward manipulation of the selection enter switch 63 in this state changes setting of the menu. Specifically, the setting of DIS indication is changed from "time indication" to "average vehicle speed indication," to "travelable distance indication," to "instantaneous fuel consumption indication," then to "average fuel consumption indication" (S4-1, S4-2, S4-3, S4-4, and S4-5). In the DIS operation screen S4, the operation menus are indicated cyclically.

Manipulation (long pushing) of the selection enter switch 63 with "average vehicle speed" or "average fuel consumption" indicated resets the average vehicle speed or the average fuel consumption (S4-2-1 and S4-5-1).

Though not shown, the manipulation for changing settings in the audio device operation screen S3 is similar to the manipulation for changing settings in the air conditioner operation screen S2 and in the DIS operation screen S4. Specifically, the audio device operation screen S3 includes an audio source operation menu, in which upward or downward manipulation of the selection enter switch 63 changes the audio source from "FM radio" to "AM radio," to "CD," to "HDD," then to "OFF" cyclically.

In the state where CD is selected as the audio source, when the selection enter switch 63 is manipulated upward or downward, a CD is changed (change in CD set in the changer) in the first area (a CD number operation menu) or a to-be-replayed track is changed in the second area (a track operation menu). They are in cyclic configurations. Short upward or downward pushing causes increment or decrement of a CD or a track one by one while long upward or downward pushing causes increment or decrement of a CD or a track by X/sec.

Upward or downward manipulation of the selection enter switch 63 with the radio selected as the audio source changes the channel or the frequency (short pushing) or performs retrieval (long pushing) in the first area (a channel operation menu) or the third area (a frequency operation menu). They are in a cyclic configuration.

As described above, for upward and downward manipulation and pushing of the selection enter switch 63, different functions are assigned between short pushing and long pushing according to a case.

Manipulation for changing setting in the operation screen of the main display 12 will be described next with reference to FIG. 6.

As described above, pushing the NAVI switch 64 of the steering switch 6 exchanges the operation target of the steering switch 6 from the concentrated display 4 to the main display 12 so that the main display 12 displays an operation screen S7 shown in FIG. 6.

This operation screen S7 is a combination of first hierarchy operation menus (menu 1 to menu 5) arranged horizontally and second hierarchy operation menus (menu 3-1 to menu 3-5 in FIG. 6) developed and displayed (displayed in a pull-down style) upon selection of any one of the first hierarchy operation menus.

First, when the driver manipulates the leftward or rightward moving switch 61 or 62, the selected point of the first hierarchy operation menus is moved left or right. During the time when one of the first hierarchy operation menus is selected, the second hierarchy operation menus (the menu 3-1 to the menu 3-5) belonging to the selected first hierarchy operation menu are displayed in the pull-down style. When the second hierarchy operation menus are displayed in this way, a button icon of the selected first hierarchy operation menu is contracted (the button icon of the menu 3 is contracted in FIG. 6), thereby displaying the second hierarchy operation menus largely. This improves viewability.

Upward or downward manipulation of the selection enter switch 63 with the second hierarchy operation menus displayed moves the selected point in the second hierarchy operation menus upward or downward, correspondingly.

Then, pushing the selection enter switch 63 with a desired second hierarchy operation menu selected, the selected operation menu is selected and entered, so that the next screen corresponding to the selected and entered operation menu is displayed on the main display 12.

As described above, in the information display system, the steering switch 6 is provided as a switch including three switches of the leftward moving switch 61, the rightward moving switch 62, and the selection enter switch 63, rather than provision of separate operation switches for operating the respective pieces in-vehicle equipment, and the operation screen S7 of the main display 12 is composed of a combination of the plurality of horizontally arranged first hierarchy operation menus and the corresponding vertically-arranged second hierarchy operation menus.

Accordingly, the leftward and rightward moving switches 61, 62 correspond to the horizontally arranged first hierarchy operation menus while the selection enter switch 63 to be manipulated upward or downward corresponds to the vertically arranged second hierarchy operation menus. This eliminates the need of every-time looking for a desired operation switch, improving the operability with respect to the operation screen S7.

Further, the first hierarchy operation menus and the second hierarchy operation menus are selected through different switches, that is, the leftward and rightward moving switches 61, 62 and the selection enter switch 63 (separation of switching functions), and selection and enter of a desired second hierarchy operation menu are performed by manipulating the same switch, that is, the selection enter switch 63 (integration of switching functions), so that the number of switches is optimized. Further, the operation sequence on the operation screen S7 (selection of a first hierarchy operation menu then a second hierarchy operation menu) corresponds to the manipulation sequence of the operation switches (manipulation of the leftward or rightward moving switches 61 or 62 then the selection enter switch 63), improving the operability remarkably.

As a result, the driver can perform blind manipulation favorably.

The steering switch 6 also performs operations with respect to the operation screens S2 to S5 of the concentrated display 4, and each of the operation screens S2 to S5 is composed of a plurality of operation menus displayed horizontally.

Accordingly, manipulation of the leftward or rightward moving switches 61, 62 and the selection enter switch 63, which is the same as the manipulation with respect to the operation screen S7 of the main display 12, enables operations with respect to the operation screens S2 to S5 of the concentrated display 4. In this way, when the operation screen S7 of the main display 12 and the operation screens S2 to S5 of the concentrated screen 4 are operated in the same manipulation manner, manipulation efficiency increases. Moreover, blind manipulation can be performed favorably for operating the operation screens S2 to S5 of the concentrated display 4 as well as the manipulation for operating the operation screens of the main display 12, leading to favorable driver's manipulation of the operation switch, that is, the steering switch 6.

Since the leftward moving switch 61 and the rightward moving switch 62 are arranged left and right, respectively, with respect to the selection enter switch 63, the location of the leftward and rightward moving switches 61, 62 agrees with driver's operational sense in moving the selected point of the horizontally arranged operation menus in each of the operation screens S2 to S5 of the concentrated display 4 and the operation screen S7 of the main display 12, leading to further improvement on the operability and facilitating blind manipulation further.

Particularly, the selection enter switch 63 protrudes toward the driver more than the other switches 61, 62, 64, 65, which enables recognition of the position of the selection enter switch 63 without looking at the steering switch 6, leading to recognition of the respective positions of the leftward and rightward moving switches 61, 62. Namely, blind manipulation can be performed more easily.

In the operation screens S2 to S5 of the concentrated display 4, the cursor 30 can be returned to the default point by manipulating the selection enter switch 63 (the screen is changed once to the information display screen S1). Therefore, for changing setting of indication relating to the DIS after, for example, the set temperature is changed in the left seat temperature setting menu located at the left end of the concentrated display 4, the selection enter switch 63 is pushed to move the cursor 30 to the default point, and then, the rightward moving switch 63 is pushed to move the cursor 30 to the DIS display region, rather than pushing the rightward moving switch 62 to move the cursor 30 one by one to the DIS display region located at the right end of the concentrated display 4. This reduces the number of times of manipulation of the switches. In short, pushing the selection enter switch 63 returns to the cursor 30 to the default point, improving the operability.

Further, when the steering switch 6 is not manipulated for a predetermined period with an arbitrary operation menu specified by the cursor 30, the cursor 30 is returned to the default point by itself. Therefore, even if the driver forgets manipulation for returning the cursor 30 to the default point, the cursor 30 is returned to the default point automatically. This improves the usability of the device.

The information display system includes two kinds of switches, the steering switch 6 and the in-vehicle equipment side switch (touch panel 11 and the air conditioner operation switch 21), and manipulation of any of them leads to operation of corresponding in-vehicle equipment. Accordingly, there may rise the situation where, for example, a passenger occupying the passenger seat manipulates the in-vehicle equipment side switch against the driver's intention in the middle of driver's manipulation of the steering switch 6 for desired setting, and vice versa.

Description will be given next to concurrent operation avoiding control of the steering switch 6 with the in-vehicle equipment side switch in the information display system.

Figure 10:
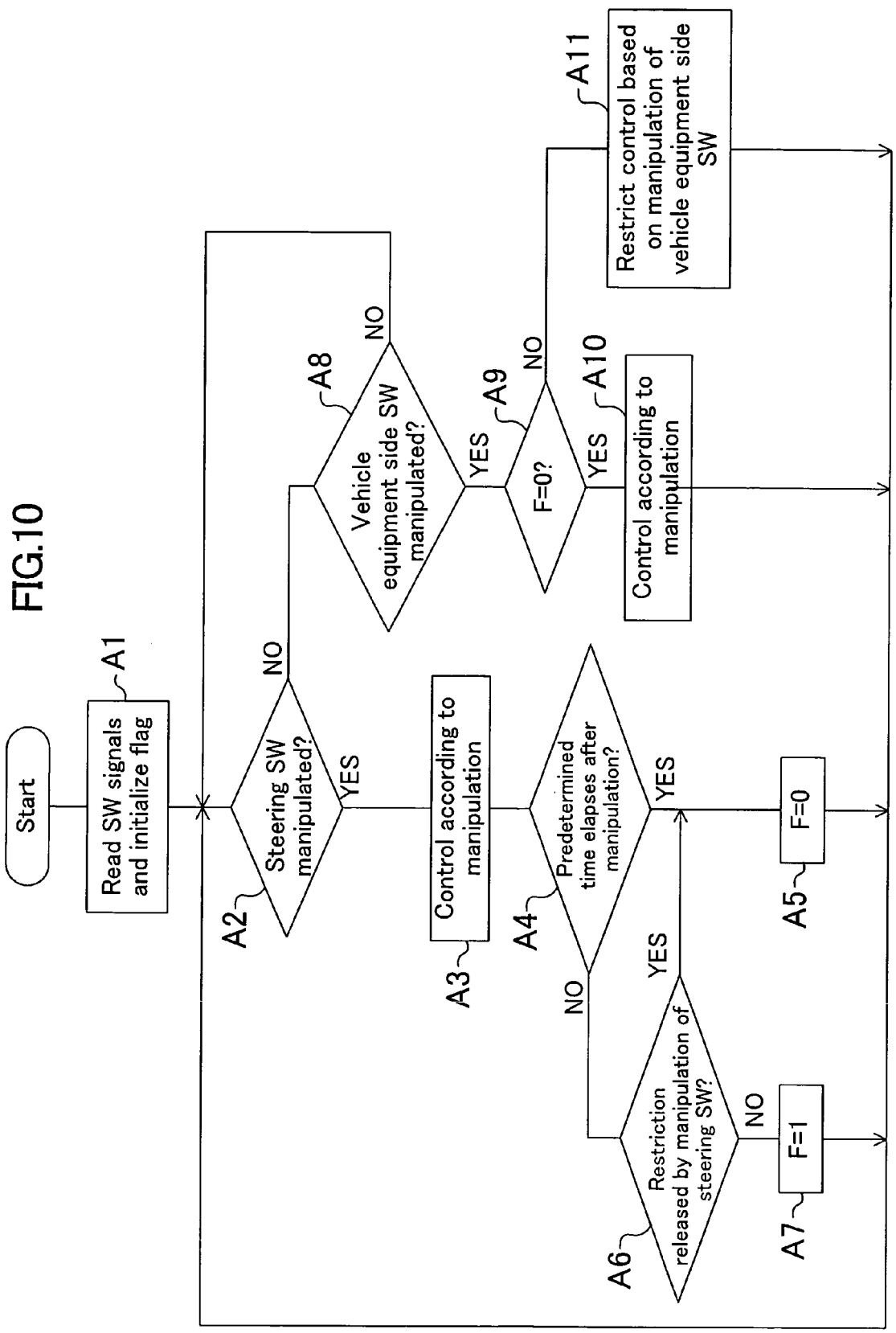
FIG. 10 is a flowchart of concurrent operation avoiding control for restricting an operation of an in-vehicle equipment side switch during manipulation of the steering switch.

FIG. 10 is a flowchart of control for restricting operation of the in-vehicle equipment side switch during manipulation of the steering switch 6. This flow starts at ignition ON and terminates ignition OFF.

First, in a step A1, switch signals from the steering switch 6 and the in-vehicle equipment side switch are read, and a flag F is initialized.

In a subsequent step A2, whether or not the steering switch 6 is manipulated is judged. The routine proceeds to a step A3 when the judgment results in YES (manipulated) or to a step A8 when the judgment results in NO (not manipulated).

In the step A3, control according to the manipulation is executed. Then, in a subsequent step A4, whether or not a predetermined period has elapsed after the steering switch 6 is manipulated. When the predetermined period has elapsed (YES), the routine proceeds to a step A5 to set the flag to 0. When the predetermined period has not elapsed (NO), the routine proceeds to a step A6.

In the step A6, whether or not restriction of the operation of the in-vehicle equipment side switch is released by manipulation of the steering switch 6 (or being released) is judged. When released (YES), the routine proceeds to the step A5 to set the flag F to 0. When not released (NO), the routine proceeds to a step A7 to set the flag F to 1. Then, the routine returns to the step A2. Through not shown, the operation screen of the main display 12 may include an operation menu for releasing the restriction to the in-vehicle equipment side switch so that restriction to the in-vehicle equipment side switch is released when the operation menu is selected by manipulation of the steering switch 6.

On the other hand, in the step A8, whether or not the in-vehicle equipment side switch is manipulated is judged. When manipulated (YES), the routine proceeds to a step A9. When not manipulated (NO), the routine returns to the step A2.

In the step A9, whether or not the flag F is set to 0 is judged. When it is set to 0 (YES), the routine proceeds to a step A10. When it is not set to 0, namely, set to 1 (NO), the routine proceeds to a step A11.

In the step A10 where the predetermined period has elapsed after the manipulation of the steering switch 6, the in-vehicle equipment side switch is allowed to be operated to execute control according to manipulation of the in-vehicle equipment side switch. On the other hand, in the step A11 where the predetermined period has not elapsed after the manipulation of the steering switch 6, operation of the in-vehicle equipment side switch is restricted so that control according to manipulation of the in-vehicle equipment switch is not executed.

As described above, when the steering switch 6 is manipulated for performing control on the corresponding in-vehicle equipment in response, operation of the in-vehicle equipment side switch is restricted to avoid concurrent operation of the steering switch 6 with the in-vehicle equipment side switch. Specifically, manipulation of the in-vehicle equipment side switch during manipulation of the steering switch 6 cannot change operation corresponding to the manipulation of the steering switch 6, increasing the operability.

Further, since restriction and allowance of operation of the in-vehicle equipment side switch is exchanged according to driver's intention (see the step A6). Accordingly, when operation of the in-vehicle equipment side switch is allowed in the process of manipulation of the steering switch 6 with concurrent operation against the driver's intention avoided, the passenger occupying the passenger seat can relay remaining manipulation. Thus, the convenience of the device including the two kinds of operation switches of the steering switch 6 and the in-vehicle equipment side switch is increased.

In the step A4 in the flowchart of FIG. 10, the flag is set according to whether or not the predetermined period has elapsed after the manipulation of the steering switch 6. Alternatively, for example, the steering switch 6 may have a touch sensing function so that the flag F can be set according to whether or not the steering switch 6 is touched.

Figure 11:
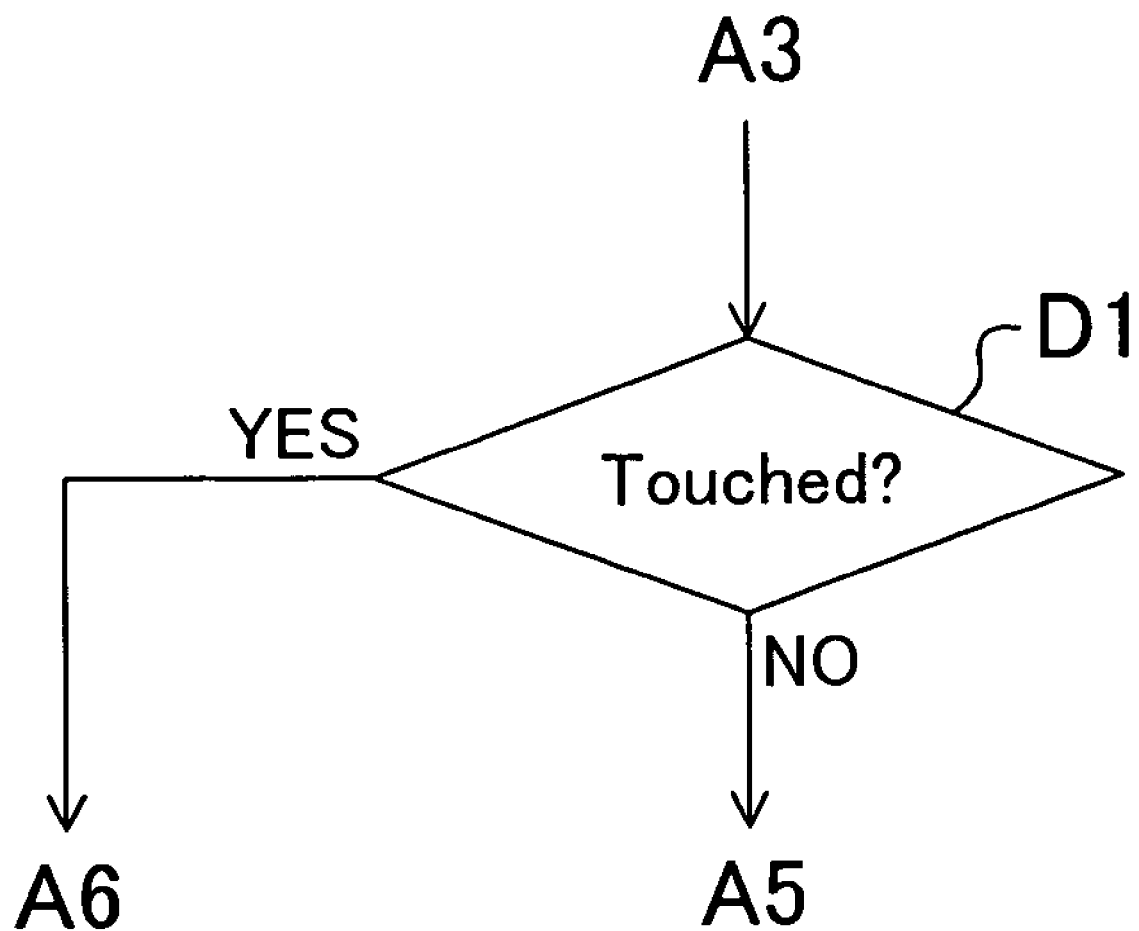
FIG. 11 is a part of a flowchart depicting a modified example of the concurrent operation avoiding control.

In this case, the step A4 in the flowchart of FIG. 10 is replaced by a step D1 shown in FIG. 11 so that it is judged that the flag is set to 1 in a touched state (when the steering switch 6 is touched, YES) or is set to 0 in an untouched state (when it is not touched, NO).

With the above arrangement, operation of the in-vehicle equipment side switch is restricted during the time when the steering switch 6 is touched even if the steering switch 6 is not manipulated actually. Hence, operation of the in-vehicle equipment side switch is not execute under the state where the driver touching the steering switch 6 thinks to perform some manipulation (not manipulate actually). In other words, disturbance to the driver trying to perform some manipulation is obviated.

Control based on a lapse of time after manipulation may be combined with control based on the touch sensing.

Description will be given next to display control on the main display 12 accompanied by the concurrent operation avoiding control. This display control is executed when the operation target of the steering switch 6 is set to the main display 12. Under this control, a passenger occupying the passenger seat is made to recognize that operation of the in-vehicle equipment side switch is restricted during the time when the steering switch 6 is manipulated.

Specifically, as shown in FIG. 12A, in normal time when operation of the in-vehicle equipment side switch is not restricted (when the flag F is set to 0 in the flowchart of FIG. 10), the main display 12 displays the operation menus (menus 1 to 5 and menus 3-1 to 3-5) in the form of buttons so as to make the passenger occupying the passenger seat to recognize that the touch panel 11 is operable. In other words, the main display 12 is set to an indication style that informs availability of operation menu manipulation. Wherein, FIG. 12A illustrates screen transition in the case where the menu 3 is selected from the first hierarchy operation menus, and then, the menu 3-3 is selected from the second hierarchy operation menus.

In contrast, as shown in FIG. 12B, when operation of the in-vehicle equipment side switch is restricted (when the flag F is set to 1 in the flowchart of FIG. 10), the main display 12 displays each operation menu (menus 1 to 5 and menus 3-1 to 3-5) not in the form of buttons, so that the passenger occupying the passenger seat is made to recognize that the touch panel 11 is inoperable. In other words, an indication style that informs unavailability of operation menu manipulation is set differently from the indication style in normal time when operation of the in-vehicle equipment side switch is not restricted. Although the main display 12 is set to this indication style, the operation menus corresponding to manipulation of the steering switch 6 are displayed (FIG. 12B shows screen transition in the case where the menu 3 is selected from the first hierarchy operation menus, and then, the menu 3-3 is selected from the second hierarchy operation menus, similarly to FIG. 12A). Hence, the driver can manipulate the steering switch 6.

When operation of the touch panel 11 is restricted, manipulation of the touch panel 11 by the passenger occupying the passenger seat does not lead to corresponding control, inviting passenger's uncomfortable feeling. Passenger's visual recognition that operation of the touch panel 11 is restricted, however, invites no manipulation by the passenger, causing no uncomfortable feeling to the passenger.

Figure 13:
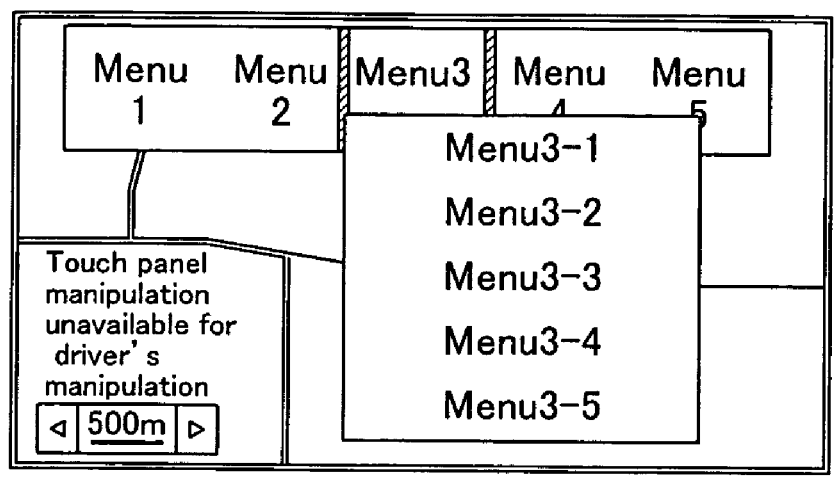
FIG. 13 is an explanatory drawing showing a screen in another indication style in relation to the display control of the main display.
Figure 14:
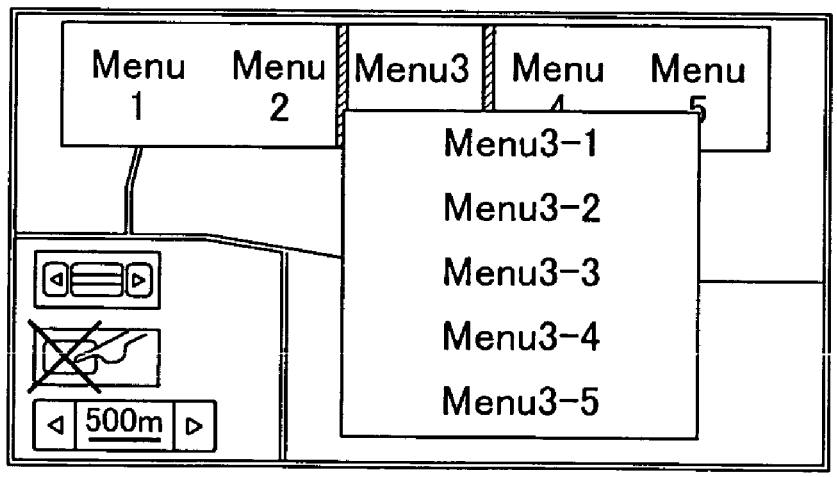
FIG. 14 is an explanatory drawing showing a screen in still another indication style in relation to the display control of the main display.

Besides change in indication style of the operation menus, the main display 12 may display words such as "touch panel manipulation unavailable for driver's manipulation" or the like as indicated in FIG. 13, for example, to make the passenger occupying the passenger seat to recognize that operation of the touch panel 11 is restricted. Alternatively, as shown in FIG. 14, an illustration indicating or suggesting that operation of the touch panel 11 is restricted may be displayed on the main display 12 for making the passenger occupying the passenger seat to recognize the restriction.

A modified example of the display control on the main display 12 will be described next. In this modified example, the main display 12 is capable of displaying screens different from each other according to the angle of line of sight with respect to the display face. In the present embodiment, particularly, a screen (driver seat side screen) toward the passenger (driver) occupying the driver seat is made different from a screen (passenger seat side screen) toward the passenger occupying the passenger seat. This main display 12 may have any of various employable constitution. One of examples will be described herein with reference to FIG. 15.

Figure 15:
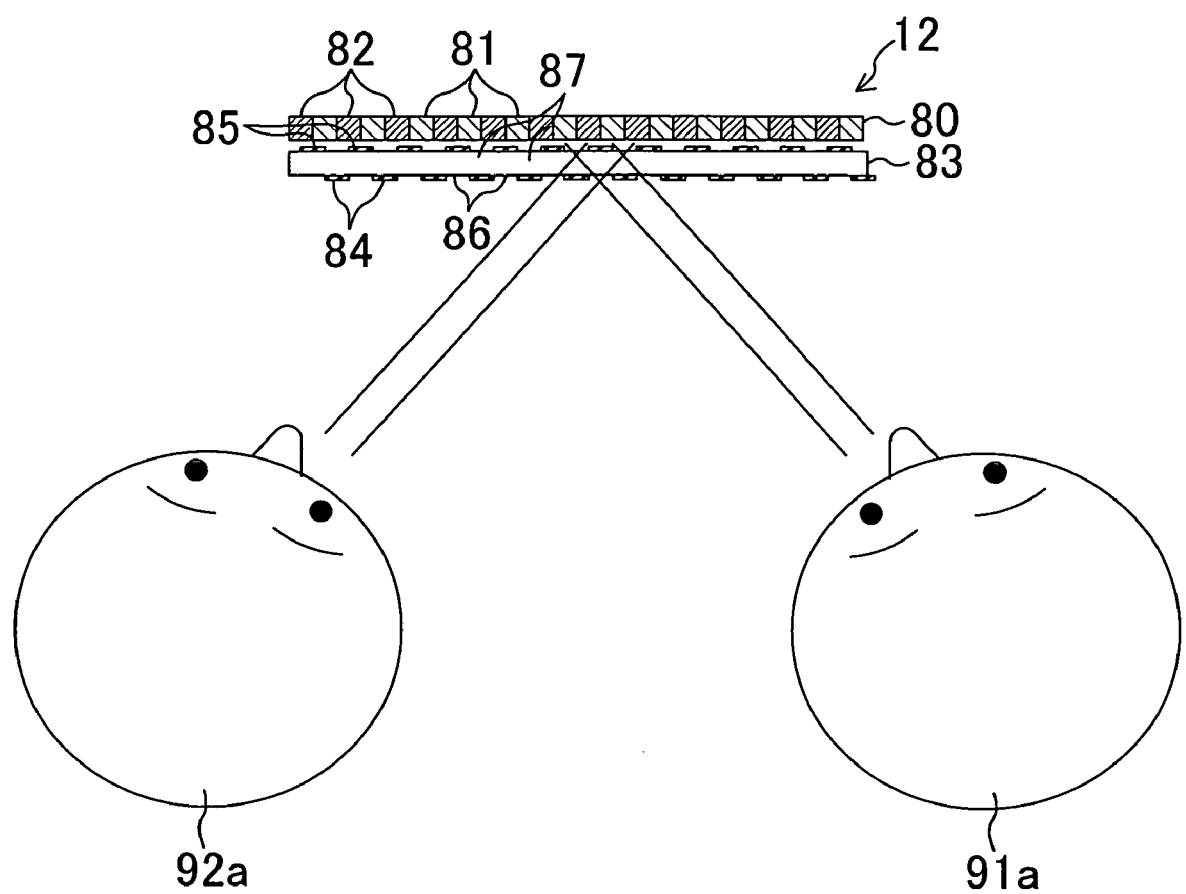
FIG. 15 is a schematic illustration showing a construction of the main display according to a modified example for the display control of the main display.

The main display 12 includes a liquid crystal panel 80 of which display face is composed of first band portions 81 and second band portions 82 which have a given width and extend vertically (perpendicular to the paper in FIG. 15). The first and second band portions 81, 82 are arranged alternately in the widthwise direction of the vehicle.

A transparent cover 83 is arranged on the obverse side (inboard) of the liquid crystal panel 80, and first shielding bands 84 and second shielding bands 85 are provided on the obverse face and the reverse face of the transparent cover 83, respectively. In FIG. 15, the touch panel is not shown for the sake of easy understanding.

The shielding bands 84, 85 have the same width as the first and second band portions 81, 82 and are arranged at a regular pitch in the widthwise direction of the vehicle at intervals of their band width left. The first shielding bands 84 and the second shielding bands 85 are ½ pitch displaced left and right from each other so as to form spaces between the first shielding bands 84 and the second shielding bands 85 as light passing slits 86, 87, respectively.

When the driver seat side screen is displayed at the first band portions 81 while the passenger seat side screen is displayed at the second band portions 82, the driver seat side screen and the passenger seat side screen are viewed selectively by the driver 91a occupying the driver seat and the passenger 92a occupying the passenger seat, respectively, through the transparent cover 83.

Figure 16:
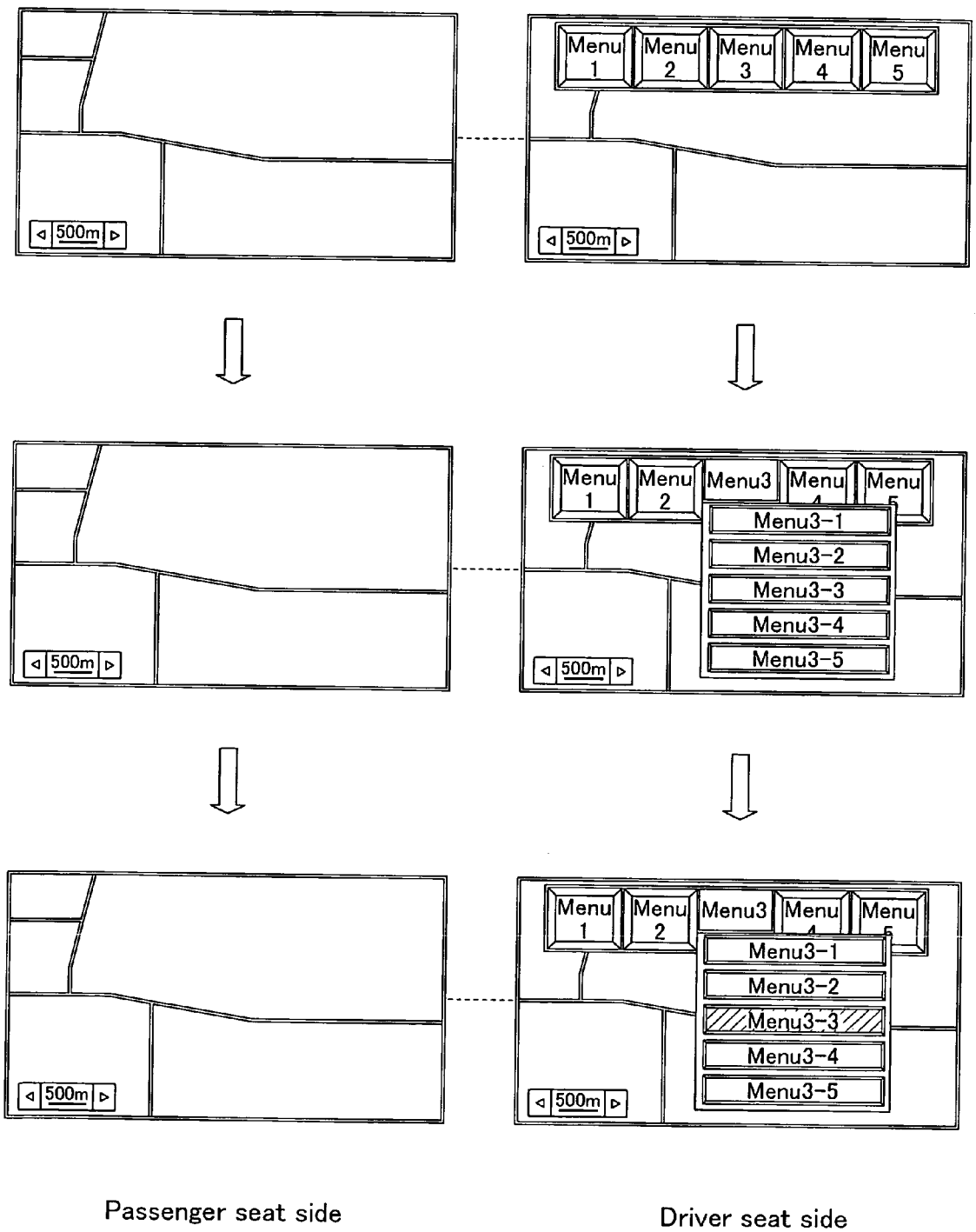
FIG. 16 is an illustration showing screen transition for explaining a modified example of the display control of the main display.

In this way, the main display 12 is capable of differentiating the driver seat side screen from the passenger seat side screen. With the use of this, the operation menus are displayed on the driver seat side screen (each screen on the right side in FIG. 16) while no operation menu is displayed on the passenger seat side screen (each screen on the left side in FIG. 16) during the time when the steering switch 6 is manipulated. Whereby, the driver 91a is allowed to manipulate the steering switch 6 while the passenger 92a occupying the passenger seat is disabled to manipulate the operation menus. In other words, the passenger 92a occupying the passenger seat can recognize that operation of the touch panel 11 is restricted.

Figure 17:
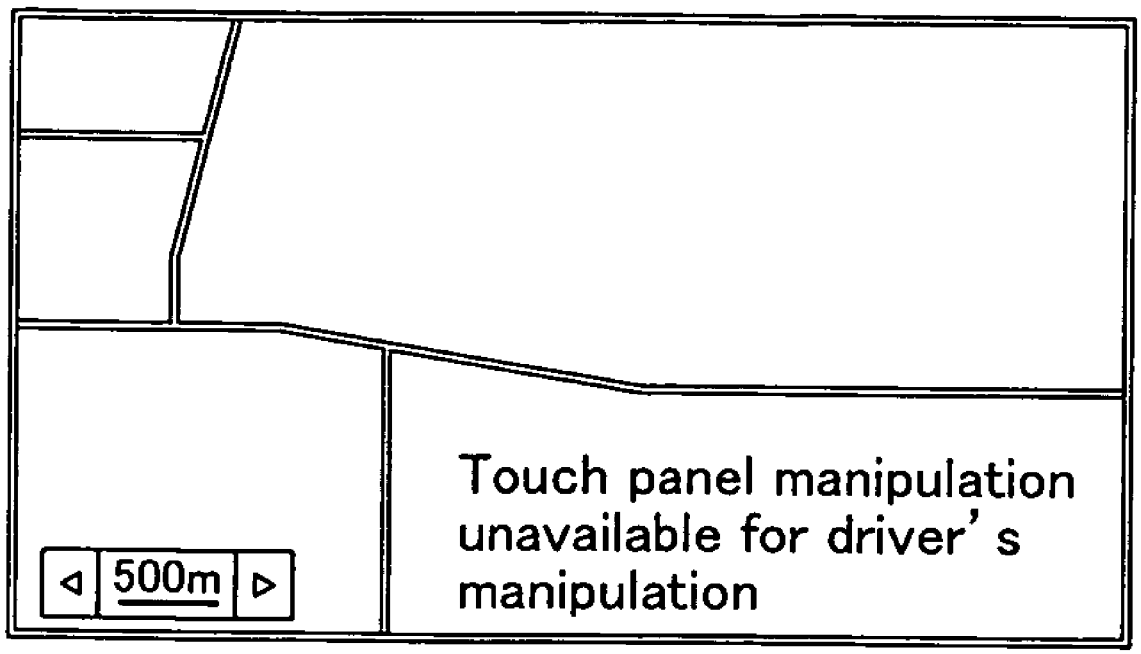
FIG. 17 is an explanatory drawing showing a screen in yet another indication style in relation to the display control of the main display.

In addition to displaying no operation menu on the passenger seat side screen, words "touch panel manipulation unavailable for driver's manipulation" or the like may be displayed on the passenger seat side screen, as shown in FIG. 17.

Figure 18:
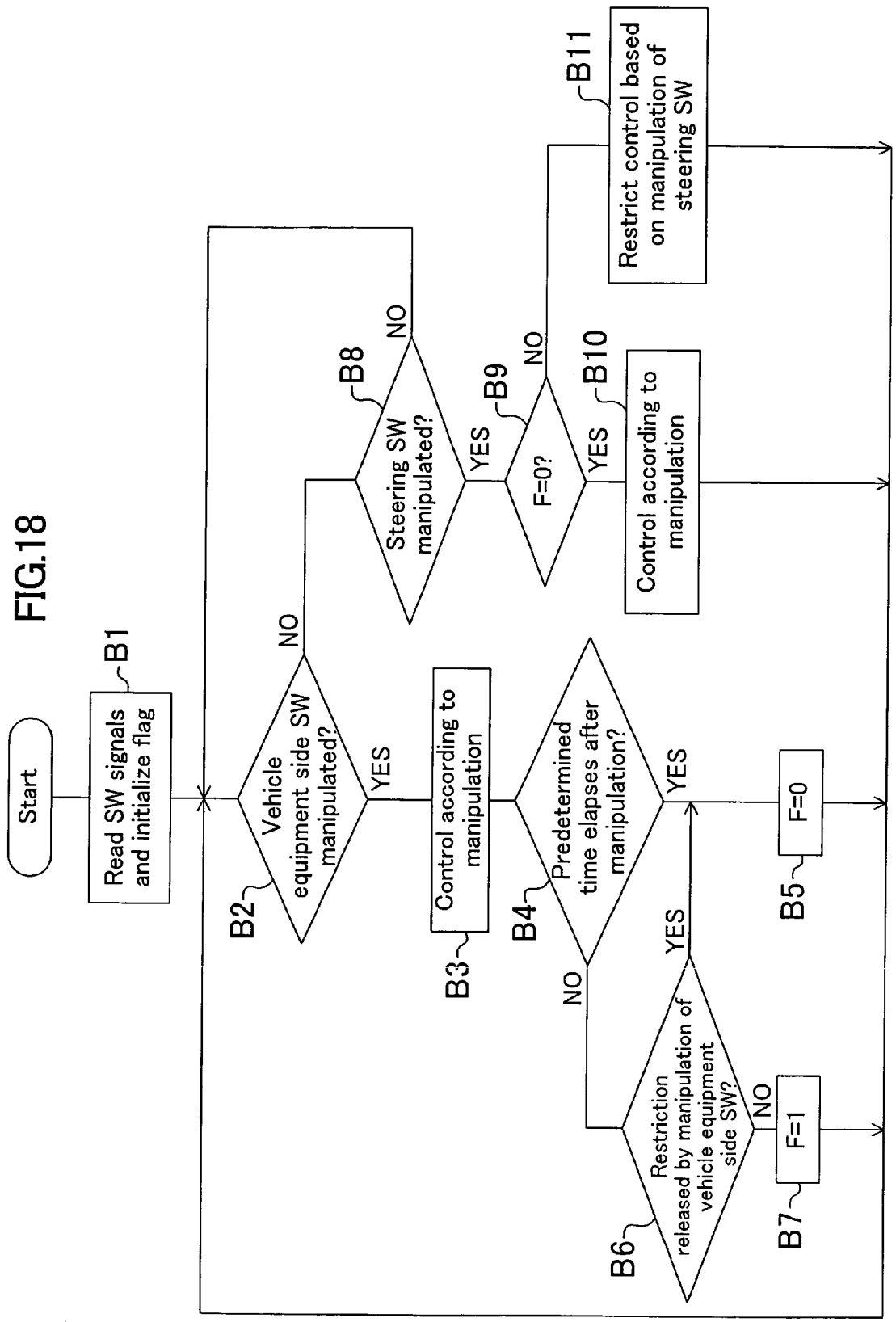
FIG. 18 is a flowchart of concurrent operation avoiding control for restricting operation of the steering switch during manipulation of the in-vehicle equipment side switch.

In the above control, operation of the in-vehicle equipment side switch is restricted during manipulation of the steering switch 6. In reverse, the concurrent operation avoiding control may restrict operation of the steering switch 6 during manipulation of the in-vehicle equipment side switch. FIG. 18 is a flowchart of the concurrent operation avoiding control, which starts at ignition ON and terminates at ignition OFF.

First, in a step B1, the switch signals from the steering switch 6 and the in-vehicle equipment side switch are read, and the flag F is initialized.

In a subsequent step B2, whether or not the in-vehicle equipment side switch is manipulated is judged. When manipulated (YES), the routine proceeds to a step B3. When not manipulated (NO), the routine proceeds to a step B8.

Control according to the manipulation is executed in the step B3. Then, in a subsequent step B4, whether or not a predetermined period has elapsed after the in-vehicle equipment side switch is manipulated. When the predetermined period has elapsed (YES), the routine proceeds to a step B5 to set the flag F to 0. When the predetermined period has not elapsed (NO), the routine proceeds to a step B6.

In the step B6, whether or not restriction of operation of the steering switch 6 is released by manipulation of the in-vehicle equipment side switch is judged. When released (YES), the routine proceeds to the step B5 to set the flag to 0. When not released (NO), the routine proceeds to a step B7 to set the flag to 1. Though not shown, the operation screen of the main display 12 may include an operation menu for releasing the restriction to the steering switch 6 so that the restriction to the steering switch 6 is released when the operation menu is selected by manipulation of the in-vehicle equipment side switch.

In the step B8, whether or not the steering switch 6 is manipulated is judged. When manipulated (YES), the routine proceeds to a step B9. When not manipulated (NO), the routine returns to the step B2.

In the step B9, whether or not the flag F is set to 0 is judged. When it is set to 0 (YES), the routine proceeds to a step B10. When it is not set to 0, namely, set to 1 (NO), the routine proceeds to a step B11.

In the step B10 where the predetermined period has elapsed after the manipulation of the in-vehicle equipment side switch, the steering switch 6 is allowed to be operated to execute control according to manipulation of the steering switch 6. On the other hand, in the step B11 where the predetermined period has not elapsed after the manipulation of the in-vehicle equipment side switch, operation of the steering switch 6 is restricted so that control according to manipulation of the steering switch 6 is not executed.

According to this control, concurrent operation of the steering switch 6 with the in-vehicle equipment side switch is avoided, increasing the operability.

In this concurrent operation avoiding control, also, the step B4 may be replaced by the step D1 in FIG. 11 with the touch sensing function added to the in-vehicle equipment side switch so that the flag is set according to whether or not the in-vehicle equipment side switch is touched.

Figure 19:
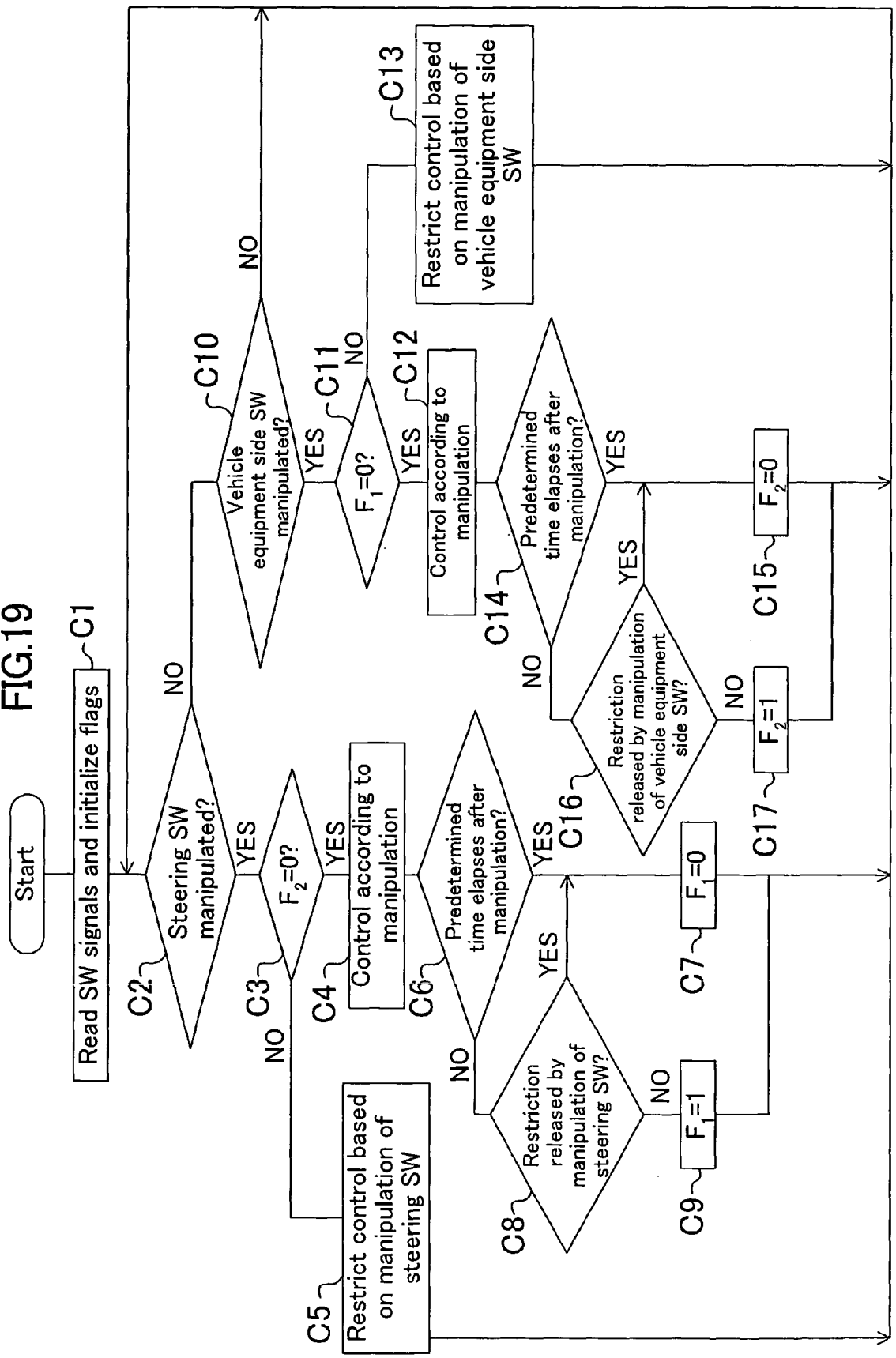
FIG. 19 is a flowchart of concurrent operation avoiding control for restricting operation of one of the in-vehicle equipment side switch or the steering switch during manipulation of the other.

Still another concurrent operation avoiding control will be described next with reference to the flowchart of FIG. 19. This control restricts operation of one of the steering switch 6 and the in-vehicle equipment side switch during the time when the other switch is manipulated.

This flow starts at ignition ON and terminates at ignition OFF. First in a step C1, the switch signals from the steering switch 6 and the in-vehicle equipment side switch are read, and flags F1, F2 are initialized.

In a subsequent step C2, whether or not the steering switch 6 is manipulated is judged. When manipulated (YES), the routine proceeds to a step C3. When not manipulated (NO), the routine proceeds to a step C10.

In the step C3, whether or not the flag F2 is set to 0 is judged. The flag F2 herein is set to 1, as will be described later, when a predetermined period has not elapsed after manipulation of the in-vehicle equipment side switch. When the flag F2 is set to 0 (YES) in the step C3, the routine proceeds to a step C4. When the flag F2 is not set to 0 (set to 1, NO), the routine proceeds to a step C5.

In the step C4 where the predetermined period has elapsed after the manipulation of the in-vehicle equipment side switch, the steering switch is allowed to be operated to execute control according to manipulation of the steering switch 6. Thereafter, the routine proceeds to a step C6. On the other hand, in the step C5 where the predetermined period has not elapsed after the manipulation of the in-vehicle equipment side switch, operation of the steering switch 6 is restricted so that control according to manipulation of the steering switch 6 is not executed. Then, the routine returns to the step C2.

In the step C6, whether or not the predetermined period has elapsed after the manipulation of the steering switch 6 is judged. When the predetermined period has elapsed (YES), the routine proceeds to a step C7 to set the flag F1 to 0. When the predetermined period has not elapsed (NO), the routine proceeds to a step C8.

In the step C8, whether or not the restriction of operation of the in-vehicle equipment side switch is released by manipulation of the steering switch 6 is judged. When released (YES), the routine proceeds to the step C7 to set the flag F1 to 0. When not released (NO), the routine proceeds to a step C9 to set the flag F1 to 1. Then, the routine returns to the step C2.

In contrast, in the step C10, whether or not the in-vehicle equipment side switch is manipulated is judged. When manipulated (YES), the routine proceeds to a step C11. When not manipulated (NO), the routine returns to the step C2.

In the step C11, whether or not the flag F1 is set to 0 is judged. When set to 0 (YES), the routine proceeds to a step C12. When not set to 0 (1, NO), the routine proceeds to a step C13.

In the step C12 where the predetermined period has elapsed after the manipulation of the steering switch 6, operation of the in-vehicle equipment side switch is allowed so that control according to manipulation of the in-vehicle equipment side switch is executed. Thereafter, the routine proceeds to a step C14. On the other hand, in the step C13 where the predetermined period has not elapsed after the manipulation of the steering switch 6, operation of the in-vehicle equipment side switch is restricted so that control according to the manipulation of the in-vehicle equipment side switch is not executed. Then, the routine returns to the step C2.

In the step C14, whether or not the predetermined period has elapsed after the manipulation of the in-vehicle equipment side switch is judged. When the predetermined period has elapsed (YES), the routine proceeds to a step C15 to set the flag F2 to 0. When the predetermined period has not elapsed (NO), the routine proceeds to a step C16.

In the step C16, whether or not restriction of operation of the steering switch 6 is released by manipulation of the in-vehicle equipment side switch is judged. When released (YES), the routine returns to the step C15 to set the flag F2 to 0. When not released (NO), the routine proceeds to a step C17 to set the flag F2 to 1, and then, the routine then returns to the step C2.

This control avoids concurrent operation of the steering switch 6 with the in-vehicle equipment side switch, increasing the operability.

It is noted that in the above concurrent operation avoiding control, the steps C6 and C14 may be replaced also by the step D1 in FIG. 11 with the touch sensing function added to each of the steering switch 6 and the in-vehicle equipment side switch so that the flags F1, F2 are set according to whether or not the respective switches are touched.

The information display system is capable of exchanging the operation target of the steering switch between the main display 12 and the concentrated display 4. Accordingly, the case may rise where in the middle of manipulation of the steering switch 6 for changing setting of the navigation device 1 with the operation target set to, for example, the main display 12, the operation target is exchanged from the main display 12 to the concentrated display 4 for setting, for example, the air conditioner 2. In such a case, when the operation target of the steering switch 6 is exchanged again from the concentrated display 4 to the main display 12, the main display 12 displays its operation initial screen. This necessitates manipulation for changing the setting again from the beginning which has been done before the exchange to the concentrated display 4, which is inconvenient.

For eliminating this inconvenience, control in exchanging the operation target of the steering switch 6 is performed, which will be described with reference to a flowchart of FIG. 20 and FIG. 21.

This flowchart indicates the manipulation sequence of the steering switch 6 and screens displayed on the main display 12 according to the manipulation and starts in the state where the operation target is set to the concentrated display 4. Therefore, the main display 12 displays a normal navigation screen S8. When the NAVI switch 64 is manipulated (O1), the operation target is exchanged from the concentrated display 4 to the main display 12 so that the main display 12 displays an operation initial screen S9-1. The operation initial screen S9-1 displays, as described above, the horizontally arranged first hierarchy operation menus and the vertically arranged second hierarchy operation menus belonging to a currently selected first hierarchy operation menu ("destination," "map screen," "surrounding retrieval," and "memory point" are indicated as the second hierarchy operation menus in FIG. 20).

Then, manipulation of the steering switch 6 causes operation (main display operation 1 to main display operation n) in the operation screen of the main display 12 (O2, O3). When the NAVI switch 64 is manipulated (O4) with an address input screen S10 displayed as an operation screen of the main display 12, the operation target of the steering switch 6 is exchanged from the main display 12 to the concentrated display 4 so that the main display 12 displays the normal navigation screen S8 again. At this exchange, the audio/navigation device 1 stores the screen immediately before the exchange to the concentrated display 4 (the address input screen S10 herein).

Subsequently, when the NAVI switch 64 is manipulated again (O7) after desired operations (concentrated display operation 1 to concentrated display manipulation n) are performed in the operation screen (not shown) of the concentrated display 4 (O5, O6), the main display 12 displays another operation initial screen S9-2. The operation initial display screen S9-2 displayed herein includes, as the second hierarchy operation menus, "previous operation screen" besides "destination," "map screen," "surrounding retrieval," and "memory point."

Upward or downward manipulation of the selection enter switch 63 thereafter leads to selection of a desired menu from the second hierarchy operation menus (O8). If manipulation for changing setting is desired, for example, from the beginning at this time point, a desired menu other than "previous operation screen" is selected and the selection enter switch 63 is pushed (O9). In FIG. 21, "destination" is selected, so that the main display 12 displays a destination setting screen S11. Thereafter, a desired operation is performed on the main display 12 (O10).

In contrast, if return to the state immediately before the exchange to the concentrated display 4 is desired, namely, if manipulation restart is desired from the state where operation of the main display 12 is interrupted in the process, "previous operation screen" is selected, and the selection enter switch 63 is pushed (O11). In response to this manipulation, the audio/navigation device 1 reads out and displays the stored screen on the main display 12. Accordingly, the main display 12 displays the operation screen (the address input screen S10) that had been displayed on the main display 12 immediately before the exchange to the concentrated display 4. Thereafter, a desired operation is performed on the main display 12 (O12), similarly to the above.

As described above, in the information display system, in the case where the operation target is exchanged from the main display 12 to the concentrated display 4 for setting another piece of in-vehicle equipment in the middle of the time when driver manipulates the steering switch 6 for changing setting of the navigation device 1 with the operation target of the steering switch 6 set to the main display 12, and then, the operation target is exchanged again from the concentrated display 4 to the main display 12, an interrupted screen (the address input screen S10 in the above example) is displayed on the main display 12 to allow subsequent manipulation for changing the setting to be restarted. In other words, manipulation for changing the setting, which has been done before the exchange to the concentrated display 4, can be continued without restarting again from the beginning.

Alternatively, instead of manipulation restart for changing the setting, the driver can perform manipulation for changing another setting from the beginning by selecting the operation initial screen S9, and therefore, a screen (the operation initial screen S9 or the interrupted screen) according to the operator's intention can be presented to the operator. As a result, the operability is increased, and the convenience is remarkably increased.

Further, in the present embodiment, the operation menu for transfer to the interrupted screen is displayed in the operation initial screen S9-2, leading to operator's easy understanding.

Another control in exchanging the operation target of the steering switch 6 will be described next with reference to FIG. 22.

Figure 20:
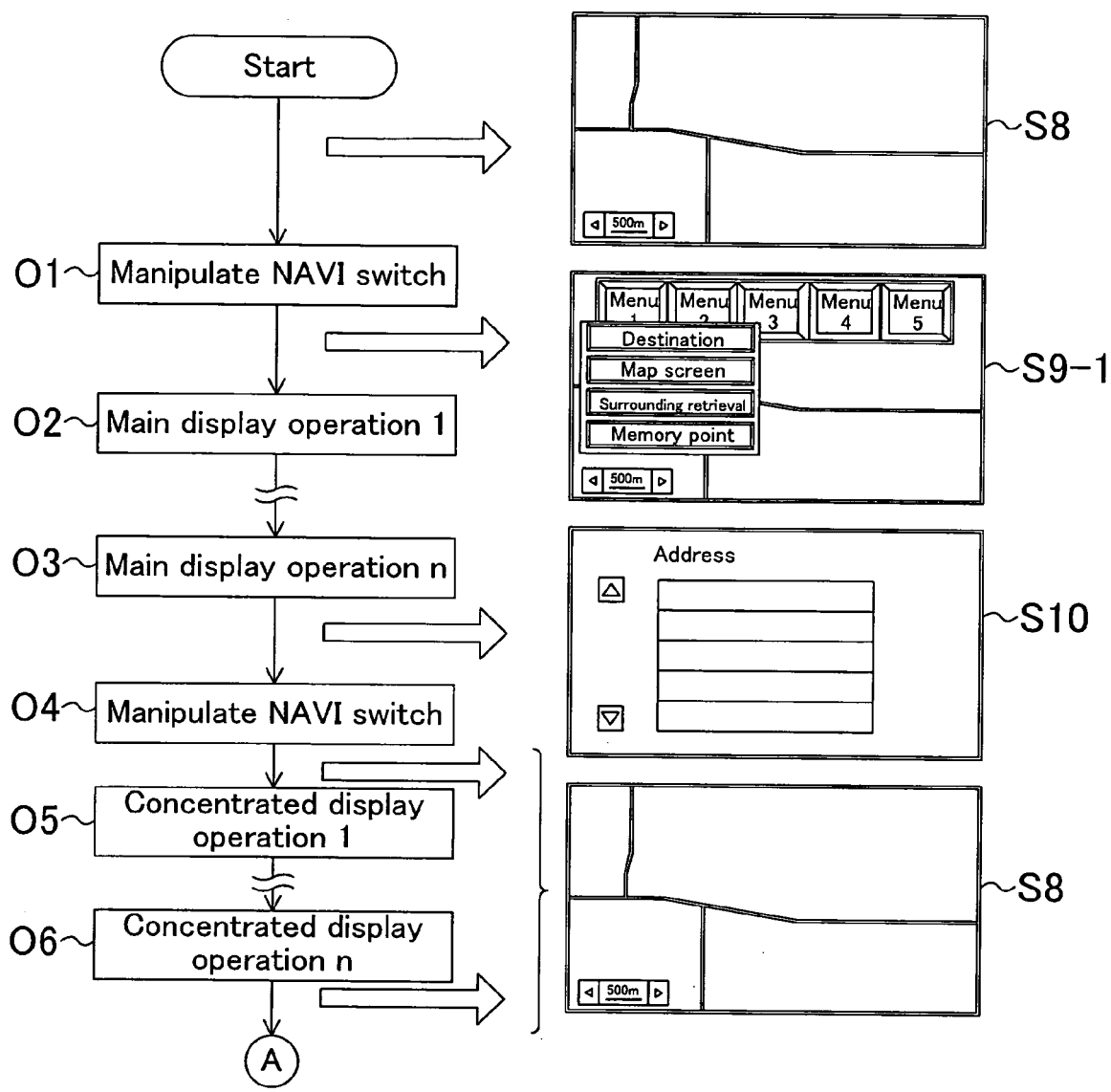
FIG. 20 is a flowchart depicting screen transition of the main display in response to manipulation of the steering switch.

This flow is a sequel to the flow in FIG. 20. When the NAVI switch 64 is manipulated again in the state where the operation target of the steering switch 6 is set to the concentrated display 4 (O21) so that the operation target is exchanged from the concentrated display 4 to the main display 12, the main display 12 displays the operation initial screen S9-1. The operation initial screen S9-1 herein includes four menus and is the same as the operation initial screen S9-1 displayed when the NAVI switch 64 is first manipulated (see FIG. 20).

If manipulation for changing setting from the beginning is desired, a desired menu is selected (O22) similarly to the above, and the selection enter switch 63 is pushed (O23). In FIG. 22, "destination" is selected, so that a destination setting screen S11 is displayed on the main display 12. Thereafter, a desired operation is performed on the main display 12 (O24).

In contrast, if return to the state immediately before the exchange to the concentrated display 4 is desired, the return switch 65 of the steering switch 6 is manipulated (O25). In response to this manipulation, the audio/navigation device 1 reads out and displays the stored screen to the main display 12. Accordingly, the operation screen (the address input screen S10 in FIG. 22) that had been displayed immediately before the exchange to the concentrated display 4 is displayed on the main display 12. Thereafter, a desired operation is performed on the main display 12 (O26) similarly to the above.

When the return switch 65 is manipulated in the state where the operation initial screen S9-1 displayed first upon manipulation of the NAVI switch 64 is displayed, namely, in the state where the operation initial screen S9-1 displayed when the NAVI switch 64 is first manipulated in the flow shown in FIG. 20 is displayed, the main display 12 remains displaying the operation initial screen S9-1 because the audio/navigation device 1 stores no screen.

Even with this arrangement, in the case where the operation target is exchanged from the main display 12 to the concentrated display 4 for setting another piece of in-vehicle equipment in the middle of the time when the driver manipulates the steering switch 6 for changing setting of the navigation device 1 with the operation target of the steering switch 6 set to the main display 12, and then, the operation target is exchanged again from the concentrated display 4 to the main display 12, a screen (the operation initial screen S9 or the interrupted screen) according to the operator's intention can be presented to the operator, increasing the operability and remarkably increasing the convenience.

Moreover, in the present embodiment, the return switch 65 is so composed to be manipulated for transfer to the interrupted screen, which leads to operator's easy understanding.

Still another control in exchanging the operation target of the steering switch 6 will be described next with reference to the flowchart of FIG. 23.

This flow is a sequel to the flow of FIG. 20. For restarting manipulation for changing setting from the beginning after exchanging the operation target to the main display 12 by manipulating the NAVI switch 64, the NAVI switch 64 is pushed short (O31). This results in display of the operation initial screen S9-1 on the main display 12. Thereafter, the selection enter switch 63 is manipulated upward or downward for selecting a desired menu (O32) and, then, is pushed for selection enter of the desired menu (O33). FIG. 23 shows the state where "destination" is selected so that the main display 12 displays the destination setting screen S11. Subsequently, a desired operation is performed on the main display 12 (O34).

In contrast, if return to the state immediately before the exchange to the concentrated display 4 is desired, the NAVI switch 64 is pushed long (O35). In response to this manipulation, the audio/navigation device 1 exchanges the operation target of the steering switch 6 to the main display 12 and reads out the stored screen to allow it to be displayed on the main display 12. Accordingly, the main display 12 displays the operation screen (the address input screen S10 in FIG. 23) that had been displayed on the main display 12 immediately before the exchange to the concentrated display 4. Then, a desired operation is performed on the main display 12 (O36), similarly to the above case.

With this arrangement, also, in the case where the operation target is exchanged from the main display 12 to the concentrated display 4 for setting another piece of in-vehicle equipment in the middle of the time when driver manipulates the steering switch 6 for changing setting of the navigation device 1 with the operation target of the steering switch 6 set to the main display 12, and then, the operation target is exchanged again from the concentrated display 4 to the main display 12, a screen (the operation initial screen S9 or the interrupted screen) according to the operator's intention can be presented to the operator, increasing the operability and remarkably increasing the convenience.

Further, in the present embodiment, the operation initial screen S9-1 or the interrupted screen can be selected according to manipulation of the NAVI switch 64, and therefore, the operator can select a desired screen by one-step manipulation, increasing the operability.

It is noted that a reverse arrangement may be employable in which short pushing of the NAVI switch 64 results in transfer to the interrupted screen while long pushing thereof results in transfer to the operation initial screen.

Other than short pushing and long pushing of the NAVI switch 64 as manipulation manners, generally called one-click manipulation and double-click manipulation may be assigned, for example.

In the information display system, the concentrated display 4 displays the operation screen for changing settings of plural pieces of in-vehicle equipment, and accordingly, the number of the operation menus is large comparatively. This increases visual annoyance in selecting an operation menu, which might invite extra time for the selection. Further, this may hinder proper manipulation under the state where time that the operator affords to watch the concentrated display 4 is necessarily short, such as the case where the driver driving the vehicle selects an operation menu.

Control effective for proper operation on the concentrated display 4 will be described next.

First, the cursor 30 lights up all the time when it is located at the default point α as shown, for example, in FIG. 24A to FIG. 24E. In contrast, when the cursor 30 is moved from the default point α and specifies any one of the operation menus, it flashes. This highlights the cursor 30 to lead to driver's easy understanding of a currently selected operation menu. The flashing frequency of the cursor 30 increases in proportion to an increase in vehicle speed. Because: when the flashing frequency of the cursor 30 is set constant, the driver would overlook the cursor 30 especially in high speed running.

In detail, when the flashing frequency of the cursor 30 is set constant irrespective of the vehicle speed, the driver may watch the concentrated display 4 at lighting out of the cursor 30 in high speed running where the driver must watch the concentrated display 4 for a short period of time, so that the driver would fail to recognize where the cursor 30 is.

In contrast, when the flashing frequency of the cursor 30 is increased in proportion to an increase in vehicle speed, such a situation can be avoided effectively, so that the driver can recognize the cursor 30 without fail. The shape of the cursor 30 is differentiated between it being at the default point and it being away from the default point α for specifying any of the operation menus. When the cursor 30 is away from the default point α, the size thereof is changed according to the size of a specified operation menu.

Figure 24A:
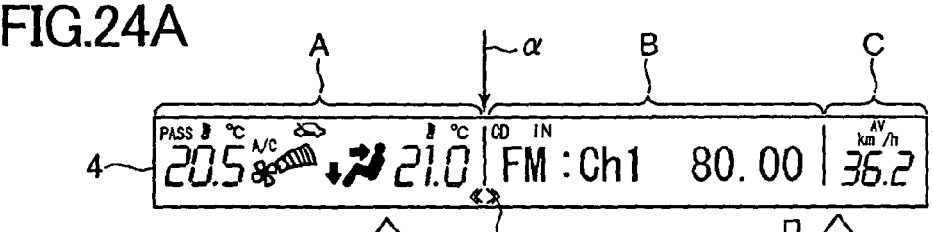
FIG. 24A to FIG. 24E are illustrations collectively showing states to which the display state of the concentrated display changes.
Figure 24B:
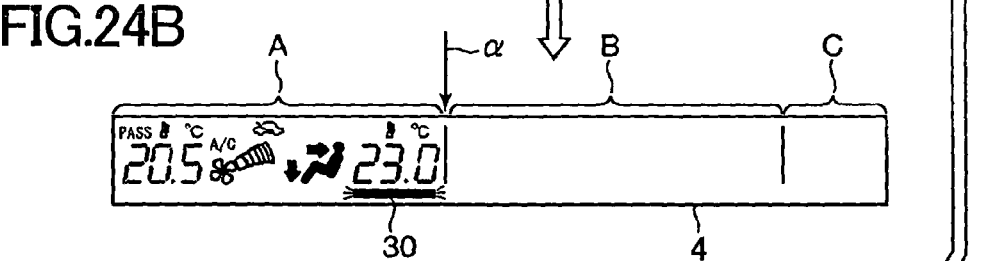

As shown in FIG. 24A, in the information display mode, all of the operation menus in the display regions A to C are indicated. In contrast, as shown in FIG. 24B to FIG. 24E, when the cursor 30 is moved away from the default point α to select an operation menu in an arbitrary display region out of the display regions A to C, namely, when the concentrated display 4 is set to the operation mode, each operation menu in a specific display region including at lease the selected display region remains displayed while each operation menu in the other display region(s) is deleted.

Specifically, in the operation mode, each operation menu in each display region located on the side opposite the direction in which the cursor 30 is moved for selection is deleted.

For example, when the cursor 30 is moved leftward from the default point α to select an operation menu in the display region A, the operation menus in the display regions B, C located on the right side of the selected display region A (see FIG. 24B) are deleted. Accordingly, only the operation menus in the display region A remain displayed as the operation menus in the display region to be operated.

Figure 24C:
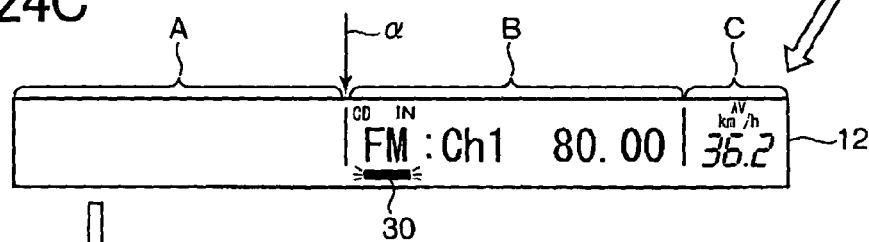

In contrast, selection of an operation menu in the display region B by moving the cursor 30 rightward from the default point α brings deletion of the operation menus in the display region A located on the left side of the selected display region B (see FIG. 24C). Accordingly, only the operation menus in the display regions B, C remain displayed as the operation menus in the display regions to be operated.

Figure 24E:
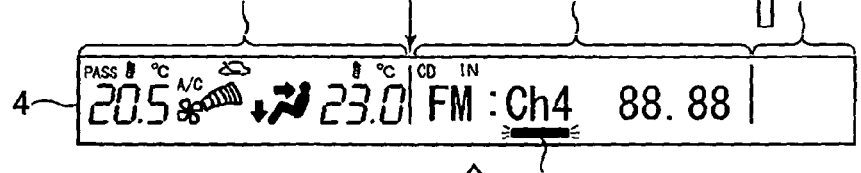
Figure 24D:
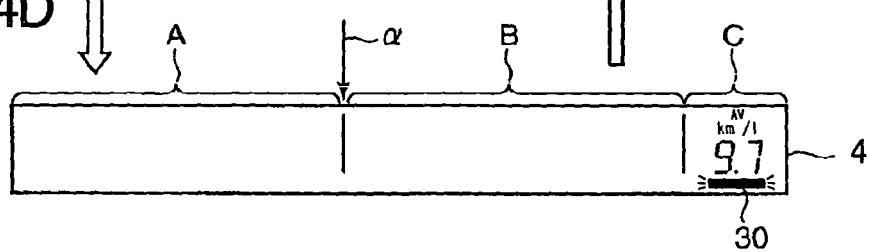
Figure 25A:
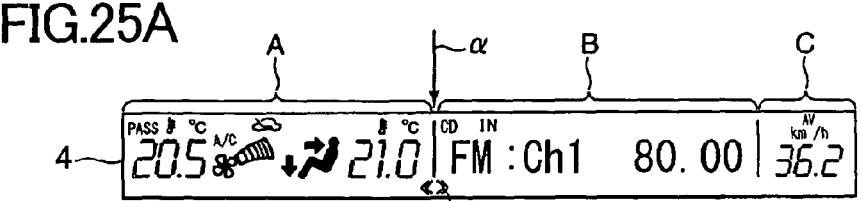
FIG. 25A to FIG. 25E are illustrations collectively showing other states to which the display state of the concentrated display changes.
Figure 25B:
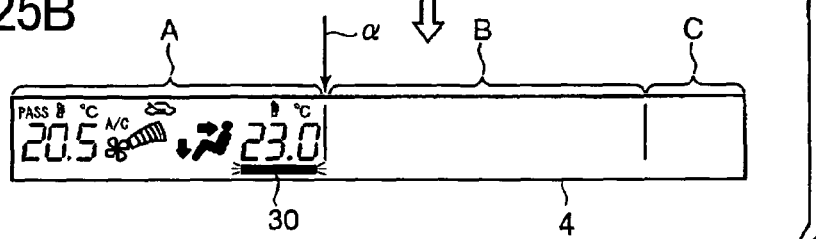
Figure 25C:
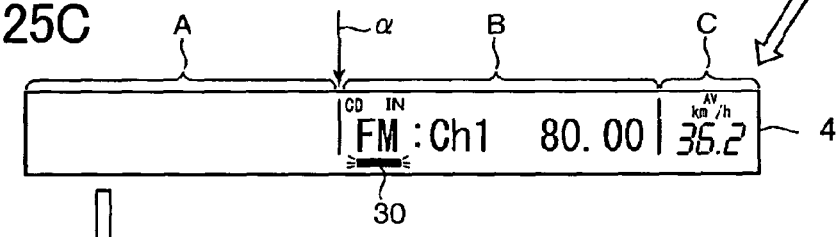
Figure 25E:
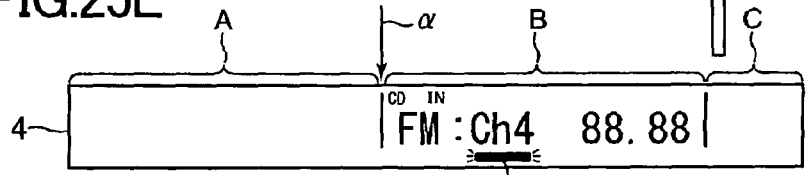
Figure 25D:
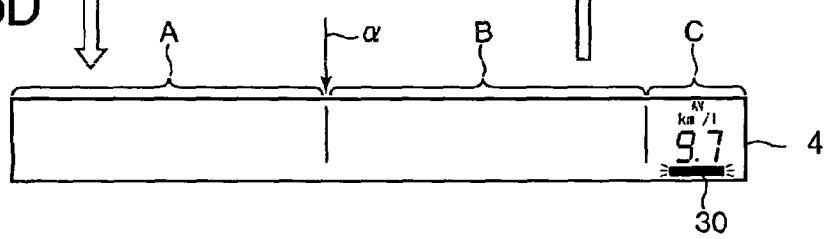
Figure 26A:
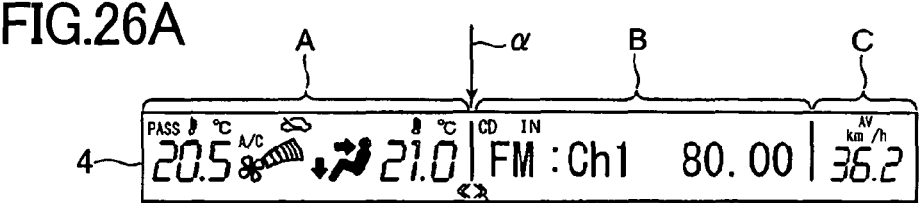
FIG. 26A to FIG. 26E are illustrations collectively showing still other states to which the display state of the concentrated display changes.
Figure 26B:
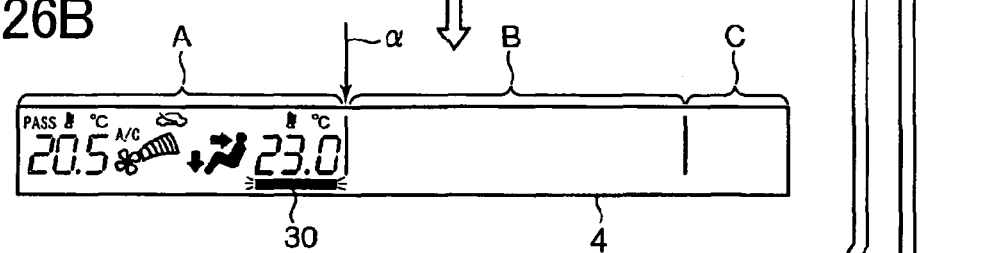
Figure 26C:
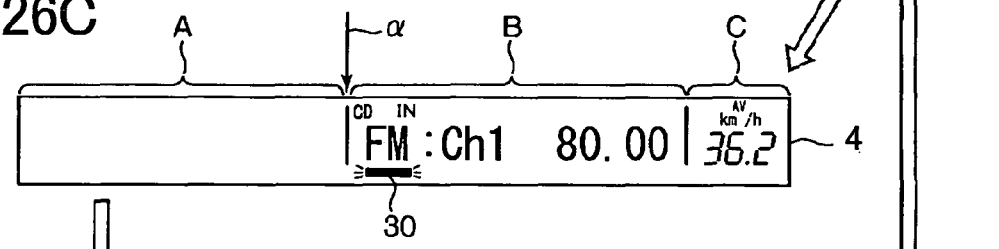
Figure 26E:
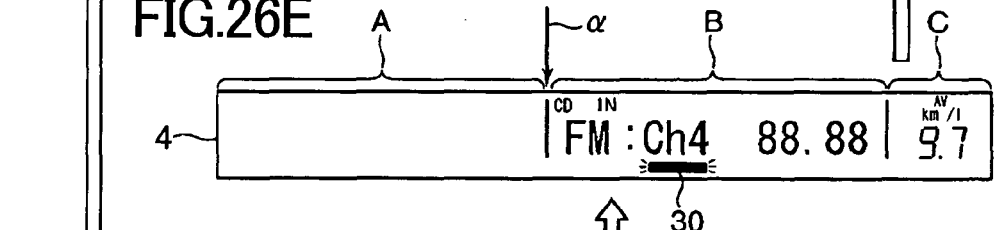
Figure 26D:
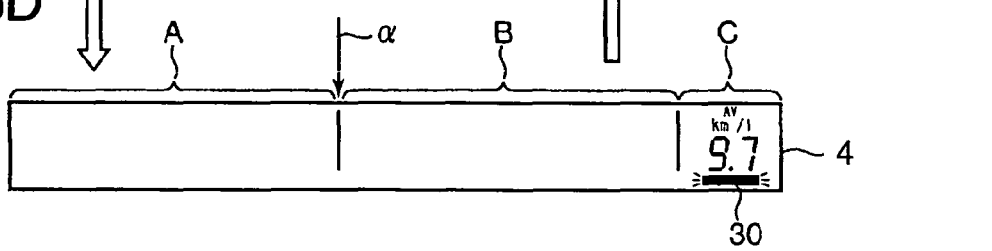
Figure 27A:
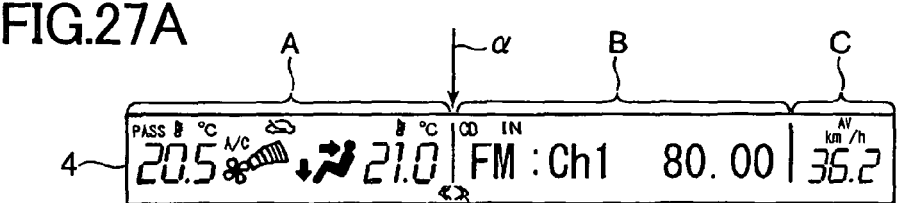
FIG. 27A to FIG. 27E are illustrations collectively showing yet other states to which the display state of the concentrated display changes.
Figure 27B:
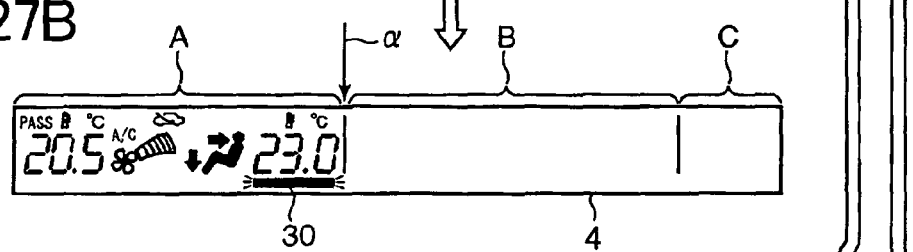
Figure 27C:
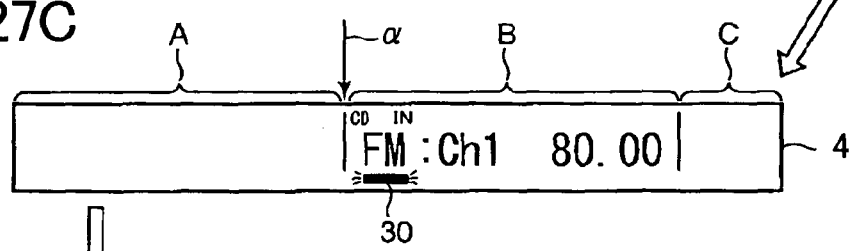
Figure 27E:
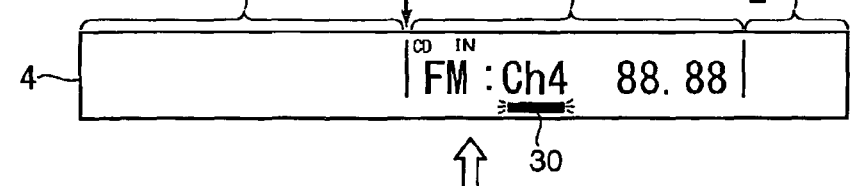
Figure 27D:
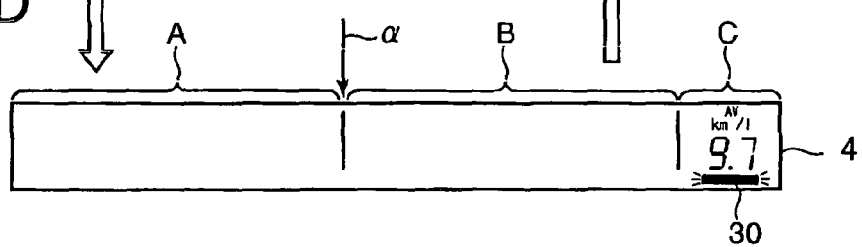

Selection of the operation menu in the display region C next to the display region B by moving the cursor 30 further rightward therefrom brings deletion of the operation menus in the display regions A, B located on the left side of the selected display region C (see FIG. 24D). Accordingly, only the operation menu in the display region C remains displayed as the operation menu in the display region to be operated.

Selection of an operation menu in the display region B next to the display region C by moving the cursor 30 leftward therefrom brings deletion of the operation menu in the display region C located on the right side of the selected display region B (see FIG. 24E). Accordingly, only the operation menus in the display regions A, B remain displayed as the operation menus in the display regions to be operated.

As described above, in the information display system, when an operation menu in an arbitrary display region out of the display regions A to C is selected in response to manipulation of the steering switch 6, each operation menu in a specific display region including the selected display region remains displayed while each operation menu in the other display region is deleted. This reduces driver's visual annoyance in operation menu selection on the concentrated display 4 effectively. As a result, easy and proper manipulation can be done even in the case where the number of the operation menus displayed on the concentrated display 4 is large, in the case where the driver driving the vehicle performs the above operation menu selection, namely, in the case where the driver must watch the concentrated display 4 for a short period of time, and the like.

Particularly, in the case where each operation menu in a display region located on the side opposite the direction in which the cursor 30 is moved are deleted when an operation menu in an arbitrary display region is selected from the display regions A to C, only each operation menu in the display region(s) to be operated is displayed, increasing the operability effectively.

When the boundary part between the display regions A and B on the concentrated display 4, that is, a region where none of the operation menus in any of the display regions is selected is set as the default point α of the cursor 30, the concentrated display 4 can be maintained in the mode where operation menu indication is not restricted in normal time while being transferred to the mode where indication of a specific operation menu is restricted only when an operation menu is selected. This leads to proper distinction between the information display mode and the operation mode in the concentrated display 4.

It is noted that the above scheme for deleting a display region is mere one example and can be modified appropriately within the scope not deviated from the subject matter of the present invention. Modified examples thereof will be described below.

In FIG. 25A to FIG. 25E, each operation menu in each display region located on the opposite side of the default point α to a selected display region is deleted even if it is located on the same side as the direction in which the cursor 30 is moved for selection, in addition to each operation menu in a display region located on the opposite side of the selected display region in which the cursor 30 is moved for selection, that is, on the side opposite the direction in which the cursor 30 is moved. With this arrangement, the screen of the concentrated display 4 at the time point shown in FIG. 25E, that is, the time point when the cursor 30 is moved from the display region C to the display region B is different from the screen shown in FIG. 24E. In detail, in FIG. 25E, though the display region A is present farther than the selected display region located on the same side as the direction in which the cursor 30 is moved (leftward), the operation menus of the display region A are deleted because they are located on the opposite side of the default point α to the selected display region.

Referring to FIG. 26A to FIG. 26E, each operation menu of each display region located on the side in a direction from a selected display region toward the default point α is deleted. With this arrangement, the screen of the concentrated display 4 at the time point shown in FIG. 26E, that is, the time point when the cursor 30 is moved from the display region C to the display region B is different from the screen shown in FIG. 24E. In detail, in FIG. 26E, the operation menu in the display region C on the right side of the selected display region B remains displayed in addition to the operation menus in the selected display region B while the operation menus in the display region A located on the left side thereof are deleted.

As to FIG. 27A to FIG. 27E, only each operation menu in a selected display region remains displayed while the operation menus in the other display regions are deleted. In the case where only each operation menu in the selected display region remains displayed in this way, the driver can readily understand the display region currently set as the operation target, increasing the operability of the information display system.

Though each operation menu in a display region other than a specific display region is deleted completely when the concentrated display 4 is in the operation mode, the present invention is not limited thereto only if each operation menu in a specific display region becomes less conspicuous than the other. For example, each operation menu may be less conspicuous than the other by lowering the intensity thereof.

As described above, in the audio device operation screen S3 of the concentrated display 4, the audio device 1 can be turned off through operation of the audio source operation menu. When it is turned off, an OFF lamp for indicating that the audio device 1 is in the OFF state lights up in the concentrated display 4. However, all time lighting up of the OFF lamp means continued lighting up of indication relating to the unused audio device 1, inviting visual annoyance.

Control for eliminating this disadvantage will be described with reference to FIG. 28A to FIG. 28E.

Figure 28A:
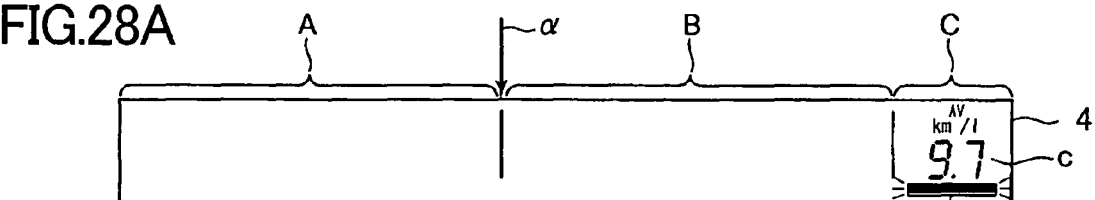
FIG. 28A to FIG. 28E are illustrations showing how indication of the concentrated display changes in response to operation of an audio device.
Figure 28B:
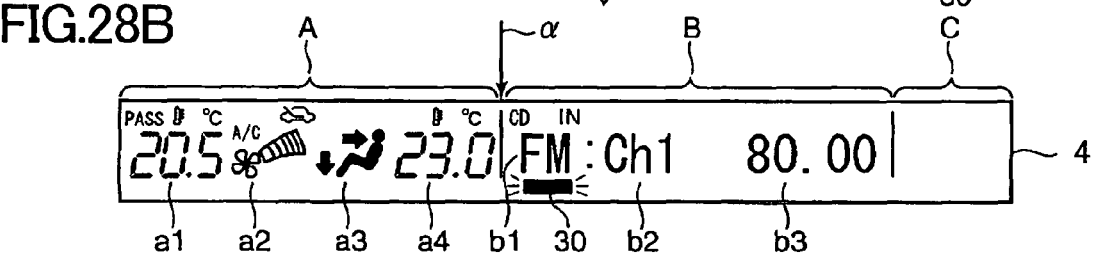
Figure 28C:
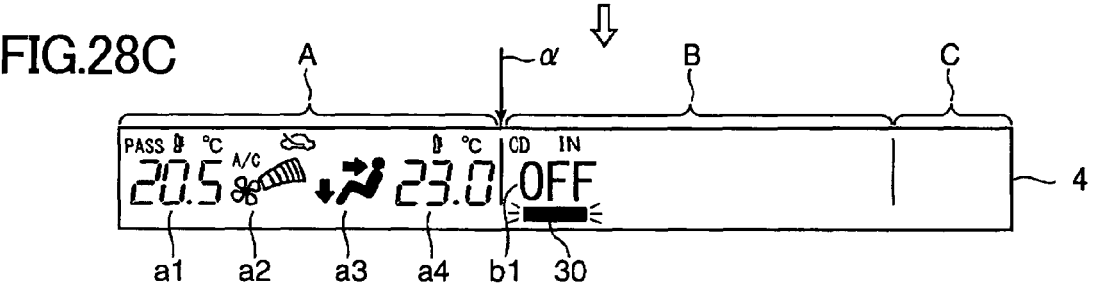

FIG. 28A shows the state where the concentrated display 4 is set to the DIS operation screen S4. When the driver pushes the leftward moving switch 61 of the steering switch 6 three times in this state, the cursor 30 is moved leftward from the display region C to the operation menu b1 in the display region B, as shown in FIG. 28B.

Subsequently, when the driver pushes the selection enter switch 63 of the steering switch 6 upward or downward by necessary times, the audio source is changed from the currently set "FM" (radio) to "OFF," so that the audio device 1 is turned to an OFF-operated state. In association with this, the OFF lamp lights up in the operation menu b1 in the display region B of the concentrated display 4 while the other operation menus b2, b3 therein light out.

Figure 28D:
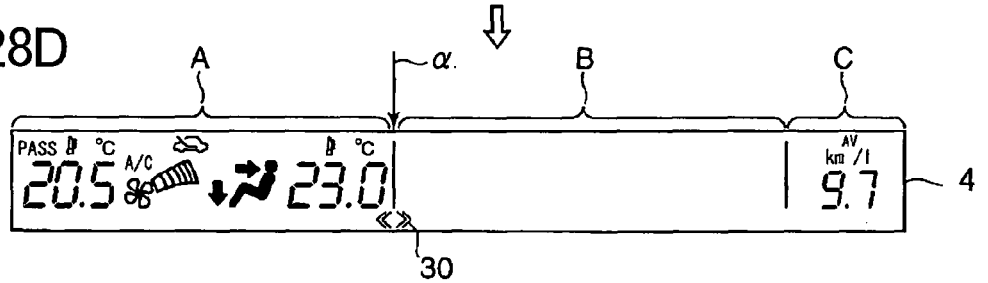

After a predetermined period elapses from the time when the indication of the operation menu b1 is changed to "OFF," the OFF lamp lights out (see FIG. 28D). Thereafter, when the concentrated display 4 is transferred to in the information display mode, all of the operation menus b1 to b3 in the display region B light off while only the operation menus in the other display regions A, C light up. This reduces driver's visual annoyance.

Figure 28E:
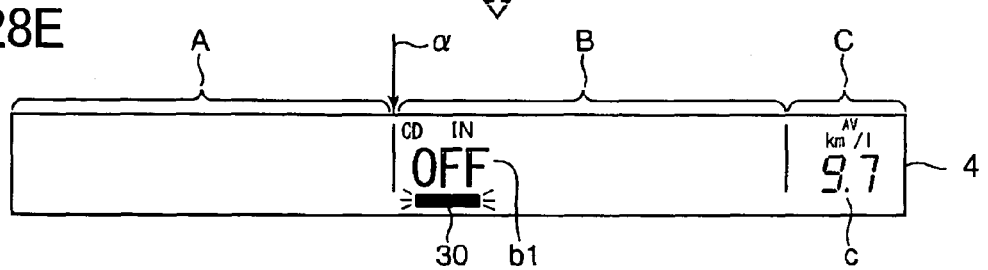

In the state shown in FIG. 28D, when the cursor 30 is positioned at the operation menu b1 in the display region B by driver's one-time manipulation of the rightward moving switch 62 of the steering switch 6, the OFF lamp in the display region B, which has lighted out once, lights up again (see FIG. 28E). This facilitates driver's manipulation for turning on again the audio device 1 (for changing indication of the operation menu b1 relating to the audio source to, for example, "FM") while recognizing relighting of the OFF lamp.

The thus relighting OFF lamp lights out again when the steering switch 6 is not manipulated for a predetermined period thereafter. Also, the cursor 30 returns to the default point α, so that the concentrated display 4 returns to the screen shown in FIG. 28D again.

Figure 30:
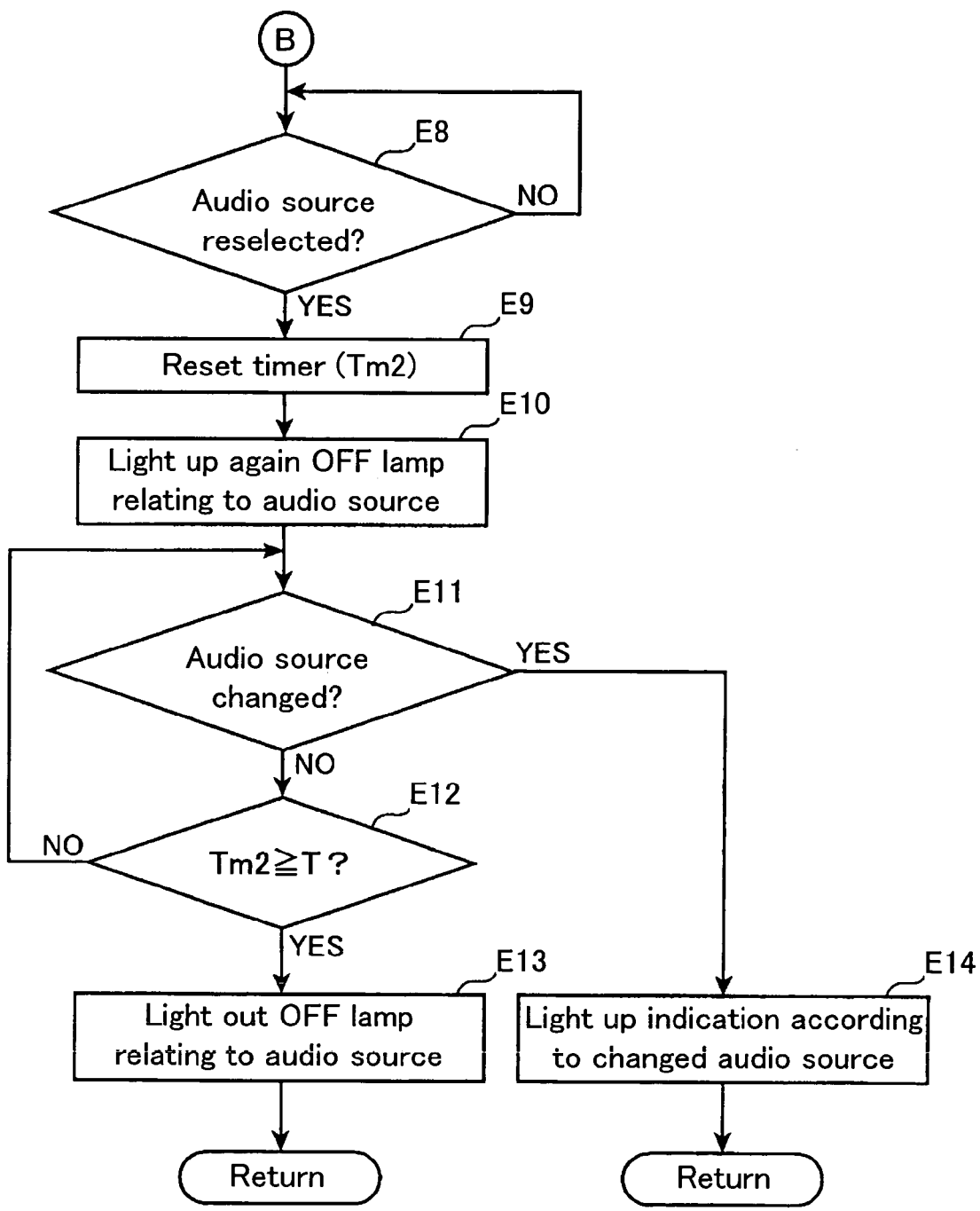
FIG. 30 is a flowchart depicting a latter half of the control operation of the concentrated display.

Description will be given next with reference to FIG. 29 and FIG. 30 to display control executed for the concentrated display 4 when the audio device 1 is OFF-operated. When this display control starts, the presence of OFF operation of the audio device 1 is checked first (a step E1). Specifically, the audio device 1 is judged to be OFF-operated when the selection enter switch 63 of the steering switch 6 is manipulated upward or downward by the number of times that can change the indication of the operation menu b1 to the "OFF" lamp with the operation menu b1 (audio source) in the display region B corresponding to the audio device 1 selected.

When the OFF-operation of the audio device 1 is checked (YES) in the step E1, the count value Tm1 of a timer is reset (a step E2) and control for lighting up the OFF lamp in the operation menu b1 relating to the audio source is executed (a step E3). In association with lighting up of the OFF lamp in the operation menu b1, the other operation menus b2, b3 in the display region B light out.

Subsequently, the presence of operation for changing the audio source is checked, namely, whether or not operation for changing the indication of the operation menu b1 in the display region B from "OFF" to another indication such as "FM," "CD," or the like is performed is judged (a step E4), and whether or not the count value Tm1 of the timer reaches a predetermined time value T (6 seconds, for example) is judged (a step E5). When judged as NO in the step E4 and judged as YES in the step E5, namely, it is confirmed that the predetermined time period T has elapsed with "OFF" lamp set in the audio source remaining unchanged, control for lighting out the OFF lamp in the operation menu b1 is executed (a step E6).

On the other hand, when judged as YES in the step E4, namely, when it is confirmed that the audio source is changed before the predetermined time T elapses from the time point when the audio source is turned off, control for lighting up indication according to the changed audio source in the display region B is executed (a step E7). For example, when the audio source is change to "FM," an "FM" lamp lights up in the operation menu b1 in the display region B while the channel number and the frequency light up in the other operation menus b2, b3 therein, respectively.

Control executed subsequent to the step E6 will be described next with reference to FIG. 30. After the OFF lamp in the operation menu b1 lights out in the step E6, the presence of reselection of an audio source is checked in a subsequent step E8. Specifically, when the cursor 30 is moved once outside the display region B in response to manipulation of the steering switch 6 and is returned to the display region B again for specifying the operation menu b1, it is judged that an audio source is reselected.

When reselection of an audio source is checked (YES) in the step E8, the count value Tm2 of a timer is reset (a step E9) and control for lighting up again the OFF lamp in the operation menu b1 relating to the audio source is executed (a step E10).

Subsequently, similarly to the steps E4 and E5, the presence of change in audio source is checked, and whether or not the count value Tm2 of the timer is equal to or larger than a predetermined time value (Tm2≧T) is judged (steps E11 and E12). When judged as NO in the step E11 and judged as YES in the step E12, namely, when it is confirmed that the predetermined time period T has elapsed with audio source unchanged, control for lighting out the OFF lamp in the operation menu b1 is executed (a step E13).

On the other hand, when judged as YES in the step E11, namely when it is confirmed that the audio source is changed before the predetermined period elapses from the time point when the audio source is reselected, control for lighting up the indication according to the changed audio source in the display region B is executed (a step E14).

As described above, in the information display system, when the audio device 1 is turned off through the steering switch 6, the OFF lamp lights up once in the display region B relating to the OFF-operated audio device 1 and, then, lights out after the predetermined period elapses. This eliminates visual annoyance caused due to continued lighting up of the OFF lamp, and in turn, the operation menus relating to the unused audio device 1. Further, when the operation menu b1 relating to the audio source 1 is reselected in lighting out of the OFF lamp, the OFF lamp lights up again. Accordingly, the operator can recognize the relighting OFF lamp as assistance in turning ON again the audio device 1. As a result, visual annoyance caused due to continued lighting up of the OFF lamp is eliminated, and the operability in turning on again the audio device 1 once turned off is ensured, leading to an effective improvement on the operability of the information display system.

The default point α of the cursor 30 is set at the point adjacent to the display region B relating to the ON/OFF operated audio device 1, so that the operability in turning on again the audio device 1 once turned off is increased. In detail, the cursor 30 can be moved from the default point α to the display region B relating to the audio device 1 by one-time manipulation, leading to immediate relighting of the OFF lamp in the display region B. Hence, the driver can readily turn on the audio device 1 again while recognizing the OFF lamp.

ON/OFF exchange of the audio device 1 is performed as part of operation for audio source change, which is the most significant operation menu relating to the audio device 1, so that ON/OFF exchange of the audio device 1 can be done smoothly, providing an information display system exhibiting excellent operability.

Though not mentioned above, the time interval from the time when the indication of the operation menu b1 in the concentrated display 12 is changed to "OFF" lamp to the time when the audio device 1 is turned off actually may be set to several seconds. When the audio device 1 is turned off actually after a predetermined period elapses with the "OFF" lamp in the operation menu b1 relating to the audio source remaining unchanged, frequent power on/off of the audio device 1 is prevented, for example, in such a case where the indication relating to the audio source becomes temporarily "OFF" in the process of changing the audio source from "FM" to "AM" and so on in sequence. This prevents driver from feeling uncomfortable.

Though only the audio device 1 out of the audio device 1, the air conditioner 2, and the DIS 3 is set capable of being ON/OFF-operated through the steering switch 6 in the above information display system, the air conditioner 2, for example, may be ON/OFF-operated through the steering switch 6 similarly.

Further, in the above information display system, though the OFF lamp lights out when the predetermined period elapses after the OFF lamp lights up in the operation menu b1 in the display region B, control other than the control according to lapse of time may be employable. For example, the OFF lamp may light out when the driver performs predetermined manipulation. Specifically, when the driver manipulates the steering switch 6 to move the cursor 30 outside the display region B (to the display region A or C or the default point a) immediately after the indication of the operation menu b1 in the display region B is changed to "OFF," the OFF lamp may light out before the predetermined period elapses (simultaneously with the movement of the cursor 30). The same can be applied to control for lighting off the OFF lamp relighting in response to reselection of the operation menu b1.

Furthermore, in the above information display system, though the OFF lamp once lighting out lights up again upon selection of the operation menu b1 relating to the audio source, relighting thereof may be done upon selection of an operation menu relating to another piece of in-vehicle equipment (the air conditioner 2 or the DIS 3). This enables the OFF lamp to light up again regularly whenever the driver performs some manipulation for operating any of the in-vehicle equipment. Wherein, relighting of the OFF lamp only upon reselection of the operation menu b1 relating to the audio device 1 means relighting thereof fit for driver's intention of turning on again the audio device 1.

Description will be given to control relating to indication of the main display 12 which is effective in preventing mismanipulation.

The main display 12 can display at least: a navigation map screen indicating, if vehicle's position and a destination are set, route information to the destination in association with road map information; a scroll map screen which is a map screen indicating the road map information and is capable of being scrolled through the steering switch 6; a navigation menu screen indicating operation menus of the navigation device 1; and a sub navigation menu screen indicated when the cursor 30 is moved to any operation menu of the navigation screen.

Figure 31:
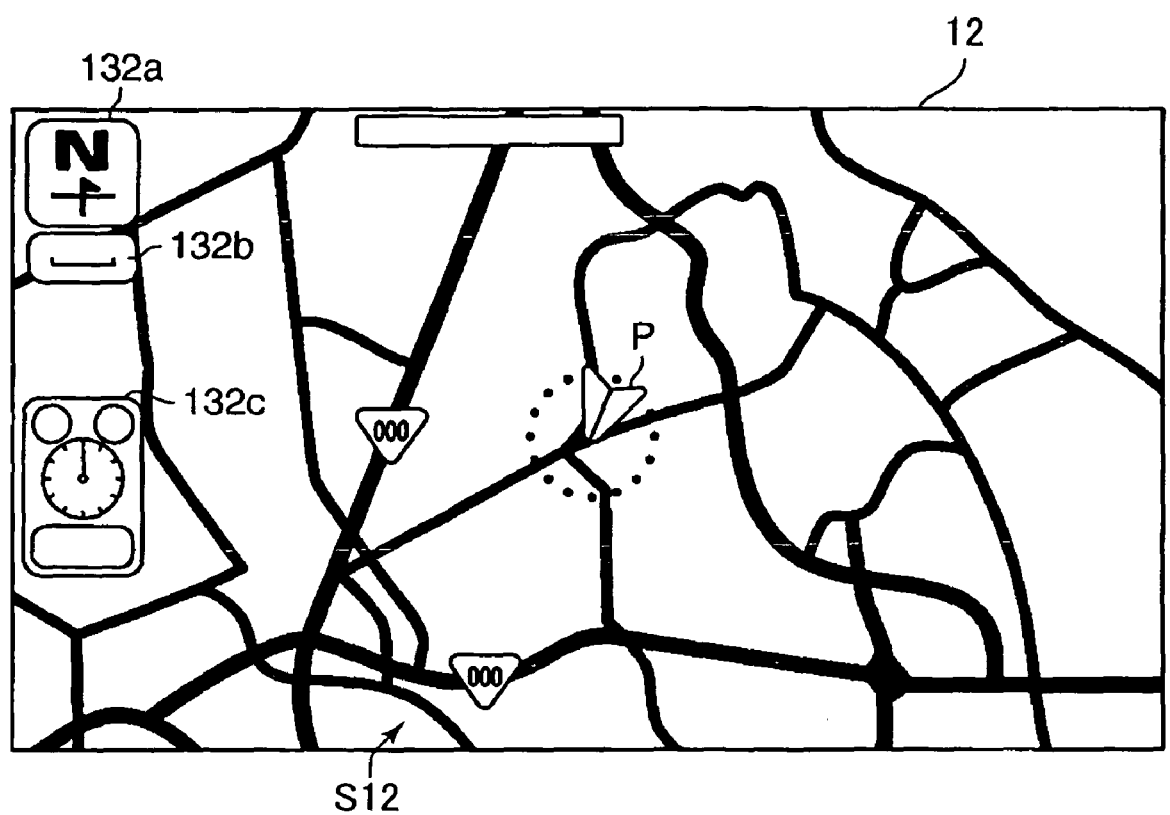
FIG. 31 shows one example of a map screen displayed on the main display.

FIG. 31 shows one example of the navigation map screen. The road map information is indicated substantially in the whole range of this navigation map screen S12, at the center of which a current position mark P indicating the current position of the vehicle is indicated. The road map information is scrolled according to change in the current position of the vehicle. Though not shown specifically, when a destination is set in the navigation device 1, the navigation map screen S12 indicates, besides the road map information and the current position mark P, the route information in which a road to the destination is changed in, for example, color.

Further, the navigation map screen S12 indicates, from the upper left end in this order: an indication style mark 132a for indicating an indication style of the road map information; a scale mark 132b for indicating the scale of the road map information; and an estimated arrival time mark 132c for indicating estimated arrival time at the destination. Each mark 132a to 132c serves as a touch switch. When the indication style mark 132a, for example, is pushed, the indication style of the road map information is changed from a north-up indication style to a head-up indication style and then to a bird's-eye indication style sequentially.

Figure 32:
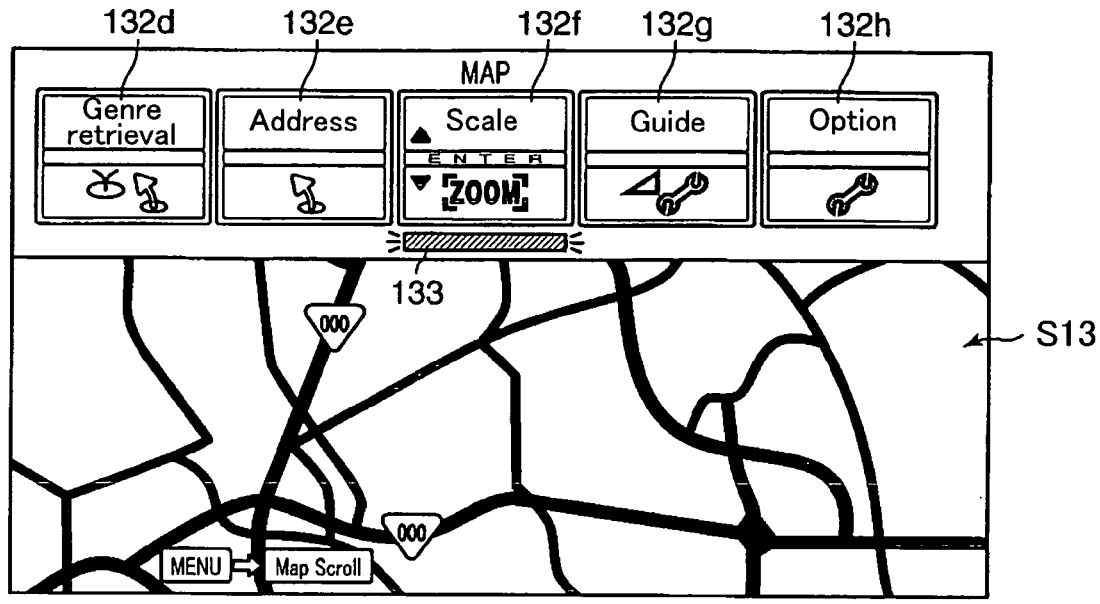
FIG. 32 shows one example of a navigation menu screen displayed on the main display.
Figure 33:
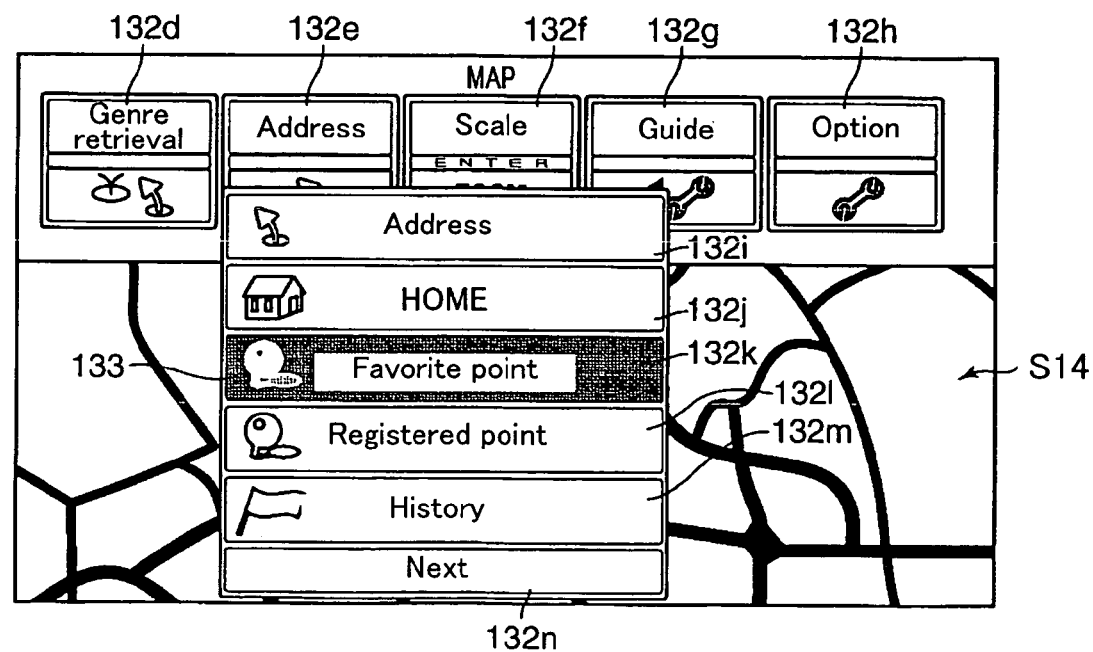
FIG. 33 shows one example of a sub-navigation menu screen displayed on the main display.

FIG. 32 is one example of the navigation menu screen S13. The road map information is indicated substantially in the whole range of this navigation menu screen S13, at the upper part of which the first hierarchy operation menus 132d to 132h of the navigation device 1 are indicated horizontally over the road map information.

The first hierarchy operation menus 132d to 132h are the main operation menus of the navigation device 1. Specifically, the first hierarchy operation menus includes from the left end in this order: the operation menu 132d relating to genre retrieval for retrieving and setting a destination from a genre; the operation menu 132e relating to address retrieval for setting a destination from an address, a registered point, or the like; the operation menu 132f relating to scale setting for changing the scale of the road map information displayed on the main display 12; the operation menu 132a relating to guide setting for performing various settings relating to route information guide to a destination; and the operation menu 132h relating to various kinds of option settings. Each operation menu 132d to 132h serves as a touch switch, as well. It is noted that each operation menu 132d to 132h may be set as an exclusive item for screen operation through the steering switch 6 with the function as the touch switch cancelled.

On the navigation menu screen S13, herein, a cursor 133 is indicated for specifying and selecting an arbitrary operation menu from the above plurality of operation menus 132d to 132h. The default point of the cursor 133 is set below the operation menu 132f relating to the scale setting, as shown in FIG. 32. The cursor 133 is moved right and left according to manipulation of the leftward moving switch 61 and the rightward moving switch 62 of the steering switch 6 to reach a part below any of the operation menus 132d, 132e, 132g, 132h for specifying the corresponding operation menu.

When the cursor 133 is moved right or left from the default point and any of the operation menus 132d, 132e, 132g, 132h other than the operation menu 132f relating to the scale setting is specified, the sub navigation screen S14 is developed downward to indicate the second hierarchy operation menus relating to the selected operation menu 132d, 132e, 132g, or 132h.

For example, when the cursor 133 is moved to the operation menu 132e relating to address retrieval, the second hierarchy operation menus are indicated which include from above in this order: an operation menu 132i for changing the screen to an address input screen; an operation menu 132j for setting a destination to a home address registered in advance; operation menus 132k, 132l for inputting and setting a destination by selecting a favorite point and a registered point, respectively, which are registered in advance; an operation menu 132m for inputting and setting a destination from a destination history; and an operation menu 132n for indicating an additional other operation menu (not shown). In the sub navigation menu S14 indicating the second hierarchy operation menus, the cursor 133 is moved upward or downward by manipulating the selection enter switch 63 of the steering switch 6 upward or downward. When the selection enter switch 63 is pushed with an arbitrary operation menu selected by the cursor 133, the operation according to the selected operation menu is performed. For example, the input screen is displayed on the main display 12 is performed.

Further, the operation menus 132i to 132n serve as touch switches, as well. Alternatively, each of the operation menus 132i to 132n may be set as an exclusive item for screen operation through the steering switch 6 with the function as the touch switch cancelled. This restricts manipulation of the touch switches to the passengers other than the operator of the steering switch 6.

In the sub navigation menu screen S14, when the operation menu 132h relating to various option settings is selected by the cursor 133 or the touch switch and an operation menu (not shown) relating to map scroll for scrolling the map is selected from the second hierarchy operation menus belonging to the operation menu 132h, the main display 12 displays the scroll map screen capable of being scrolled through the steering switch 6 while the concentrated display 4 remains displaying the current screen.

As well be described later, when the NAVI switch 64 is pushed long with the operation target of the steering switch 6 set to the concentrated display 4, the main display 12 changes the screen from the navigation map screen S12 to the scroll map screen S15, as well.

Figure 34:
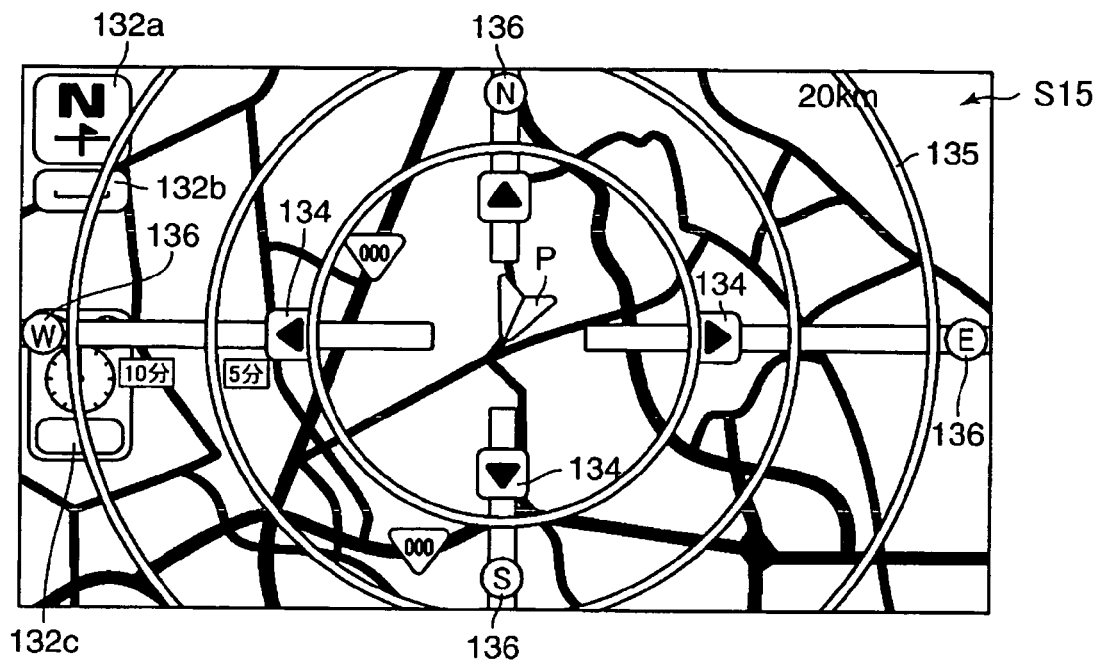
FIG. 34 shows one example of a scrollable map screen displayed on the main display.

FIG. 34 shows one example of the scroll map screen S15. The scroll map screen S15 has basically the same indication style as the navigation map screen S12, wherein a plurality of additional marks 134 to 136 for indicating that scroll operation can be performed through the steering switch 6 are indicated, in addition to each piece of information indicted in the navigation map screen S12. In detail, the scroll map screen S15 indicates a direction mark 134, a range mark 135, and an orientation mark 136 as the additional marks, in addition to the road map information, the current position mark P, the indication style mark 132a, the scale mark 132b, and the estimated arrival time mark 132c. The direction mark 134 indicates scrollable directions in which scroll operation is performed through the steering switch 6, the range mark 135 includes a circle and/or an arc each of which center is the current position mark P on the road map information, and the orientation mark 136 indicates the orientation in the road map information. The scroll map screen S15 is scrolled up, down, right, and left according to manipulation of the steering switch 6.

Specifically, the direction mark 134 includes arrow icons which indicate up, down, right, and left and are located at the central part of the scroll map screen S15. The direction mark 134 serves as a touch switch so that pushing of one of the arrow icons of the direction mark 134 scrolls the scroll map screen S15 in a direction corresponding to the arrow. Referring to the range mark 135, it includes a circle and/or an arc having the current position mark P as the coaxial center, each of which indicates a range of estimated arrival time (for example, three minutes, five minutes, and ten minutes) from the current position mark P. The range mark 135 is indicated substantially over the whole range of the scroll map screen S15. The orientation mark 136 is indicated as outline letters (N, S, E, W) indicating the orientations within circle icons arranged in the periphery of the scroll map screen S15.

The additional marks of the direction mark 134, the range mark 135, and the orientation mark 136 are translucent so that the road map information therebehind can be read through the additional marks 134, 135, 136.

Figure 35:
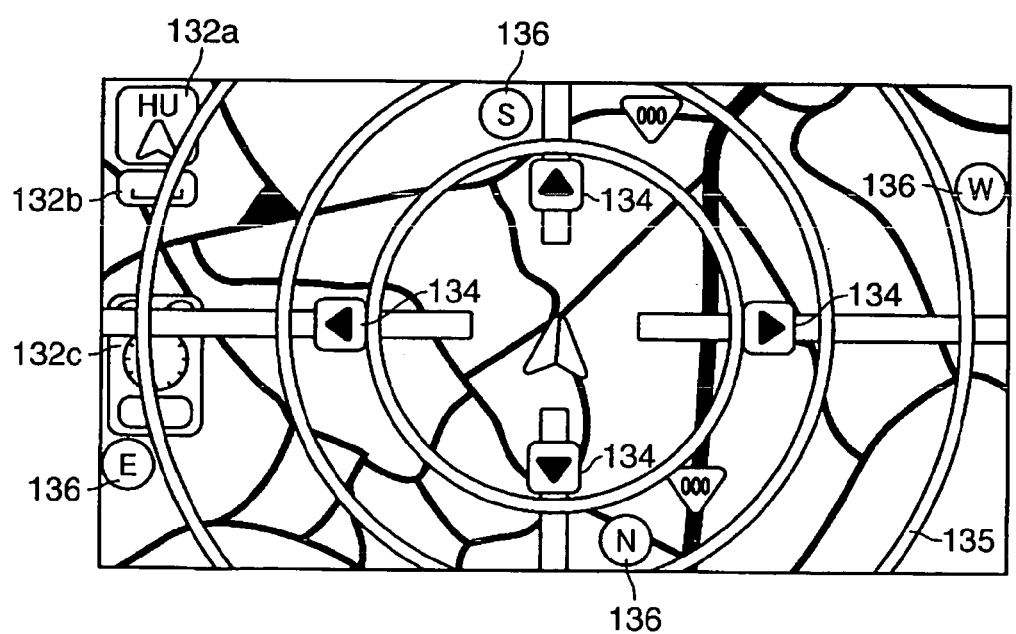
FIG. 35 shows one example of a screen where an indication style of the scrollable map screen in FIG. 34 is changed.

Further, the additional marks 134, 135, 136 are changed in their style according to an indication style of the road map information. For example, when the road map information is changed from the north-up indication style shown in FIG. 34 to the head-up indication style shown in FIG. 35 by pushing the indication style mark 132a, the indication style of the road map information is changed accordingly and the position of the orientation mark 136 is changed according to the road map information. As well, when the indication style of the road map information is changed to the bird's-eye indication style, the road map information is changed and displayed on the main display 12 according to the change and the direction mark 134 and the range mark 135 are changed and indicated according to the bird's-eye indication style.

Figure 36:
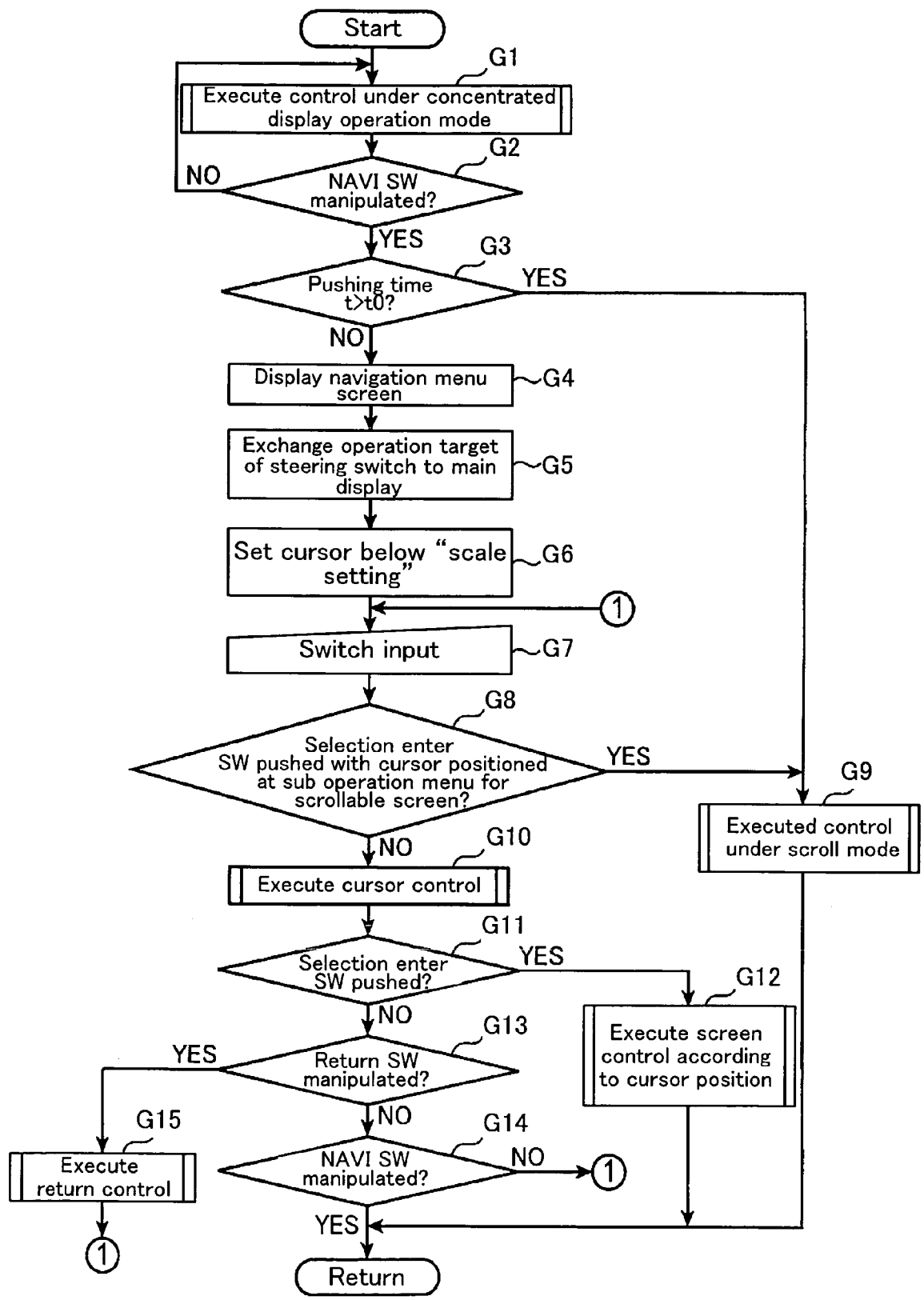
FIG. 36 is a flowchart depicting a control operation of a controller.

Control on the concentrated display 4 and the main display 12 by a controller (the audio/navigation device 1) will be described next reference to the flowchart of FIG. 36.

When the control starts, control under a concentrated display operation mode, which is an initialization mode, is executed (a step G1). In the control under the concentrated operation mode, the operation target of the steering switch 6 is set to the concentrated display 4 and the main display 12 displays the navigation map screen S12. Then, the aforementioned control relating to the concentrated display 4 is executed according to manipulation of the steering switch 6.

When the NAVI switch 64 is pushed (YES in a step G2), pushing time t is measured and whether or not the pushing time t is longer than predetermined long pushing reference time t0 (step G3) is judged. When the pushing time t is shorter than the reference time t0 (No in the step G3), the main display 12 displays the navigation menu screen S13 (a step G4). While, the concentrated display 4 displays the NAVI operation mode screen S6 (see FIG. 7) and the operation target of the steering switch 6 is exchanged to the main display 12 (a step G5). This allows manipulation of the steering switch 6 for selecting any operation menu displayed on the navigation menu screen S13. In the navigation menu screen S13 displayed on the main display 12, when the screen is changed, the cursor 133 is positioned at the default point (a step G6), namely, below the operation menu 132f relating to the scale setting.

Subsequently, upon switch input in the navigation menu screen S13 (a step G7), whether or not the cursor 133 is positioned at an operation menu for operating a screen to which the map scrolling function is assigned is judged and whether or not the selection enter switch 63 is pushed is judged. When the cursor 133 is positioned at any operation menu for operating a screen to which the map scrolling function is assigned and the selection enter switch 63 is pushed (YES in a step G8), control under a scroll mode is executed (a step G9).

Referring to the step G3 again, when the NAVI switch 64 is pushed long so that the pushing time t of the NAVI switch 64 is longer than the reference time t0 (YES in the step G3), the routine proceeds to the step G9 for executing the control under the scroll mode.

In the control under the scroll mode, the screen that the main display 12 displays is changed from the navigation menu screen S13 or the navigation map screen S12 to the scroll map screen S15 as shown in FIG. 34.

In the control under the scroll mode, the scroll map screen S15 is scrolled according to manipulation of the leftward moving switch 61, the rightward moving switch 62, and the selection enter switch 63. Pushing of the NAVI switch 64 or the return switch 65 returns the control under the scroll mode to the main control for executing the control under the concentrated display operation mode, and then, the routine returns.

On the other hand, when judged as NO in the step G8, cursor control is executed (a step G10).

For example, in the navigation menu screen S13 shown in FIG. 32, when the leftward moving switch 61 of the steering switch 6 is manipulated once, the screen is controlled so that the cursor 133 is moved one step leftward from the default point so as to be located below the operation menu 132*e* relating to the address retrieval. This movement of the cursor 133 develops the second hierarchy operation menus. When the cursor 133 is moved to the operation menu 132*i* relating to the address setting, the sub navigation menu screen S14 is displayed on the main display 12. Two-time downward manipulation of the selection enter switch 63 of the steering switch 6 in this state moves the cursor 133 to the operation menu 132*k* relating to the favorite point setting. When the selection enter switch 63 is pushed in this state (YES in a step G11), an input screen for inputting and setting a destination from preset favorite points or the like is displayed in response to the selection of the operation menu 132*k* (a step G12). When a favorite point is input and set in this input screen, the control in the input screen is returned to the main control under the concentrated display operation mode, and then, the routine returns.

In the navigation menu screen S13, when another first hierarchy operation menu and another second hierarchy operation menu are selected, control similar to the case where the operation menu relating to the favorite point setting is selected is executed, as well.

On the other hand, when the selection enter switch 63 is not pushed in the step G11 (NO in the step G11), whether or not the return switch 65 is pushed is judged (a step G13). When the return switch 65 is pushed (YES in the step G13), control for returning the screen to the previous navigation menu screen is executed (a step G15). Then, the routine proceeds to the step G7.

When judged as NO in the step G13, whether or not the NAVI switch 64 is pushed is judged (a step G14). When not pushed (NO in the step G14), the routine proceeds to the step G7. On the contrary, when the NAVI switch 64 is pushed (YES in the step G14), the routine returns for executing the control under the concentrated display operation mode.

As described above, in the information display system, the main display 12 displays the navigation map screen S12 indicating the road map information even when the operation target of the steering switch 6 is set to the concentrated display 4. Accordingly, the road map information can be obtained from the main display 12 regardless of whether the operation target of the steering switch 6 is set to the concentrated display 4 or the main display 12, resulting in enhanced usability.

The navigation map screen S12 is similar to a conventional scroll map screen having a basic indication style in which, for example, the road map information is displayed. Therefore, when the main display 12 displays the navigation map screen S12 including the road map information even though the operation target of the steering switch 6 is set to the concentrated display 4, the operator glancing at the main display 12 would not be able to identify to which display the operation target of the steering switch 6 is set. If it is impossible to identify the display to which the operation target of the steering switch 6 is set, the operator would manipulate the steering switch 6 for the purpose of scroll operation in the state where the operation target of the steering switch 6 is set to the concentrated display 4, leading to mis-operation of in-vehicle equipment.

In the information display system, however, when the operation target of the steering switch 6 is set to the main display 12 displaying the scroll map screen S15, the additional marks of the direction mark 134, the range mark 135, and the orientation mark 136 are indicated over a comparatively wide range of the scroll map screen S15. Accordingly, the operator can identify the operation target of the steering switch 6 as the main display 12 displaying the scroll map screen S15 even by glancing at the main display 12, reliably preventing mis-manipulation on illusion.

In this way, the scroll map screen S15, rather than the navigation map screen S12, indicates the additional marks 133 to 136. This simplifies as far as possible the navigation map screen S12, which usually the driver driving the vehicle uses for in instantaneous information reading, to facilitate acquisition of the road map information, the route information, and the like. While, because the operator affords to watch the screen usually in the scroll operation using the scroll map screen S15, hitches accompanied by acquisition of the road map information can be reduced even though the additional marks are indicated over a comparatively wide range. Further, wide-ranged indication of the additional marks leads to operator's reliable recognition of the additional marks 134 to 136.

When the operation target of the steering switch is set to the main display 12 displaying the navigation menu screen S13 or the sub navigation menu screen S14, the main display 12 displays the first hierarchy operation menus and/or the second hierarchy operation menus, which makes the operator to identify the operation target of the steering switch 6 as the main display 12 without failure.

Moreover, the additional marks of the direction mark 134, the range mark 135, and the orientation mark 136 are scrollable through the steering switch 6 or relate to the road map information, further enhancing the driver's operability. Further, each additional mark matches with the scroll map screen S15, effectively preventing the operator from feeling that the additional marks are obtrusive.

It is noted that either the scroll map screen S15 or the navigation map screen 12 may be colored or changed in intensity differently from the other screen for easy identification of the screens.

Furthermore, the additional marks are not limited to only the direction mark 134, the range mark 135, and the orientation mark 136, but may include another mark. For example, a distance from the center of the scroll map screen to the vehicle's current position may be indicated in a predetermined range as an additional mark. In this case, preferably, the distance indication as the additional mark ranges comparatively wide for conspicuous indication.

The range mark 135 indicates, as coaxial circles or the like, the ranges of estimated arrival time from the current position, but may indicate a direct distance from the current position as coaxial circles or the like.

Though the additional marks are provided when the operation target of the steering switch 6 is set to the main display 12 displaying the scroll map screen S15, they may be provided in the navigation map screen S12 instead.

It is noted that the screen geometries of the main display 12 and the concentrated display 4 exemplified in the above embodiment are mere examples and are not limited thereto.

Further, the arrangement of the main display 12 and the concentrated display 4 is not limited to the above embodiment.

Though the steering switch 6 is set as the operation switch of the present invention in the above embodiment, but the operation switch may be set to another switch rather than the steering switch 6.

Moreover, the in-vehicle equipment of which information the concentrated display 4 indicates is not limited to only the audio device 1, the air conditioner 2, and the DIS 3, and information on other in-vehicle equipment (auto-cruising device and the like) may be displayed on the concentrated display 4. The number of display regions of the concentrated display 4 should be determined appropriately according to the number of pieces of in-vehicle equipment to be operated.

In addition, though the cursor 30 is indicated on the concentrated display 4, the present invention is not limited thereto. Any arrangement is employable only if the operation menus are capable of being selected. For example, the color of a selected operation menu may be differentiated from that of the other operation menus for easy selection of the operation menu.

The present invention is not limited to the above embodiment and can provide various embodiments without departing from the sprit and the main features. Therefore, the above embodiment is a mare example in every aspect and must not be construed restrictively. The scope of the present invention is defined by the appended claims and is not limited by any of the details of the description. Further, all changes and modification that fall within the equivalent scope of the claims are within the scope of the present invention.

What is claimed is:

1. An automotive information display system, comprising:
   a display for displaying, as an operation screen for operating at least one piece of in-vehicle equipment, an operation screen in which a plurality of horizontally arranged operation menus are indicated and which allows, upon selection of any one of the plurality of operation menus, an operation relating to the selected operation menu;
   a first operation section including: a leftward moving switch to which a function of moving an operation menu selected point leftward on the operation screen is assigned; a rightward moving switch to which a function of moving the operation menu selected point rightward on the operation screen is assigned; and a selection enter switch capable of being manipulated upward and downward and being pushed; and
   a controller for changing a position of the operation menu selected point in the operation menus horizontally arranged on the operation screen for selecting any one of the operation menus in response to a manipulation signal from the leftward moving switch or the rightward moving switch and for executing an operation relating to the selected operation menu in response to an upward or downward manipulation signal from the selection enter switch.

2. The system of claim 1,
   wherein the display is a navigation display for displaying at least an operation screen relating to a navigation device,
   the operation screen of the navigation display displays a plurality of horizontally arranged first hierarchy operation menus and displays, upon selection of any one of the plurality of first hierarchy operation menus, vertically arranged second hierarchy operation menus belonging to the selected first hierarchy operation menu, and
   the controller changes the position of the operation menu selected point in the horizontally arranged first hierarchy operation menus on the operation screen in response to a manipulation signal from the leftward moving switch or the rightward moving switch, changes the position of the operation menu selected point in the vertically arranged second hierarchy operation menus in response to an upward or downward manipulation signal from the selection enter switch, and enters selection of a selected second hierarchy operation menu in response to a pushing signal from the selection enter switch.

3. The system of claim 2, further comprising:
   a concentrated display for displaying an operation screen in which horizontally arranged operation menus indicating respective pieces of information on respective plural pieces of independent in-vehicle equipment are indicated and which is capable of changing settings relating to displayed information by manipulation of the first operation section,
   wherein the first operation section further includes a switch for exchanging an operation target between the navigation display and the concentrated display, and
   when the operation target of the first operation section is set to the concentrated display, the controller changes the position of the operation menu selected point in the operation menus arranged horizontally on the operation screen of the concentrated display in response to a manipulation signal from the leftward moving switch or the rightward moving switch and changes setting of information corresponding to an operation menu where the operation menu selected point is positioned in response to an upward or downward manipulation signal from the selection enter switch.

4. The system of claim 1,
   wherein the leftward moving switch is arranged on the left side of the selection enter switch while the rightward moving switch is arranged on the right side of the selection enter switch.

5. The system of claim 1,
   wherein the first operation section is mounted at a steering wheel.

6. The system of claim 3,
   wherein when the operation target of the first operation section is set to the concentrated display, the controller moves the operation menu selected point to a default point located at a substantial central part of the plurality of horizontally arranged operation menus in the display screen of the concentrated display in response to a pushing signal from the selection enter switch.

7. The system of claim 3,
   wherein when a predetermined operation menu is selected on the concentrated display, the controller resets information corresponding to the predetermined operation menu upon receipt of a pushing signal from the selection enter switch.

8. The system of claim 1, further comprising:
a second operation section, which is provided for the in-vehicle equipment, for performing an operation on the operation screen,
wherein when the controller performs control relating to the in-vehicle equipment in response to an operation signal from one of the first and second operation sections, the controller restricts the other operation section.

9. The system of claim 8,
wherein the controller does not perform control corresponding to an operation signal from the other operation section until a predetermined period elapses after the receipt of the operation signal from the one operation section.

10. The system of claim 8,
wherein the one operation section has a touch sensing function of detecting human touch to the one operation section, and
the controller does not perform control corresponding to an operation signal from the other operation section during the time when a human touches the one operation section after the receipt of the operation signal from the one operation section.

11. The system of claim 8,
wherein the first operation section is mounted at a steering wheel.

12. The system of claim 8,
wherein the display is a concentrated display for displaying operation menus relating to respective plural pieces of independent in-vehicle equipment.

13. The system of claim 8,
wherein the display is a navigation display for displaying at least an operation screen relating to a navigation device.

14. The system of claim 13,
wherein when the controller receives a predetermined operation signal from the first operation section in a state where the operation of the second operation section is restricted, the controller releases the operation restriction.

15. The system of claim 13,
wherein when the controller performs control on the in-vehicle equipment in response to an operation signal from the first operation section, the controller performs display control on the navigation display so as to make a passenger to recognize visually that the operation of the second operation section is restricted.

16. The system of claim 15,
wherein when the controller performs control on the in-vehicle equipment in response to an operation signal from the first operation section, the controller allows an operation menu corresponding to the operation signal to be displayed to at least an operator of the first operation section.

17. The system of claim 16,
wherein the controller makes a passenger to recognize that the operation of the second operation section is restricted by differentiating an operation menu indication style when the operation of the second operation section is not restricted from an operation menu indication style when the operation of the second operation section is restricted.

18. The system of claim 15,
wherein the navigation display is capable of displaying screens different from each other according to an angle of line of sight with respect to a display face thereof, and
when the controller performs control on the in-vehicle equipment in response to an operation signal from the first operation section, the controller makes an operator of the second operation section to recognize that the operation of the second operation section is restricted while displaying an operation menu corresponding to the operation signal to an operator of the first operation section by differentiating a screen toward the operator of the second operation section from a screen toward the operator of the first operation section.

19. The system of claim 3,
wherein the controller
stores, when the operation target of the first operation section is exchanged to the concentrated display in response to a manipulation signal from the switch in the state where the operation target of the first operation section is set to the navigation display, an interrupted screen displayed on the navigation display immediately before the exchange, and
allows, when the operation target of the first operation section is exchanged thereafter from the concentrated display to the navigation display in response to a re-manipulation signal from the switch, a screen displayed on the navigation display to be selectable between an operation initial screen, which is an initial operation screen displayed first, and the stored interrupted screen.

20. The system of claim 19,
wherein the controller
allows the navigation display to display the operation initial screen in response to the re-manipulation signal from the switch, the operation initial screen including an operation menu for transferring to the interrupted screen, and
allows the navigation display to display the interrupted screen in response to an operation signal from the first operation section which indicates selection of the operation menu for transferring to the interrupted screen.

21. The system of claim 19, further comprising:
a return switch for allowing the interrupting screen to be displayed,
wherein the controller
allows the navigation display to display the operation initial screen when the re-manipulation signal is received from the switch, and
allows the navigation display to display the interrupted screen when a manipulation signal from the return switch is received in a state where the navigation display displays the operation initial screen.

22. The system of claim 19,
wherein the controller allows the navigation display to display the operation initial screen or the interrupted screen according to a re-manipulation signal from the switch, the re-manipulation signal changing according to a re-manipulation manner.

23. The system of claim 22,
wherein the controller allows the navigation display to display one of the operation initial screen and the interrupted screen when the switch is pushed short, and allows it to display the other screen when the switch is pushed long.

24. The system of claim 3,
wherein the operation screen of the concentrated display includes a plurality of display regions divided for each piece of the in-vehicle equipment and each including at least one operation menu, and
when an operation menu in an arbitrary display region is selected by manipulation of the leftward moving switch or the rightward moving switch, the controller transfers to a specific mode for keeping indication of each operation menu in a specific display region including at least the selected display region while restricting indication of each operation menu in the other display region.

25. The system of claim 24,
wherein under the specific mode, each operation menu in the specific display region including at least the selected display region remains displayed while each operation menu in the other display region is deleted.

26. The system of claim 24,
wherein the number of the display regions included in the operation screen of the concentrated display is three or larger,
the controller moves the operation menu selected point leftward or rightward in response to a manipulation signal from the leftward moving switch or the rightward moving switch, and
under the specific mode, indication of each operation menu in each display region located on a side opposite a direction in which the operation menu selected point is moved from the selected display region by manipulation of the leftward moving switch or the rightward moving switch is restricted.

27. The system of claim 24,
wherein under the specific mode, indication of each operation menu of each display region other than the selected display region is restricted.

28. The system of claim 24,
wherein the controller allows a cursor to be indicated on the concentrated display and moves the cursor leftward or rightward in response to a manipulation signal from the leftward moving switch or the rightward moving switch.

29. The system of claim 28,
wherein a default point of the cursor is set at a boundary part of two adjacent display regions.

30. The system of claim 29,
wherein when the controller receives a predetermined one-time operation signal from the first operation section with the cursor located away from the default point, the controller moves the cursor to the default point.

31. The system of claim 29,
wherein when the first operation section is not manipulated for a predetermined period with an arbitrary operation menu specified by the cursor, the controller returns the cursor to the default point.

32. The system of any one of claim 28,
wherein the controller allows the cursor to flash during the time when an arbitrary operation menu is specified by the cursor, and increases a flashing frequency of the cursor in proportion to an increase in vehicle speed.

33. The system of claim 24,
wherein the first operation section is mounted at a steering wheel.

34. The system of claim 3,
wherein the operation screen of the concentrated display includes a plurality of display regions divided for each piece of the in-vehicle equipment and each including at least one operation menu, and
the controller
ON/OFF operates at least one piece of the plural pieces of in-vehicle equipment in response to an operation signal from the first operation section;
allows, upon receipt of an OFF operation signal from the first operation section, an OFF lamp to light up in a display region of the concentrated display corresponding to the OFF-operated in-vehicle equipment, and then allows it to light out thereafter, the OFF lamp indicating that the OFF-operated in-vehicle equipment is in an OFF state; and
allows the OFF lamp to light up again when an operation signal is received from the first operation section in lighting out of the OFF lamp.

35. The system of claim 34,
wherein the controller allows the lighting-out OFF lamp to light again up upon receipt of an operation signal for selecting an operation menu relating to the OFF-operated in-vehicle equipment.

36. The system of claim 35,
wherein the controller allows a cursor to be indicated on the concentrated display and moves the cursor leftward or rightward in response to a manipulation signal from the leftward moving switch or the rightward moving switch, and
a default point of the cursor is set at a part adjacent to a display region corresponding to the ON/OFF-operated in-vehicle equipment.

37. The system of claim 34,
wherein the ON/OFF-operated in-vehicle equipment is an audio device,
a display region in the concentrated display which corresponds to the audio device includes an audio source as one operation menu, and
the controller changes indication relating to the audio source to the OFF lamp according to an operation signal from the first operation section.

38. The system of claim 37,
wherein when a predetermined period elapses with the OFF lamp relating to the audio source kept indicated, the controller turns off the audio device actually.

39. The system of claim 34,
wherein the first operation section is mounted at a steering wheel.

40. The system of claim 3,
wherein the controller:
allows, when the operation target of the first operation section is set to either the navigation display or the concentrated display, the navigation display to display a map screen which includes road map information and is scrollable by manipulation of the first operation section; and
changes, upon receipt of a manipulation signal from the switch, an indication style of the map screen displayed on the navigation display in association with exchange of the operation target of the first operation section between the navigation display and the concentrated display so as to make an operator to identify to which of the navigation display and the concentrated display the operation target is set.

41. The system of claim 40,
wherein when the operation target of the first operation section is set to the navigation display, the controller allows an additional mark to be indicated on the map screen displayed on the navigation display.

42. The system of claim 41,
wherein the additional mark is a direction mark indicating a scrollable direction.

43. The system of claim 41,
wherein the additional mark is a range mark including at least one circle or arc of which center is a specific point in the road map information.

44. The system of claim 40,
wherein the controller is capable of allowing the navigation display to display any one of map screens of which indication styles are different from each other, and changes the additional mark according to a currently set display style.

45. The system of claim 40,
wherein the controller:
- allows the navigation display to display a map screen scrollable by manipulation of the first operation section when a specific operation menu is selected in an operation screen including an operation menu for operating a navigation device; and
- allows the navigation display to display the scrollable map screen immediately without displaying the operation screen including the operation menu for operating the navigation device and exchanges the operation target of the first operation section to the navigation display when a predetermined operation signal is received from the first operation section in a state where the operation target of the first operation section is set to the concentrated display.

46. The system of claim 40,
wherein the first operation section is mounted at a steering wheel.

47. An automotive information display system, comprising:
a main display for displaying, as an operation screen for operating at least one piece of in-vehicle equipment, an operation screen in which a plurality of horizontally arranged first hierarchy operation menus are indicated and which indicates, upon selection of any one of the plurality of first hierarchy operation menus, vertically arranged second hierarchy operation menus belonging to the selected first hierarchy operation menu;
a concentrated display for displaying an operation screen in which horizontally arranged operation menus indicating respective pieces of information on respective plural pieces of independent in-vehicle equipment are indicated;
an operation section including: a leftward moving switch to which a function of moving an operation menu selected point leftward on each operation screen of the main display and the concentrated display is assigned; a rightward moving switch to which a function of moving the operation menu selected point rightward thereon is assigned; a selection enter switch capable of being manipulated upward and downward and being pushed; and a switch for exchanging a display operation target between the main display and the concentrated display; and
a controller, which receives an operation signal from the operation section, for performing display control on the main display and the concentrated display,
wherein when the display operation target is set to the main display, the controller changes a position of the operation menu selected point in the first hierarchy operation menus arranged horizontally on the operation screen of the main display in response to a manipulation signal from the leftward moving switch or the rightward moving switch, changes the position of the operation menu selected point in the second hierarchy operation menus arranged vertically thereon for selecting a second hierarchy operation menu therefrom in response to an upward or downward manipulation signal from the selection enter switch, and enters the selected second hierarchy operation menu in response to a pushing signal from the selection enter switch,
when the display operation target is set to the concentrated display, the controller changes the position of the operation menu selected point in the operation menus arranged horizontally on the operation screen of the concentrated display for selecting an operation menu therefrom in response to a manipulation signal from the leftward moving switch or the rightward moving switch, and changes setting of information corresponding to the selected operation menu in response to upward or downward manipulation signal from the selection enter switch, and
the leftward moving switch is arranged on the left side of the selection enter switch while the rightward moving switch is arranged on the right side of the selection enter switch.

48. An automotive information display system, comprising:
a main display for displaying, as an operation screen for operating at least one piece of in-vehicle equipment, an operation screen in which a plurality of horizontally arranged first hierarchy operation menus are indicated and which indicates, upon selection of any one of the plurality of first hierarchy operation menus, vertically arranged second hierarchy operation menus belonging to the selected first hierarchy operation menu;
a concentrated display for displaying an operation screen in which horizontally arranged operation menus indicating respective pieces of information on respective plural pieces of independent in-vehicle equipment are indicated;
an operation section including: a leftward moving switch to which a function of moving an operation menu selected point leftward on each operation screen of the main display and the concentrated display is assigned; a rightward moving switch to which a function of moving the operation menu selected point rightward thereon is assigned; a selection enter switch capable of being manipulated upward and downward and being pushed; and a switch for exchanging a display operation target between the main display and the concentrated display; and
a controller, which receives an operation signal from the operation section, for performing display control on the main display and the concentrated display,
wherein when the display operation target is set to the main display, the controller changes a position of the operation menu selected point in the first hierarchy operation menus arranged horizontally on the operation screen of the main display in response to a manipulation signal from the leftward moving switch or the rightward moving switch, changes the position of the operation menu selected point in the second hierarchy operation menus arranged vertically thereon for selecting a second hierarchy operation menu therefrom in response to an upward or downward manipulation signal from the selection enter switch, and enters the selected second hierarchy operation menu in response to a pushing signal from the selection enter switch, when the display operation target is set to the concentrated display, the controller changes the position of the operation menu selected point in the operation menus arranged horizontally on the operation screen of the concentrated display for selecting an operation menu therefrom in response to a manipulation signal from the leftward moving switch or the rightward moving switch, and changes setting of information corresponding to the selected operation menu in response to upward or downward manipulation signal from the selection enter switch, and the operation section is mounted at a steering wheel.

* * * * *